(12) United States Patent
Kubo et al.

(10) Patent No.: US 6,862,062 B2
(45) Date of Patent: Mar. 1, 2005

(54) LIQUID CRYSTAL DISPLAY DEVICE

(75) Inventors: Masumi Kubo, Mie (JP); Akihiro Yamamoto, Nara (JP); Kiyoshi Ogishima, Mie (JP); Takashi Ochi, Nara (JP); Kazuhiro Maekawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/775,175

(22) Filed: Feb. 11, 2004

(65) Prior Publication Data

US 2004/0155998 A1 Aug. 12, 2004

Related U.S. Application Data

(62) Division of application No. 09/983,665, filed on Oct. 25, 2001.

(30) Foreign Application Priority Data

Oct. 31, 2000 (JP) .................................... 2000-333802

(51) Int. Cl.[7] ............................................ G02F 1/1337
(52) U.S. Cl. ....................................... 349/129; 349/130
(58) Field of Search ................................ 349/122, 123, 349/129, 130, 139, 100

(56) References Cited

U.S. PATENT DOCUMENTS

| | | | |
|---|---|---|---|
| 5,434,687 A | 7/1995 | Kawata et al. | |
| 5,512,336 A | 4/1996 | Yamahara | |
| 5,594,570 A | 1/1997 | Hirata et al. | |
| 6,097,464 A | 8/2000 | Liu | |
| 6,175,398 B1 | 1/2001 | Yamada et al. | |
| 6,201,592 B1 | 3/2001 | Terashita et al. | |
| 6,256,082 B1 | 7/2001 | Suzuki et al. | |
| 6,266,122 B1 | 7/2001 | Kishimoto et al. | |
| 6,287,649 B1 | 9/2001 | Fukushima et al. | |
| 6,335,780 B1 | 1/2002 | Kurihara et al. | |
| 6,342,938 B1 * | 1/2002 | Song et al. | 349/143 |
| 6,384,889 B1 * | 5/2002 | Miyachi et al. | 349/143 |
| 6,630,975 B1 | 10/2003 | Terashita | |
| 6,661,488 B1 | 12/2003 | Takeda et al. | |

FOREIGN PATENT DOCUMENTS

| | | |
|---|---|---|
| JP | 6-301036 | 10/1994 |
| JP | 07-311383 | 11/1995 |
| JP | 2000-47217 A | 2/2000 |
| JP | 2000-047253 A | 2/2000 |

OTHER PUBLICATIONS

U.S. Appl. No. 09/983,665, filed Oct. 25, 2001.
U.S. Appl. No. 09/357,814, filed Jul. 20, 1999—with Corrected Filing Receipt.
U.S. Appl. No. 09/923,344, filed Aug. 8, 2001—with Filing Receipt.

* cited by examiner

*Primary Examiner*—Kenneth Parker
*Assistant Examiner*—David Chung
(74) *Attorney, Agent, or Firm*—Nixon & Vanderhye P.C.

(57) ABSTRACT

The liquid crystal display device of the present invention includes a first substrate, a second substrate, and a vertical alignment type liquid crystal layer provided between the first substrate and the second substrate, and includes a plurality of picture element regions each defined by a first electrode provided on one side of the first substrate that is closer to the liquid crystal layer and a second electrode provided on the second substrate so as to oppose the first electrode via the liquid crystal layer. The first substrate includes a first orientation-regulating structure in each of the plurality of picture element regions, the first orientation-regulating structure exerting an orientation-regulating force so as to form a plurality of liquid crystal domains in the liquid crystal layer, each of the liquid crystal domains taking a radially-inclined orientation in the presence of an applied voltage. The second substrate includes a second orientation-regulating structure in a region corresponding to at least one of the plurality of liquid crystal domains, the second orientation-regulating structure exerting an orientation-regulating force for orienting liquid crystal molecules in at least one liquid crystal domain into a radially-inclined orientation at least in the presence of an applied voltage.

22 Claims, 32 Drawing Sheets

(a) s=2.75 μm
(b) s=2.25 μm

LIQUID CRYSTAL DISPLAY DEVICE

This application is a Divisional of Application Ser. No. 09/983,665 filed Oct. 25, 2001, the entire content of which is hereby incorporated herein by reference in this application.

BACKGROUND OF THE INVENTION

1. Field of the Invention

The present invention relates to a liquid crystal display device, and more particularly to a liquid crystal display device having a wide viewing angle characteristic and being capable of producing a high quality display.

2. Description of the Background Art

In recent years, liquid crystal display devices, which are thin and light in weight, are used as personal computer displays and PDA (personal digital assistance) displays. However, conventional twist nematic (TN) type and super twist nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate thereto. Another approach is to employ a transverse electric field mode in which a horizontal electric field with respect to the substrate plane is applied across the liquid crystal layer. Transverse electric field mode liquid crystal display devices have been attracting public attention and are mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to be able to precisely control these factors and thus to realize stable production of the device.

In order to realize a uniform display without display non-uniformity with a DAP mode liquid crystal display device, an alignment control is necessary. An alignment control can be provided by, for example, subjecting the surface of an alignment film to an alignment treatment by rubbing. However, when a vertical alignment film is subjected to a rubbing treatment, rubbing streaks are likely to appear in the displayed image, and it is not suitable for mass-production.

Another approach proposed in the art for performing an alignment control without a rubbing treatment is to form a slit (opening) in an electrode so as to produce an inclined electric field and to control the orientation direction of the liquid crystal molecules by the inclined electric field (e.g., Japanese Laid-Open Patent Publication Nos. 6-301036 and 2000-47217). However, the present inventors reviewed these publications and found that with the methods disclosed therein, the orientation in regions of the liquid crystal layer corresponding to the openings in the electrode is not defined, whereby the orientation of the liquid crystal molecules is not sufficiently continuous, and it is difficult to achieve a stable orientation across each pixel, resulting in a display with non-uniformity.

SUMMARY OF THE INVENTION

The present invention has been made to solve these problems in the prior art, and has an object to provide a liquid crystal display device having a wide viewing angle characteristic and a high display quality.

A liquid crystal display device of the present invention includes: a first substrate, a second substrate, and a vertical alignment type liquid crystal layer provided between the first substrate and the second substrate; and a plurality of picture element regions each defined by a first electrode provided on one side of the first substrate that is closer to the liquid crystal layer and a second electrode provided on the second substrate so as to oppose the first electrode via the liquid crystal layer, wherein: the first substrate includes a first orientation-regulating structure in each of the plurality of picture element regions, the first orientation-regulating structure exerting an orientation-regulating force so as to form a plurality of liquid crystal domains in the liquid crystal layer, each of the liquid crystal domains taking a radially-inclined orientation in the presence of an applied voltage; and the second substrate includes a second orientation-regulating structure in a region corresponding to at least one of the plurality of liquid crystal domains, the second orientation-regulating structure exerting an orientation-regulating force for orienting liquid crystal molecules in the at least one liquid crystal domain into a radially-inclined orientation at least in the presence of an applied voltage. Thus, the object set forth above is achieved.

Preferably, the second orientation-regulating structure is provided in a region corresponding to a region in the vicinity of a center of the at least one liquid crystal domain.

Preferably, in the at least one liquid crystal domain, a direction of orientation regulation by the second orientation-regulating structure coincides with a direction of the radially-inclined orientation by the first orientation-regulating structure.

The first electrode may include a plurality of unit solid portions, the first orientation-regulating structure including the plurality of unit solid portions, so that when a voltage is applied between the first electrode and the second electrode, an inclined electric field is produced along a periphery of each of the plurality of unit solid portions, thereby forming the plurality of liquid crystal domains in regions respectively corresponding to the plurality of unit solid portions.

Preferably, a shape of each of the plurality of unit solid portions has rotational symmetry. Preferably, the plurality of unit solid portions are arranged so as to have rotational symmetry in each picture element region.

Each of the plurality of unit solid portions may have a shape with an acute angle corner.

The first electrode may include at least one opening and a solid portion; and the first orientation-regulating structure may include the at least one opening and the solid portion of the first electrode, so that when a voltage is applied between the first electrode and the second electrode, an inclined electric field is produced at an edge portion of the at least one opening of the first electrode, thereby forming the plurality of liquid crystal domains in regions respectively corresponding to the at least one opening and the solid portion.

The first substrate may further include a dielectric layer provided on one side of the first electrode that is away from the liquid crystal layer, and a third electrode opposing at least a portion of the at least one opening of the first electrode via the dielectric layer.

Preferably, the at least one opening includes a plurality of openings having substantially the same shape and substantially the same size, and at least some of the plurality of openings form at least one unit lattice arranged so as to have rotational symmetry. Preferably, a shape of each of the at least some of the plurality of openings has rotational symmetry.

The second orientation-regulating structure may be provided in a region corresponding to each of the plurality of liquid crystal domains. Alternatively, the second orientation-regulating structure may be provided only in a region corresponding to one or more of the plurality of liquid crystal domains that is formed in a region corresponding to the solid portion of the first electrode.

The second orientation-regulating structure may exert an orientation-regulating force for orienting the liquid crystal molecules into a radially-inclined orientation even in the absence of an applied voltage. For example, the second orientation-regulating structure may be a protrusion protruding from the second substrate into the liquid crystal layer. A thickness of the liquid crystal layer may be defined by the protrusion protruding from the second substrate into the liquid crystal layer. Preferably, the protrusion includes a side surface at an angle less than 90° with respect to a substrate plane of the second substrate. Alternatively, the second orientation-regulating structure may include a surface having a horizontal alignment power provided on one side of the second substrate that is closer to the liquid crystal layer.

The second orientation-regulating structure may exert an orientation-regulating force for orienting the liquid crystal molecules into a radially-inclined orientation only in the presence of an applied voltage. For example, the second orientation-regulating structure may include an opening provided in the second electrode.

Another liquid crystal display device of the present invention includes: a first substrate, a second substrate, and a vertical alignment type liquid crystal layer provided between the first substrate and the second substrate; and a plurality of picture element regions each defined by a first electrode provided on one side of the first substrate that is closer to the liquid crystal layer and a second electrode provided on the second substrate so as to oppose the first electrode via the liquid crystal layer, wherein: the first electrode includes, in each of the plurality of picture element regions, a plurality of openings and a plurality of unit solid portions, each of the unit solid portions being surrounded by at least some of the plurality of openings; and the second substrate includes an orientation-regulating structure in a region corresponding to at least one unit solid portion among the plurality of unit solid portions and the plurality of openings. Thus, the object set forth above is achieved.

Preferably, a shape of each of the plurality of unit solid portions has rotational symmetry. Preferably, the plurality of unit solid portions are arranged so as to have rotational symmetry in each picture element region.

Preferably, the orientation-regulating structure is provided in a region corresponding to a region in the vicinity of a center of the at least one of the plurality of unit solid portions and the plurality of openings.

The orientation-regulating structure may be a protrusion protruding from the second substrate into the liquid crystal layer. A thickness of the liquid crystal layer may be defined by the protrusion protruding from the second substrate into the liquid crystal layer. Preferably, the protrusion includes a side surface at an angle less than 90° with respect to a substrate plane of the second substrate.

The orientation-regulating structure may include a surface having a horizontal alignment power provided on one side of the second substrate that is closer to the liquid crystal layer.

The orientation-regulating structure may include an opening provided in the second electrode.

BRIEF DESCRIPTION OF THE DRAWINGS

FIG. 1A and FIG. 1B schematically illustrate a structure of one picture element region of a liquid crystal display device 100 having a first orientation-regulating structure of the present invention, wherein FIG. 1A is a plan view, and FIG. 1B is a cross-sectional view taken along line 1B–1B' of FIG. 1A.

Each of FIG. 3A to FIG. 3D schematically illustrates the relationship between an electric force line and an orientation of a liquid crystal molecule.

Figure 4A:
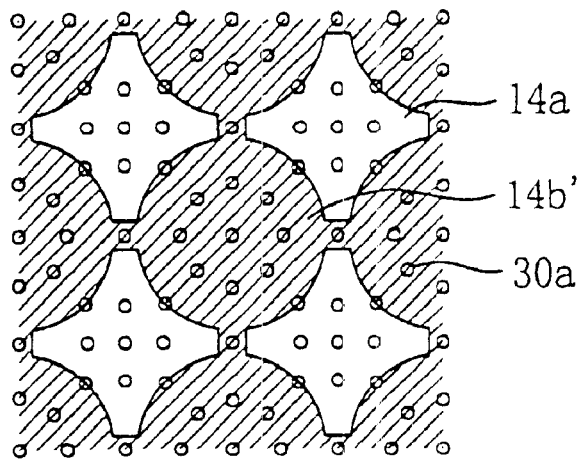
Figure 4B:
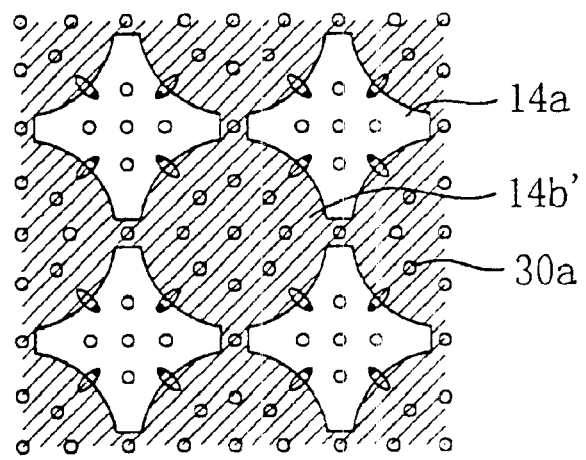
Figure 4C:
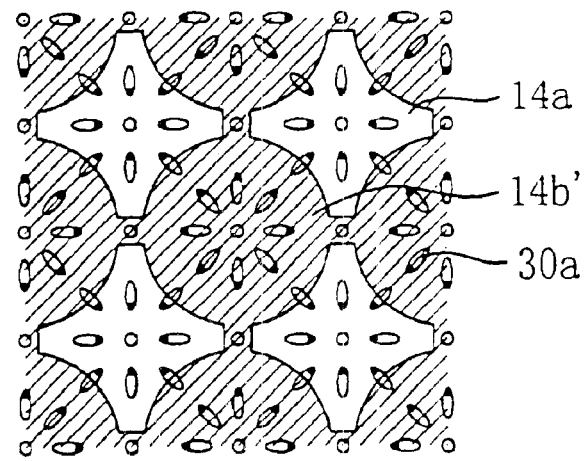

Each of FIG. 4A to FIG. 4C schematically illustrates an orientation of liquid crystal molecules in the liquid crystal display device 100 as viewed in a substrate normal direction.

Figure 5A:
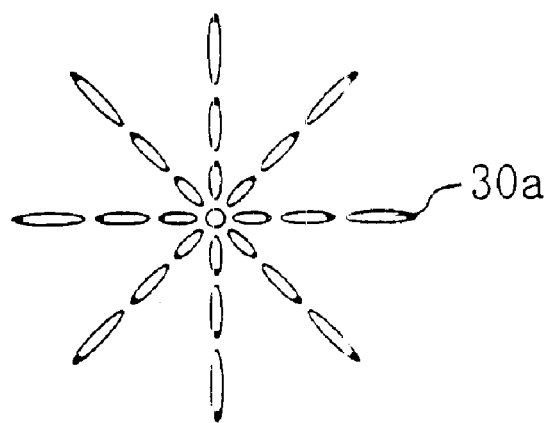
Figure 5B:
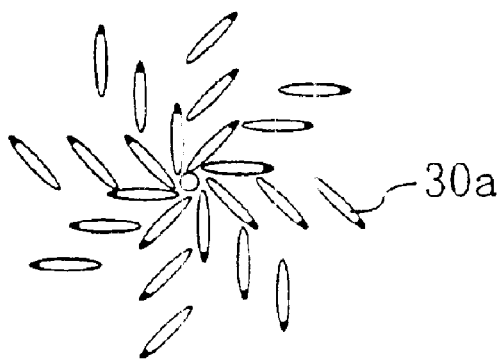
Figure 5C:
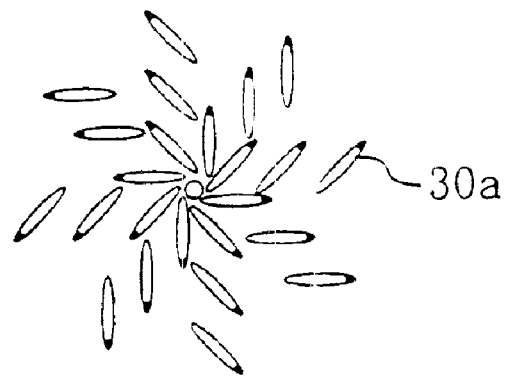

FIG. 5A to FIG. 5C schematically illustrate exemplary radially-inclined orientations of liquid crystal molecules.

Figure 6A:
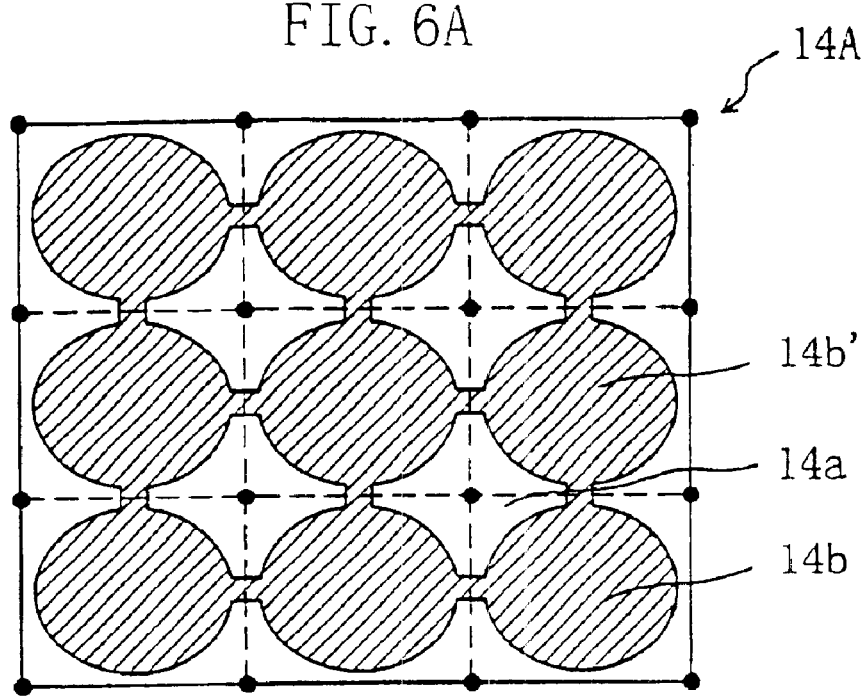
Figure 6B:
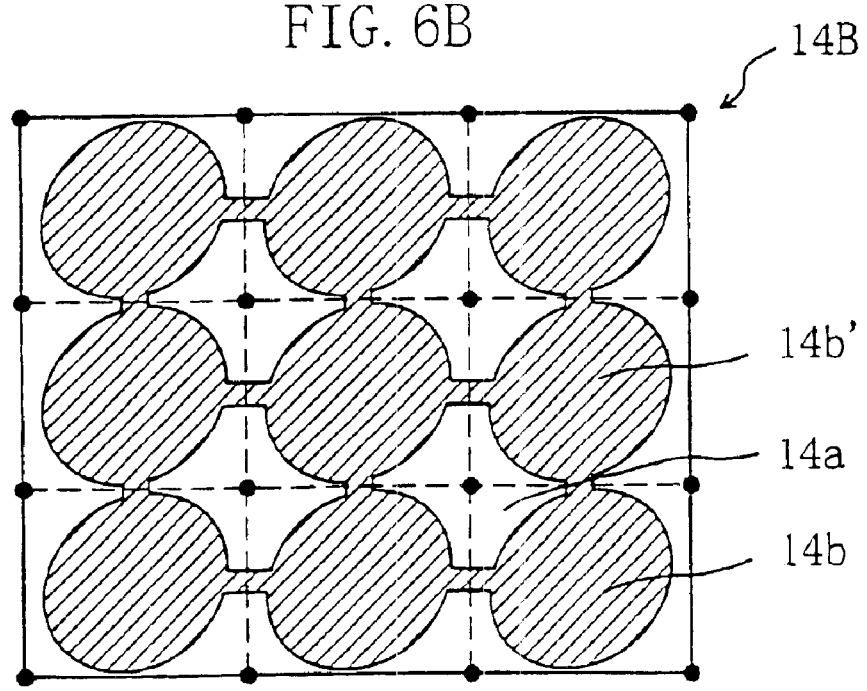

FIG. 6A and FIG. 6B are plan views schematically illustrating other picture element electrodes used in the liquid crystal display device of the present invention.

Figure 7A:
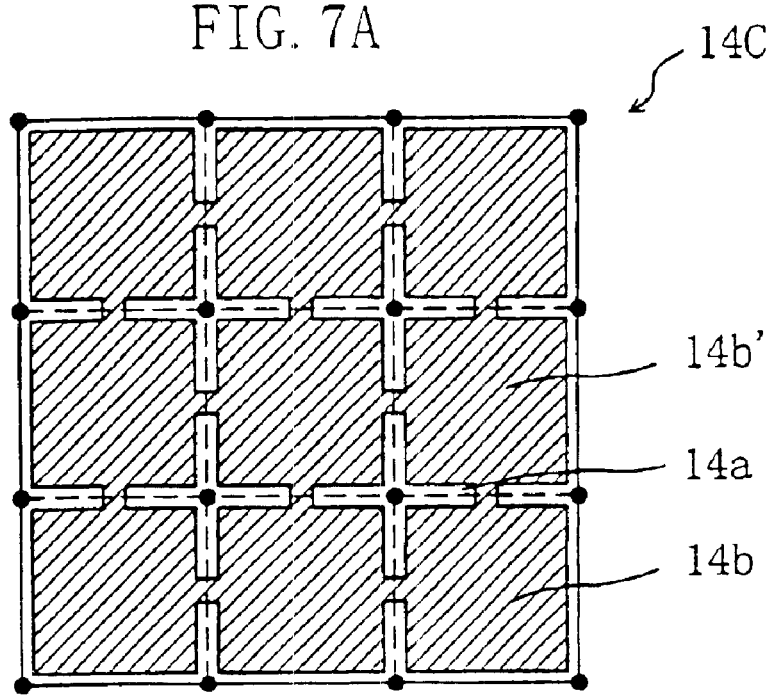
Figure 7B:
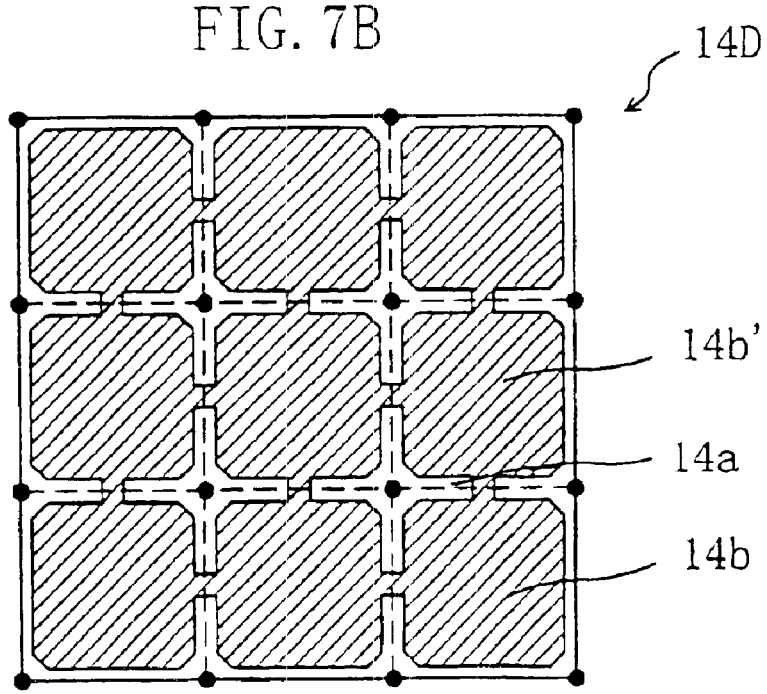

FIG. 7A and FIG. 7B are plan views schematically illustrating still other picture element electrodes used in the liquid crystal display device of the present invention.

Figure 8A:
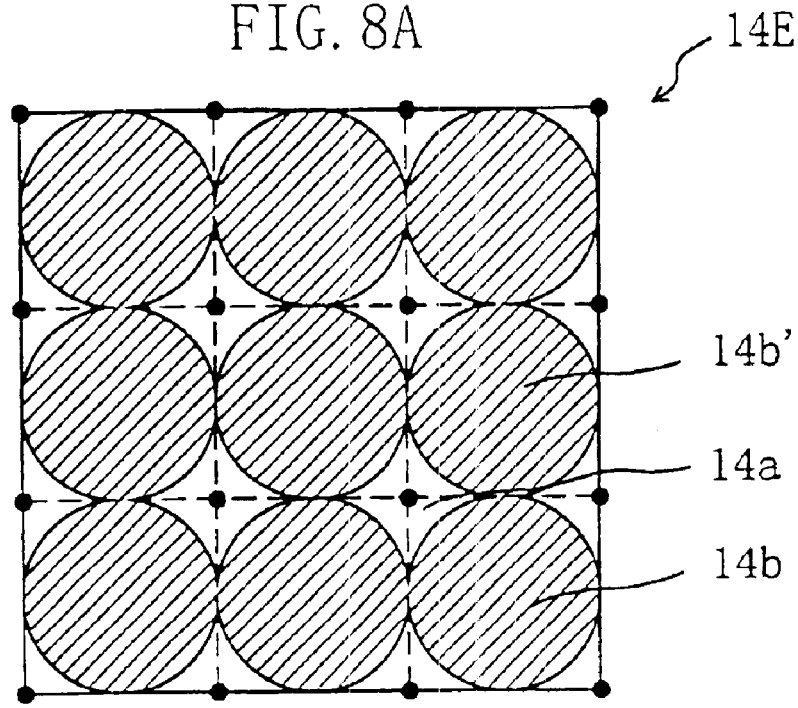
Figure 8B:
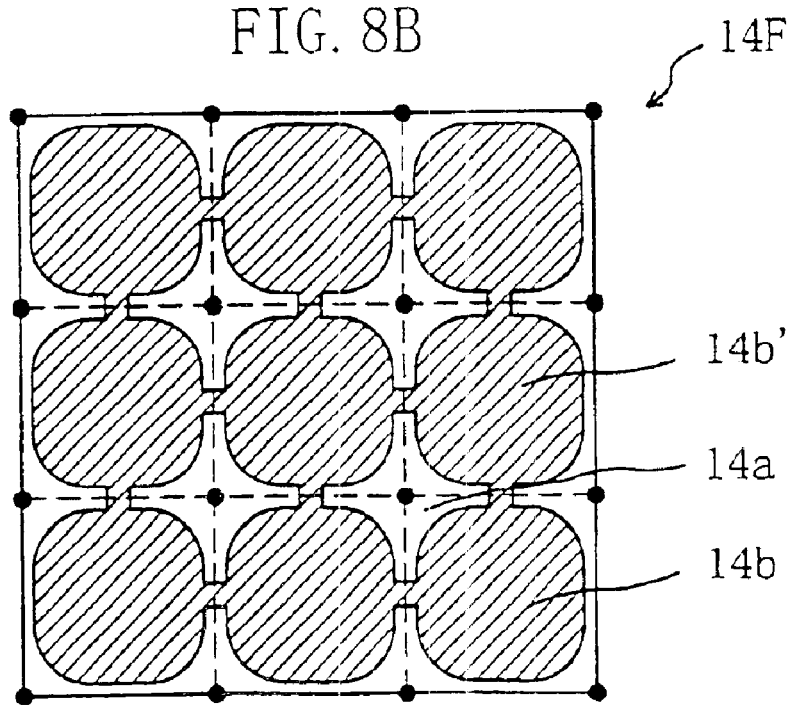

FIG. 8A FIG. 8B are plan views schematically illustrating still other picture element electrodes used in the liquid crystal display device of the present invention.

Figure 9A:
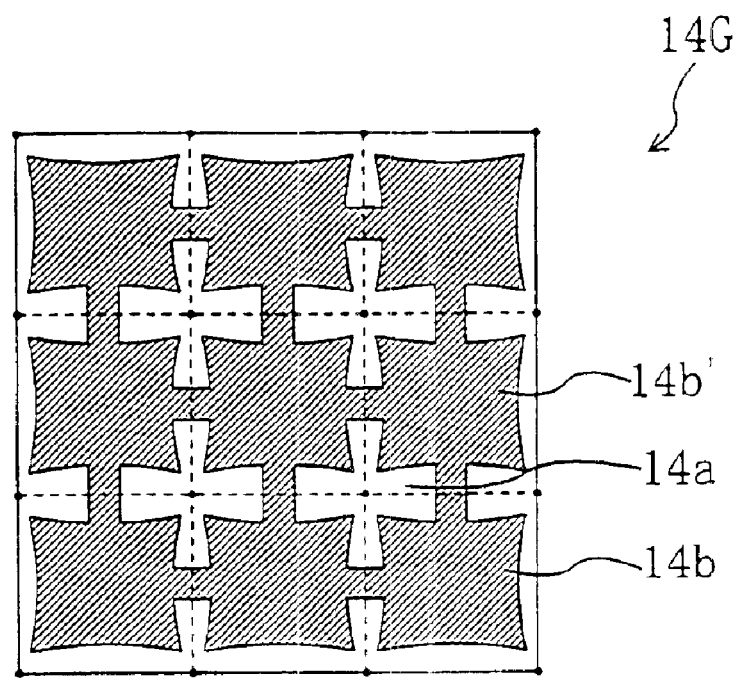
Figure 9B:
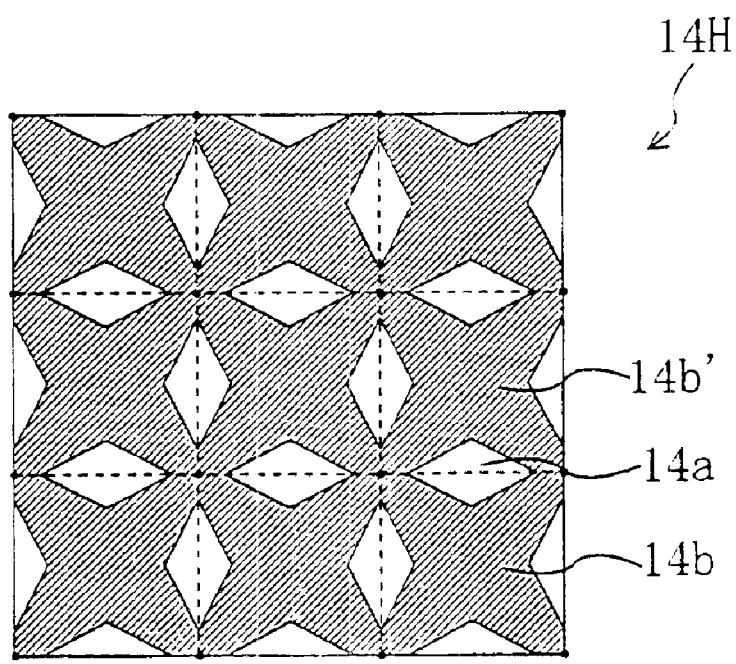

FIG. 9A and FIG. 9B are plan views schematically illustrating still other picture element electrodes used in the liquid crystal display device of the present invention.

Figure 10A:
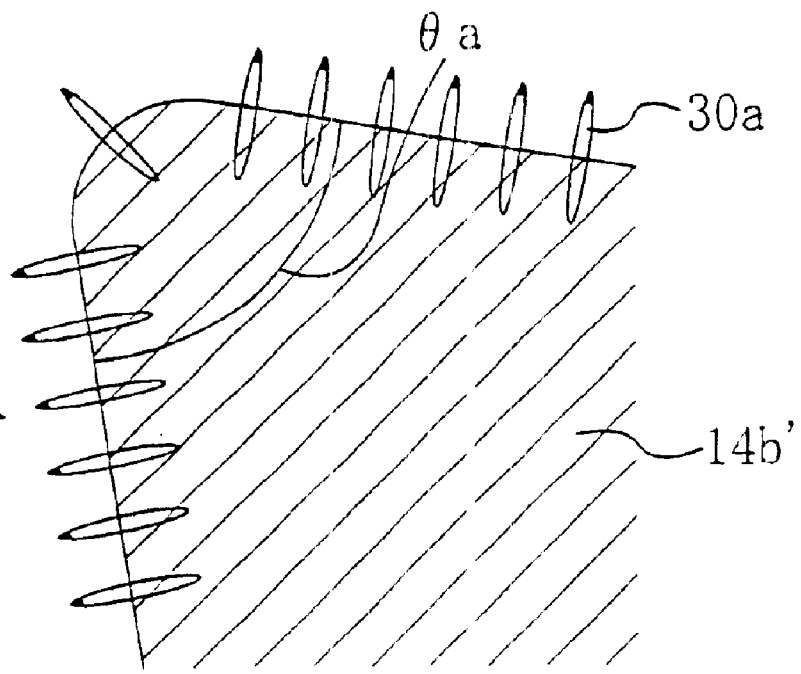
Figure 10B:
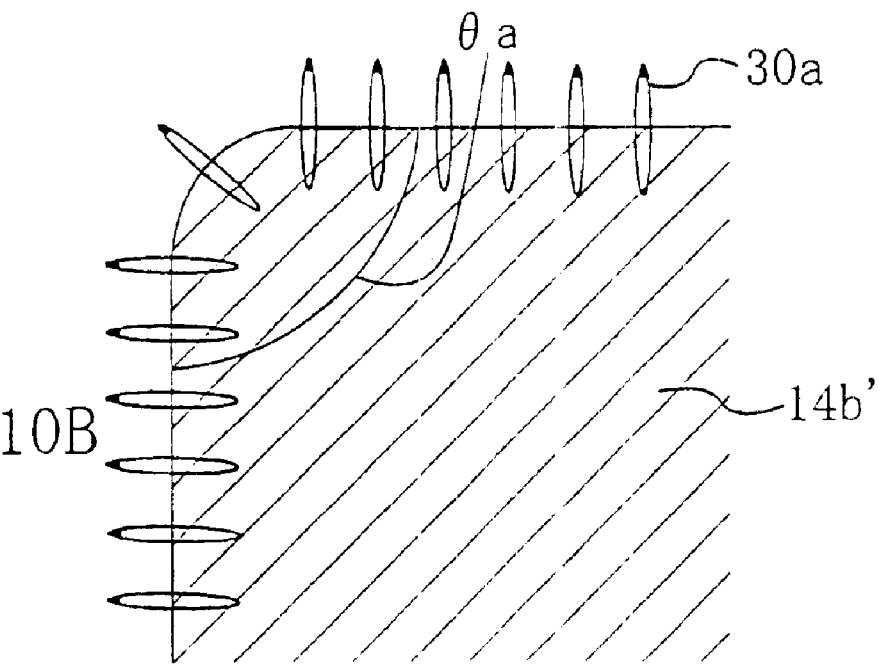

FIG. 10A and FIG. 10B are plan views each schematically illustrating a corner of a unit solid portion of a picture element electrode used in the liquid crystal display device of the present invention.

Figure 11A:
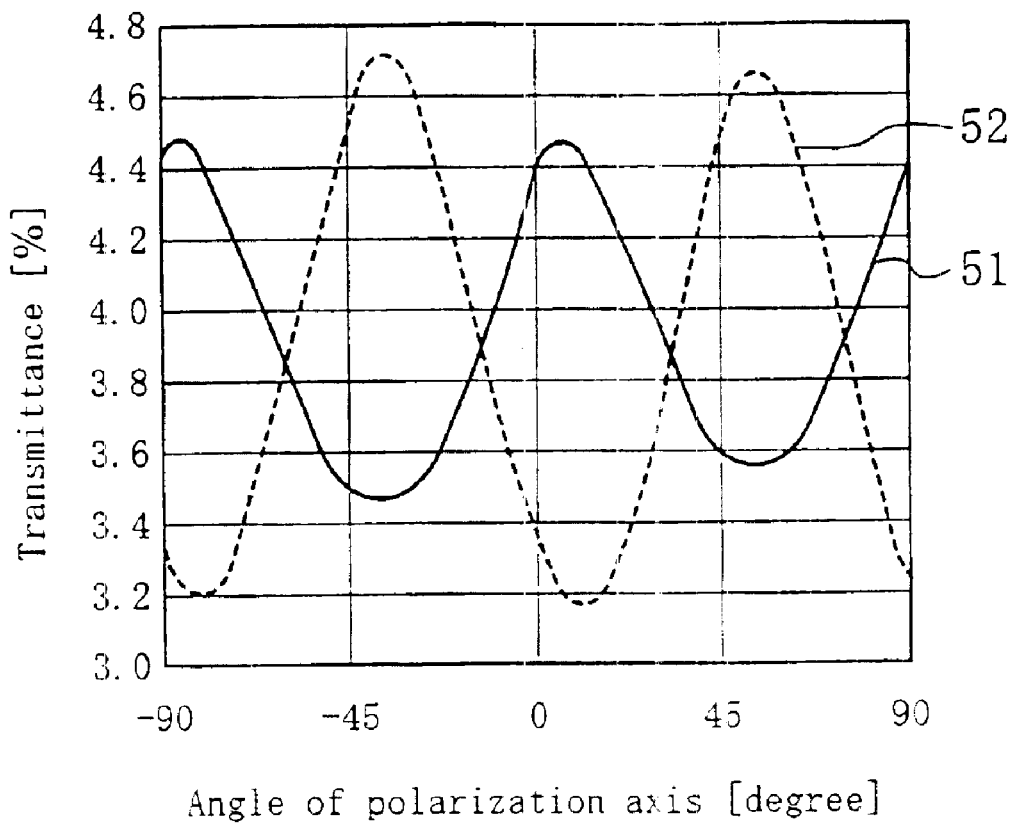
Figure 11B:
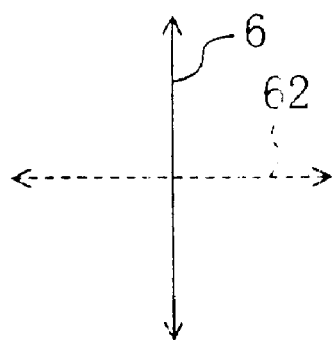

FIG. 11A is a graph illustrating a change in the transmittance with respect to the angle of a polarization axis of a polarization plate in a liquid crystal display device having a picture element electrode illustrated in FIG. 8B and in a liquid crystal display device having a picture element electrode illustrated in FIG. 9B, and FIG. 11B schematically illustrates an arrangement of the polarization axis corresponding to 0°.

Figure 12:
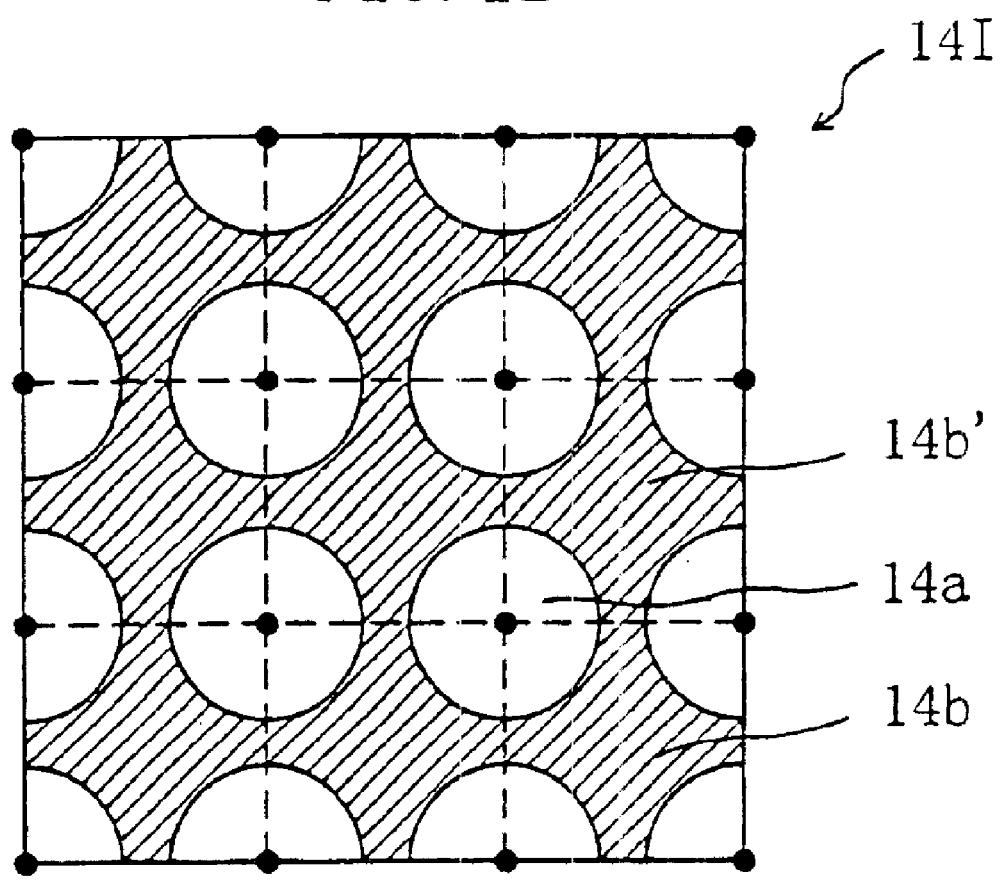

FIG. 12 is a plan view schematically illustrating still another picture element electrode used in the liquid crystal display device of the present invention.

Figure 13A:
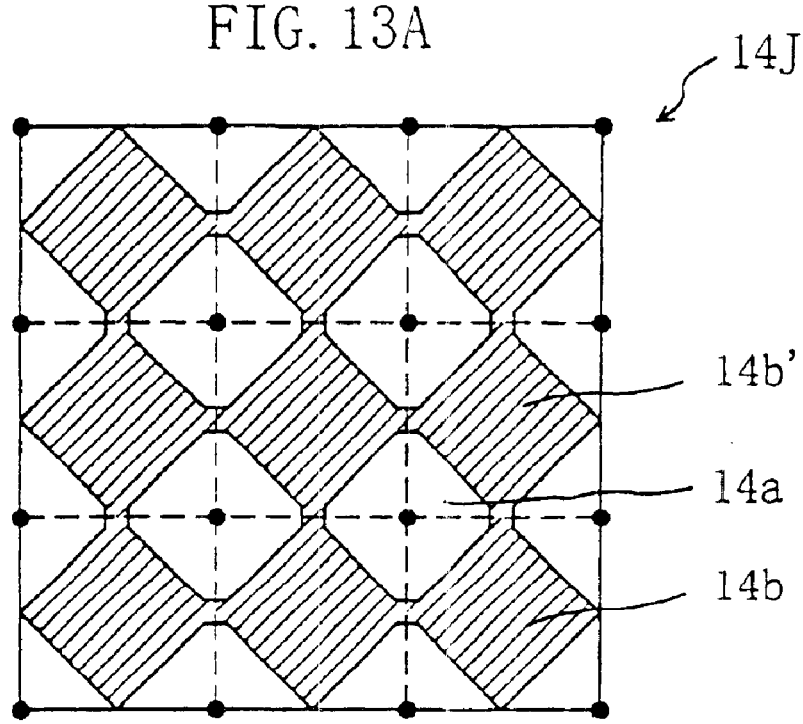
Figure 13B:
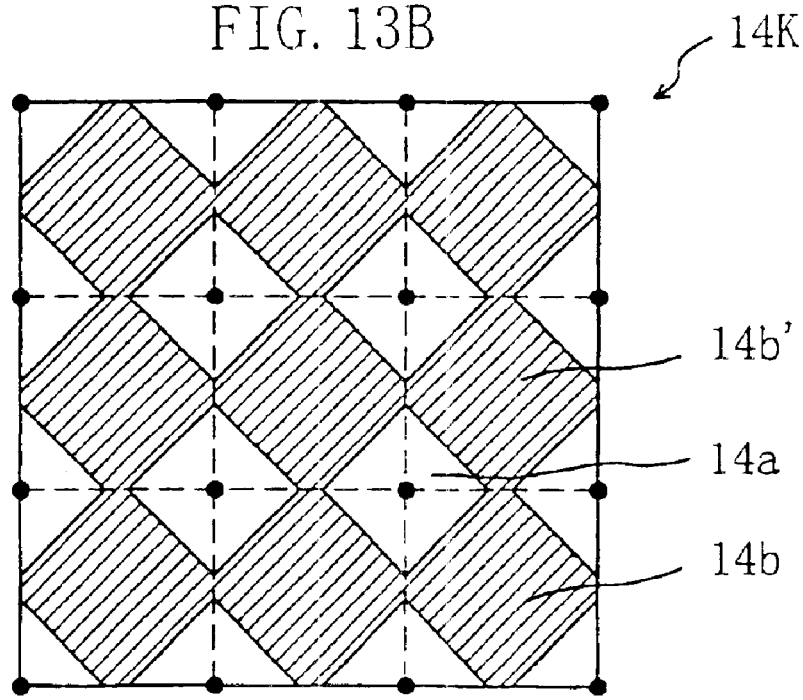

FIG. 13A and FIG. 13B are plan views schematically illustrating still other picture element electrodes used in the liquid crystal display device of the present invention.

Figure 1A:
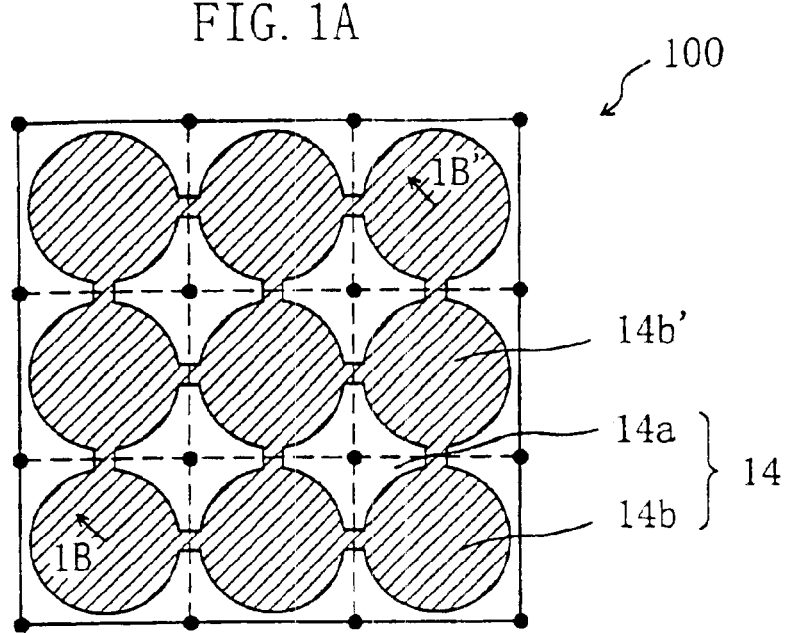
Figure 14A:
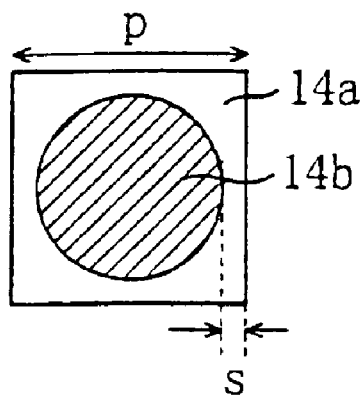
Figure 14B:
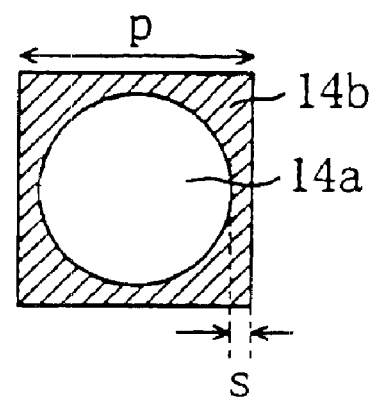
Figure 14C:
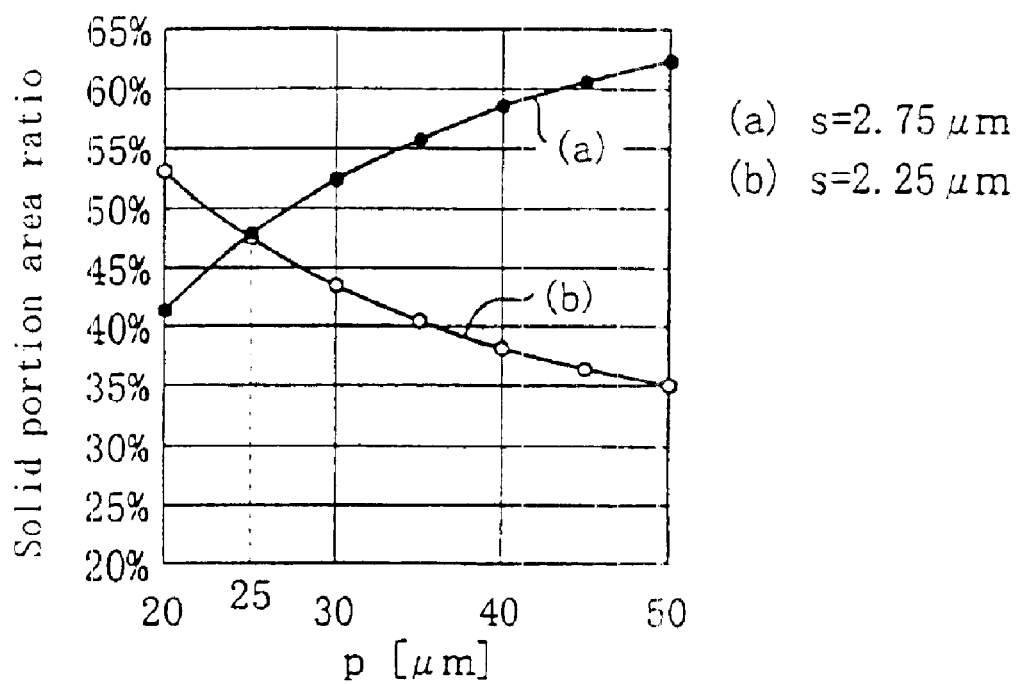

FIG. 14A schematically illustrates a unit lattice of the pattern illustrated in FIG. 1A, FIG. 14B schematically illustrates a unit lattice of the pattern illustrated in FIG. 12, and FIG. 14C is a graph illustrating the relationship between a pitch p and a solid portion area ratio.

Figure 15A:
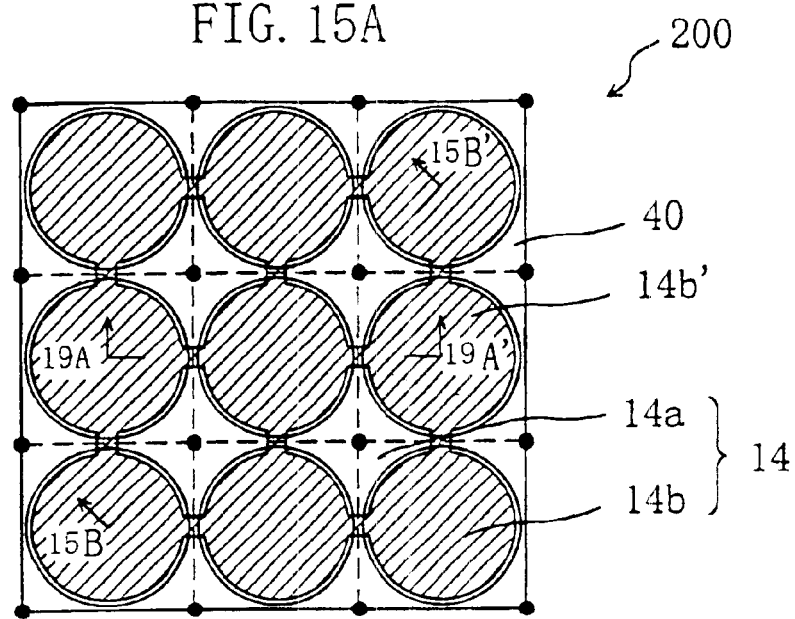
Figure 15B:
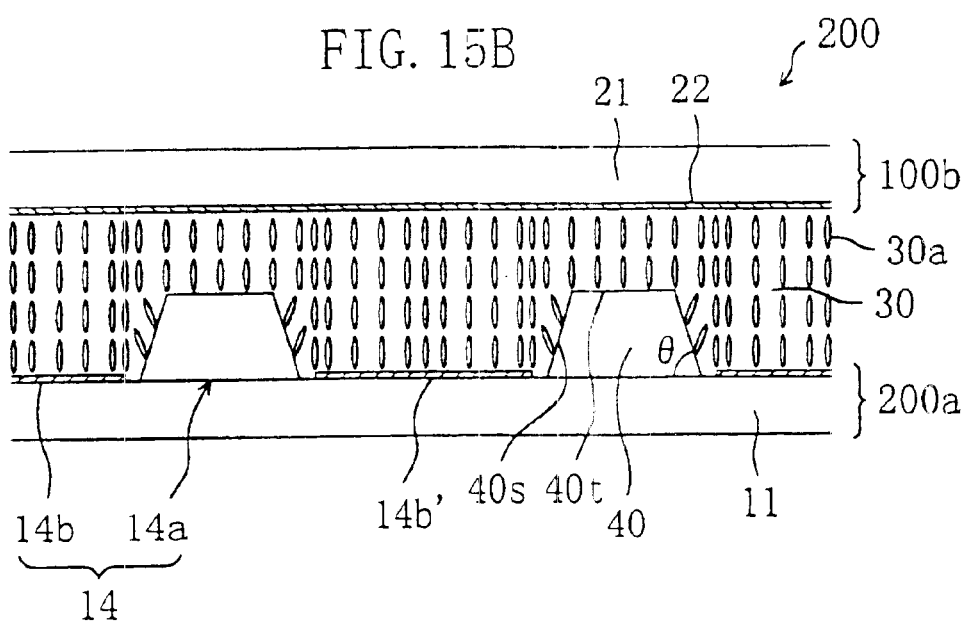

FIG. 15A and FIG. 15B schematically illustrate a structure of one picture element region of a liquid crystal display device 200 having a first orientation-regulating structure of the present invention, wherein FIG. 15A is a plan view, and FIG. 15B is a cross-sectional view taken along line 15B–15B' of FIG. 15A.

FIG. 16A to FIG. 16D schematically illustrate the relationship between an orientation of liquid crystal molecules 30a and a surface configuration having a vertical alignment power.

Figure 17A:
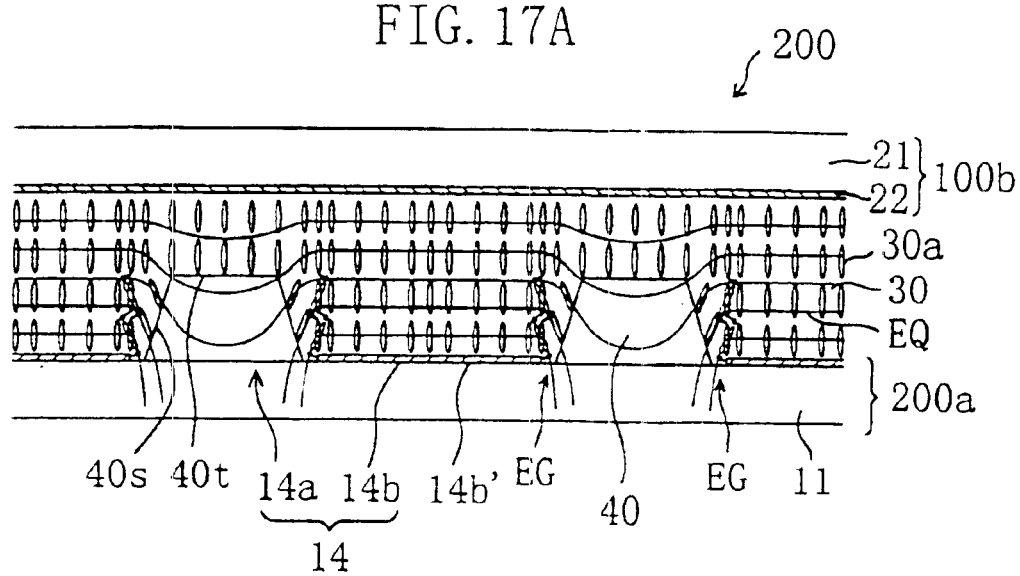
Figure 17B:
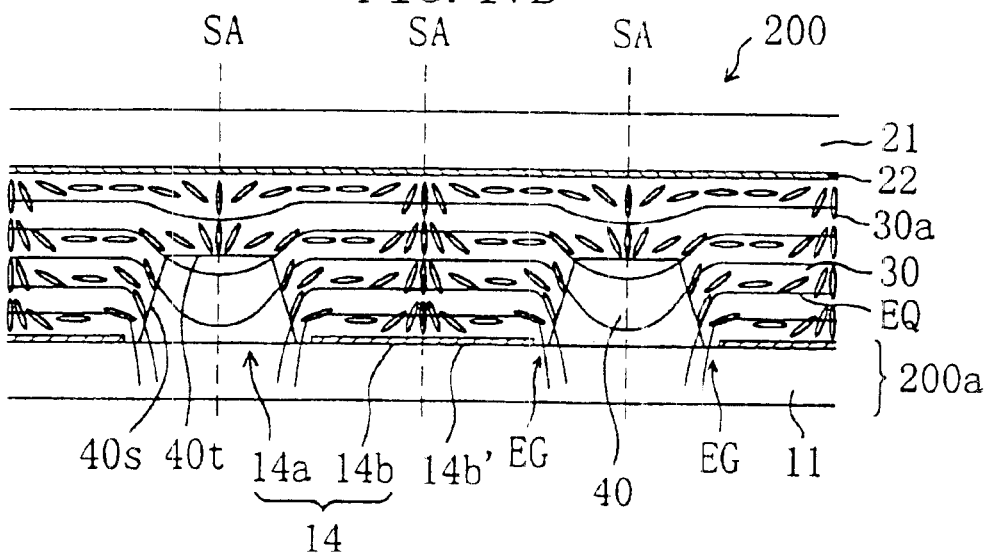

FIG. 17A and FIG. 17B illustrate a state in the presence of an applied voltage across a liquid crystal layer 30 of the liquid crystal display device 200, wherein FIG. 17A schematically illustrates a state where an orientation has just started to change (initial ON state), and FIG. 17B schematically illustrates a steady state.

Figure 18A:
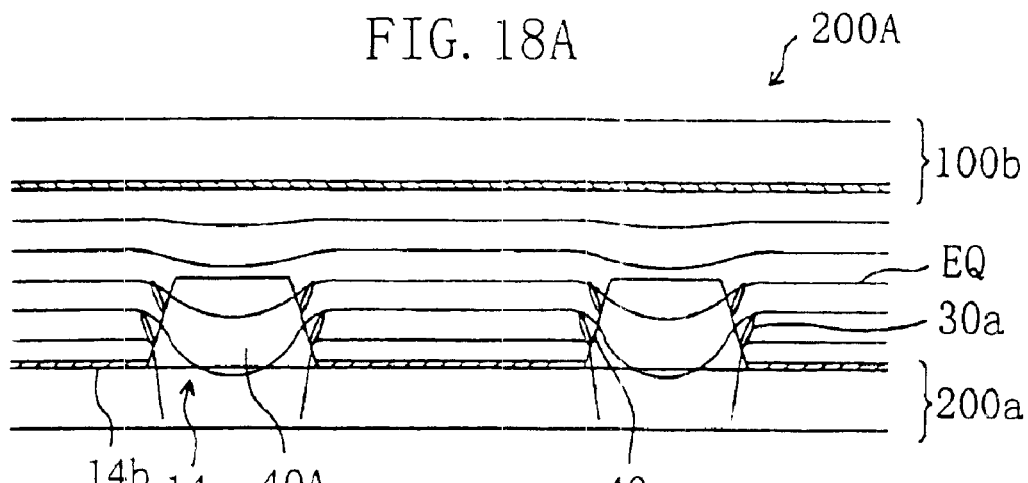
Figure 18B:
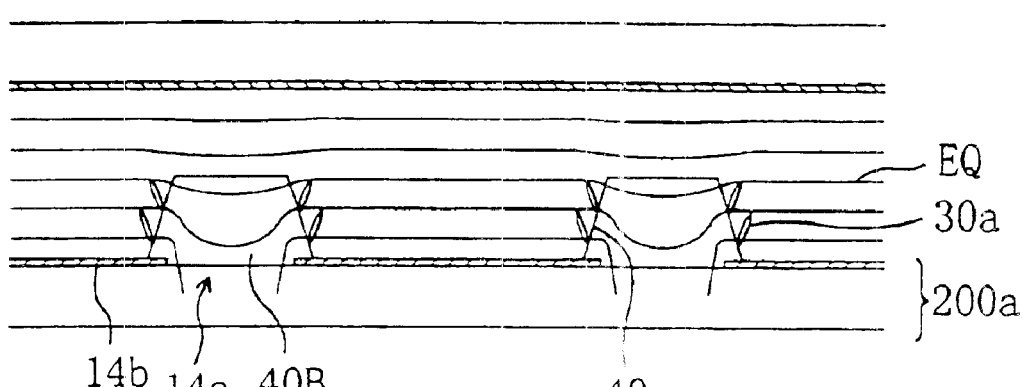
Figure 18C:
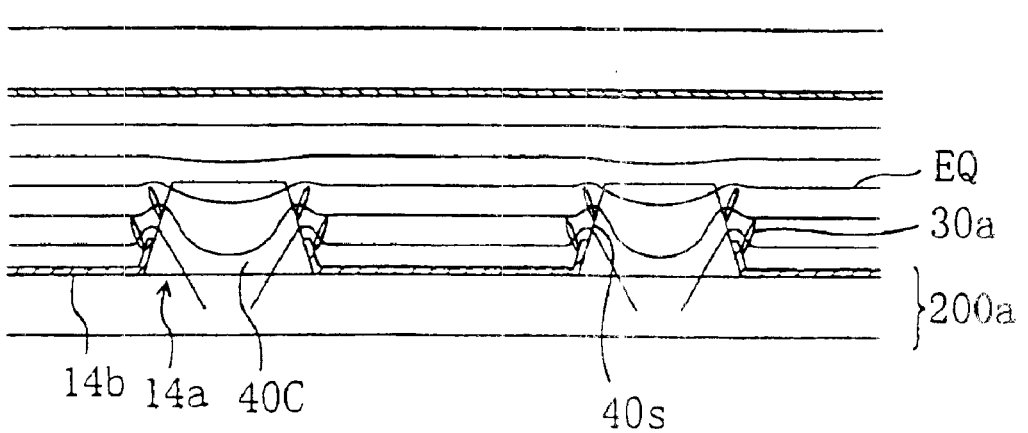

FIG. 18A to FIG. 18C are cross-sectional views schematically illustrating liquid crystal display devices 200A, 200B and 200C, respectively, having different positional relationships between an opening and a protrusion.

Figure 19:
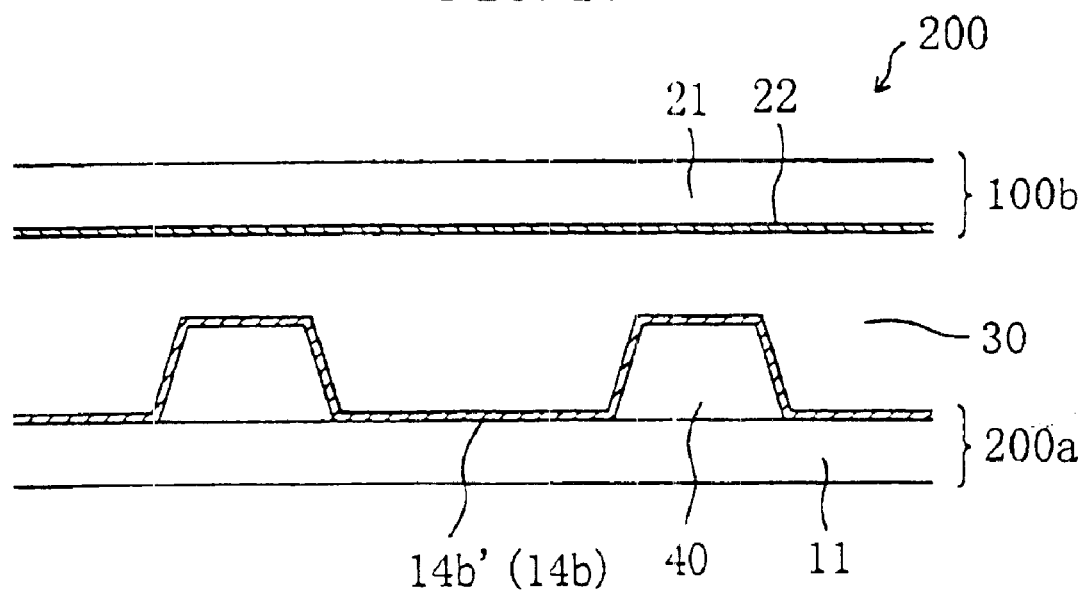

FIG. 19 is a cross-sectional view schematically illustrating the liquid crystal display device 200 taken along line 19A–19A' of FIG. 15A.

Figure 20A:
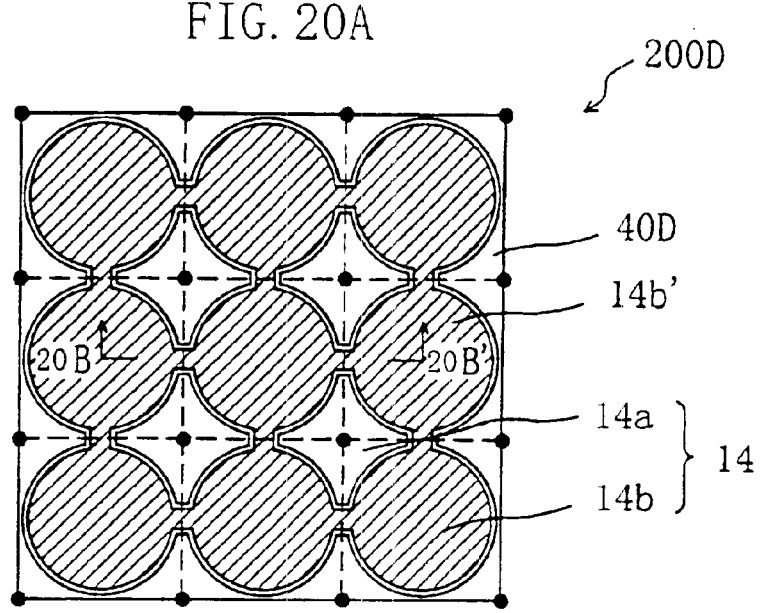
Figure 20B:
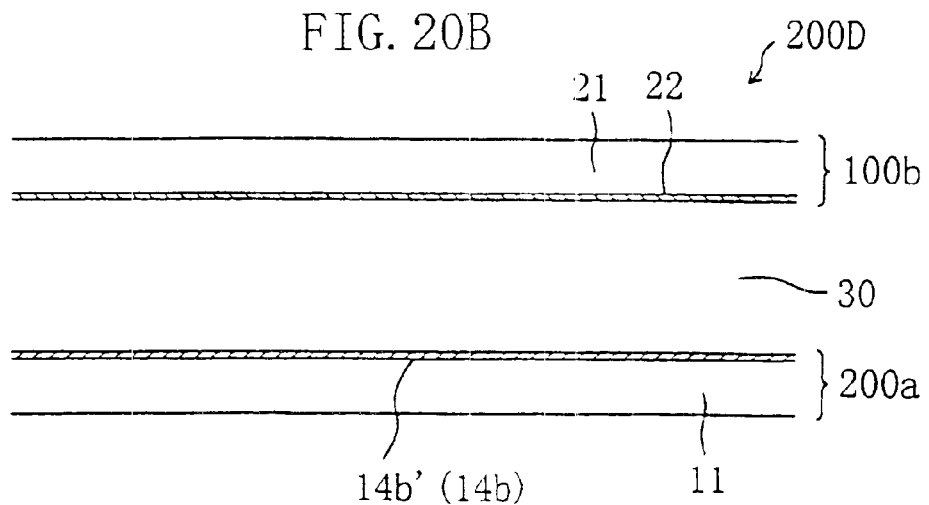

FIG. 20A and FIG. 20B schematically illustrate a structure of one picture element region of a liquid crystal display device 200D, wherein FIG. 20A is a plan view, and FIG. 20B is a cross-sectional view taken along line 20B–20B, of FIG. 20A.

Figure 21A:
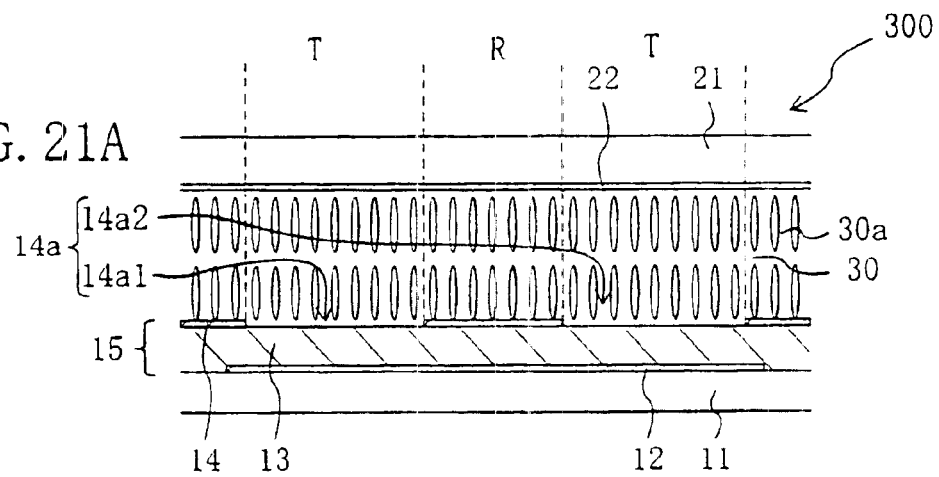
Figure 21B:
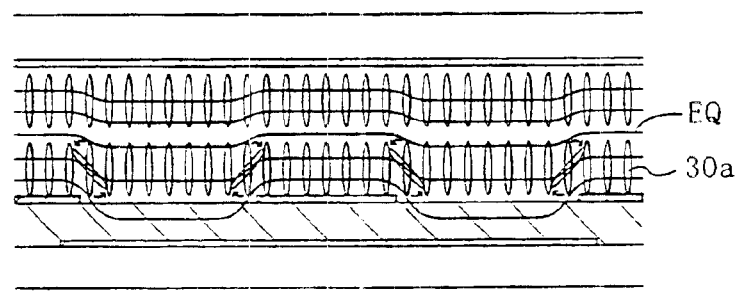
Figure 21C:
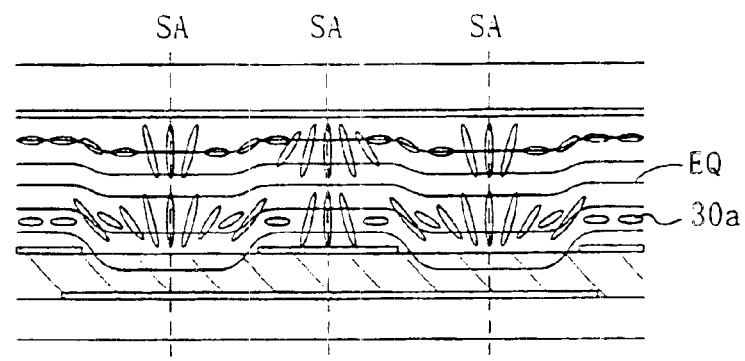

FIG. 21A to FIG. 21C are cross-sectional views schematically illustrating one picture element region of a liquid crystal display device 300 having a two-layer electrode, wherein FIG. 21A illustrates a state in the absence of an applied voltage, FIG. 21B illustrates a state where an orientation has just started to change (initial ON state), and FIG. 21C illustrates a steady state.

Figure 22A:
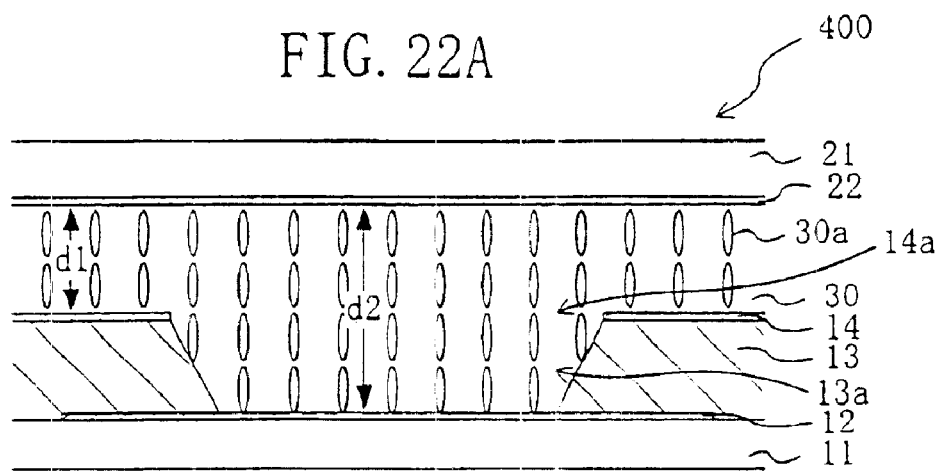
Figure 22B:
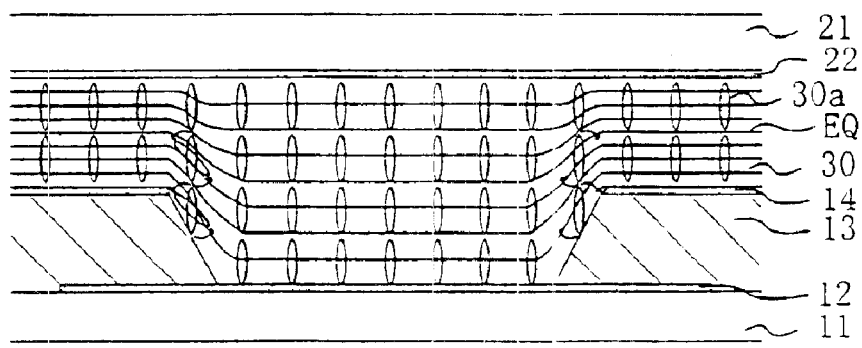
Figure 22C:
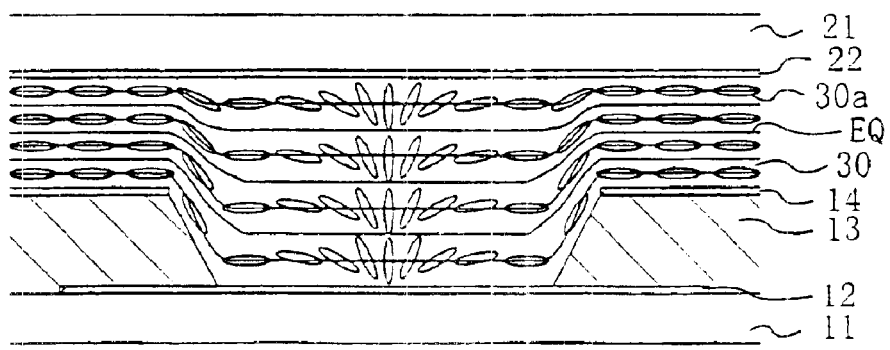

FIG. 22A to FIG. 22C are cross-sectional views schematically illustrating one picture element region of another liquid crystal display device 400 having a two-layer electrode, wherein FIG. 22A illustrates a state in the absence of an applied voltage, FIG. 22B illustrates a state where an orientation has just started to change (initial ON state), and FIG. 22C illustrates a steady state.

Figure 23:
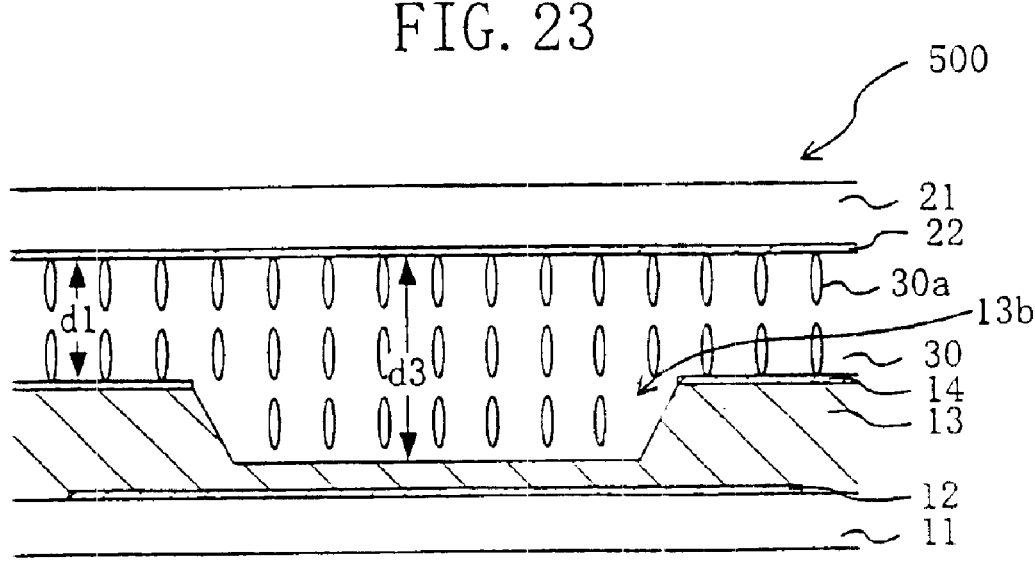

FIG. 23 is a cross-sectional view schematically illustrating one picture element region of still another liquid crystal display device 500 having a two-layer electrode.

FIG. 24A to FIG. 24E each schematically illustrate a counter substrate 600b including a second orientation-regulating structure 28.

Figure 25A:
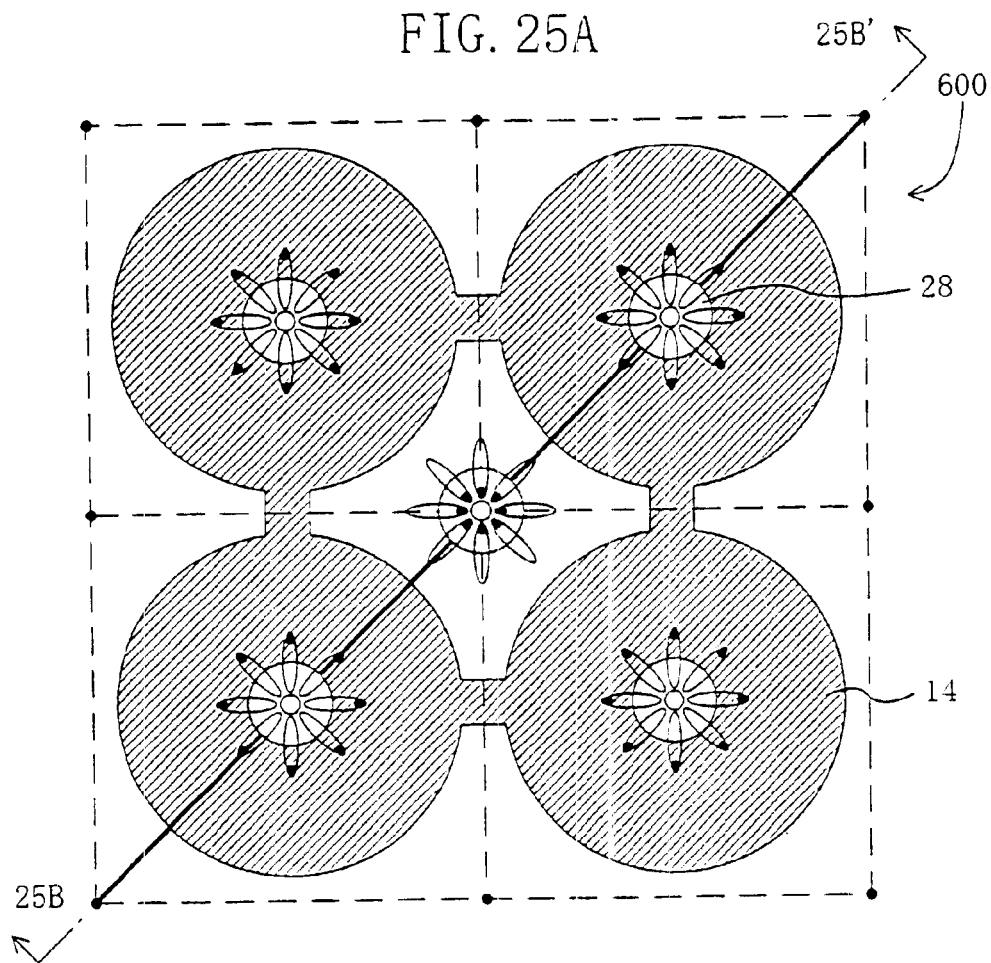
Figure 25B:
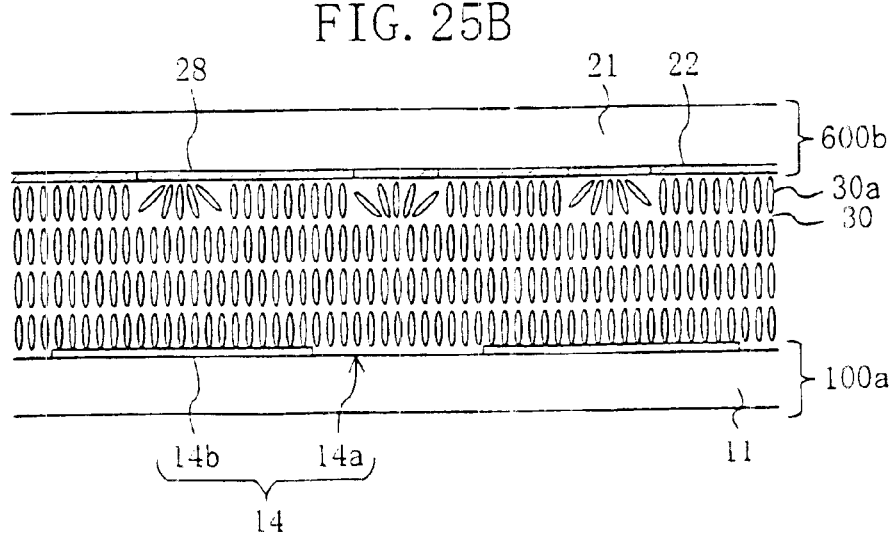

FIG. 25A and FIG. 25B schematically illustrate a liquid crystal display device 600 including a first orientation-regulating structure and a second orientation-regulating structure, wherein FIG. 25A is a plan view, and FIG. 25B is a cross-sectional view taken along line 25B–25B' of FIG. 25A.

Figure 26A:
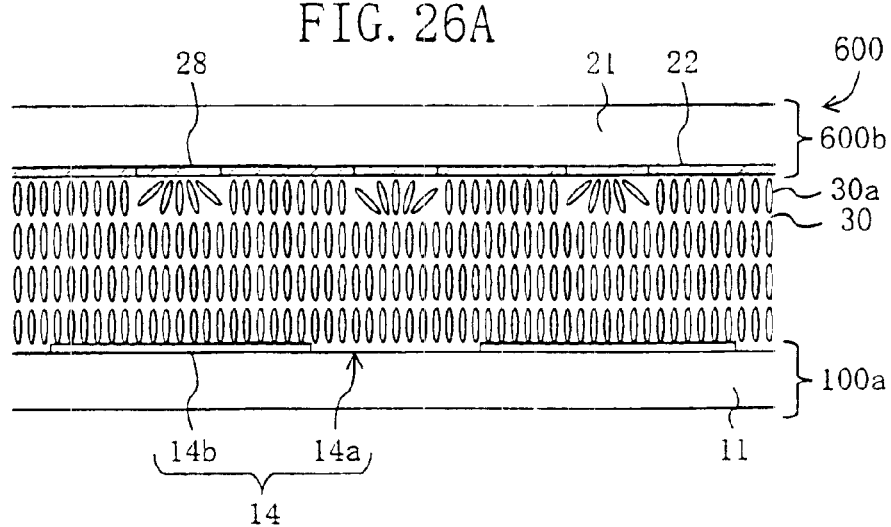
Figure 26B:
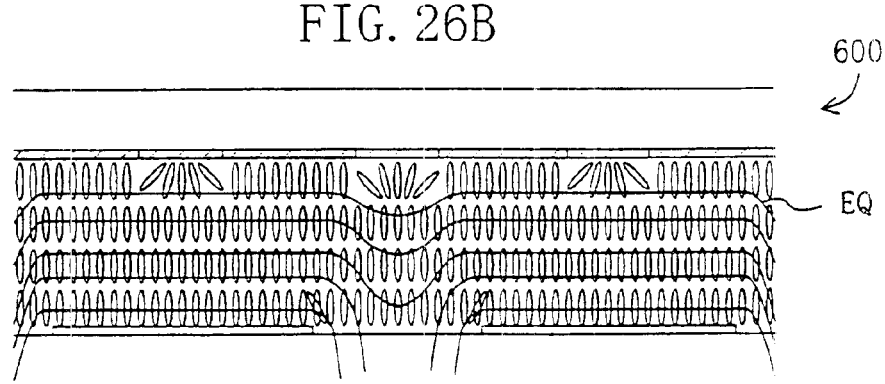
Figure 26C:
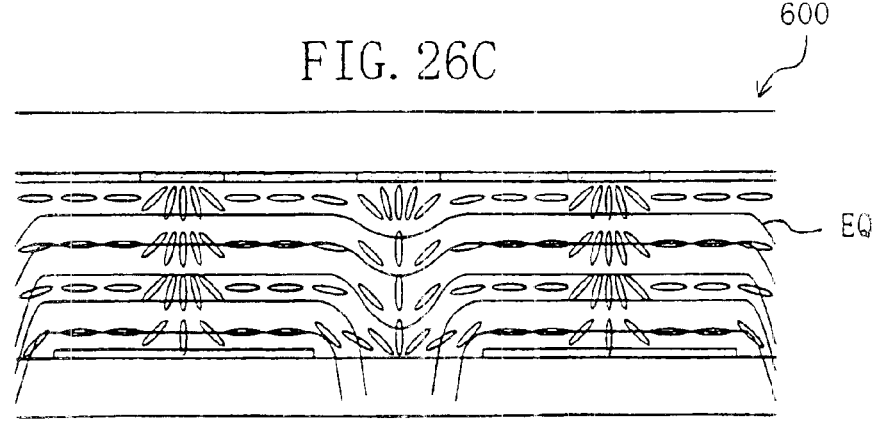

FIG. 26A to FIG. 26C are cross-sectional views schematically illustrating one picture element region of the liquid crystal display device 600, wherein FIG. 26A illustrates a state in the absence of an applied voltage, FIG. 26B illustrates a state where an orientation has just started to change (initial ON state), and FIG. 26C illustrates a steady state.

Figure 27A:
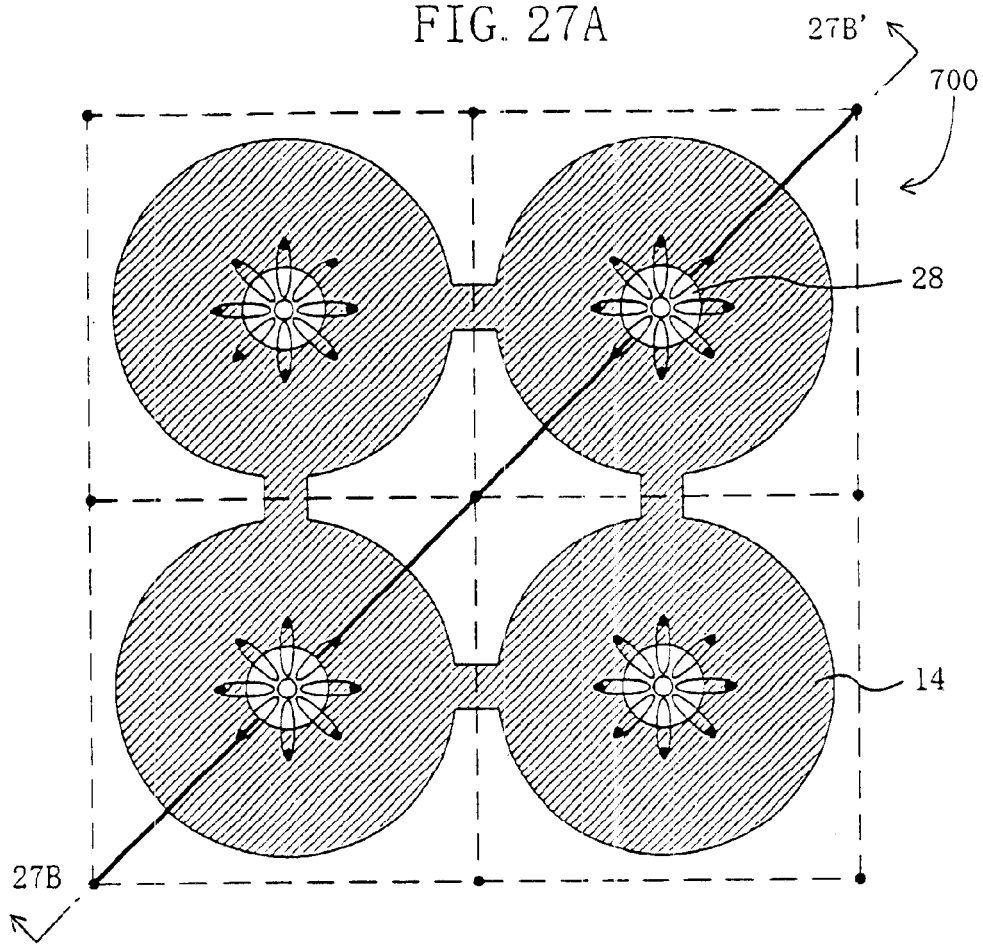
Figure 27B:
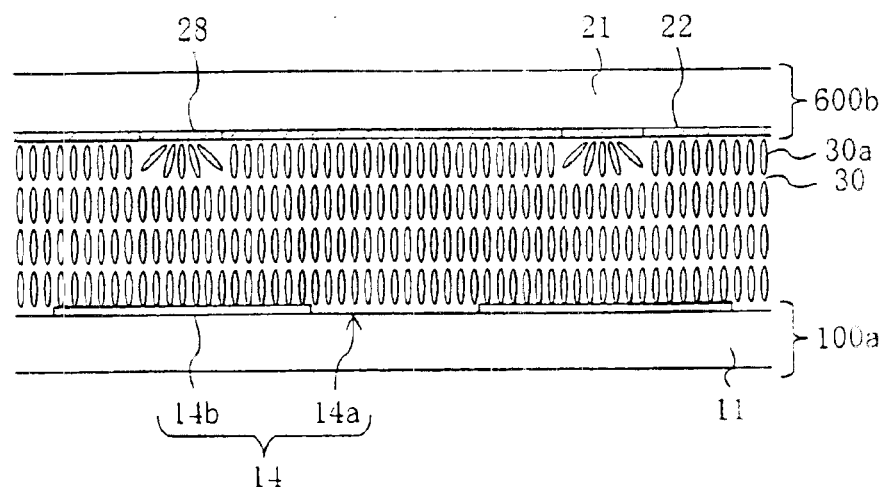

FIG. 27A and FIG. 27B schematically illustrate another liquid crystal display device 700 including a first orientation-regulating structure and a second orientation-regulating structure, wherein FIG. 27A is a plan view, and FIG. 27B is a cross-sectional view taken along line 27B–27B' of FIG. 27A.

Figure 28A:
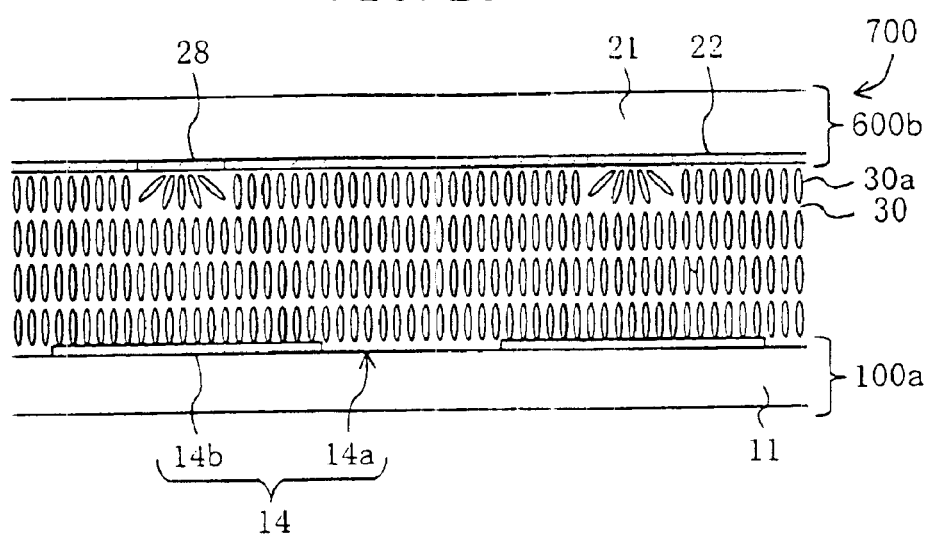
Figure 28B:
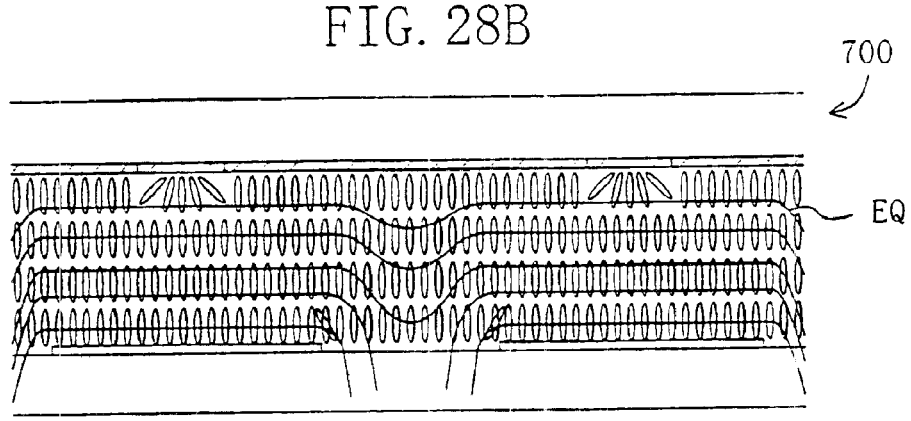
Figure 28C:
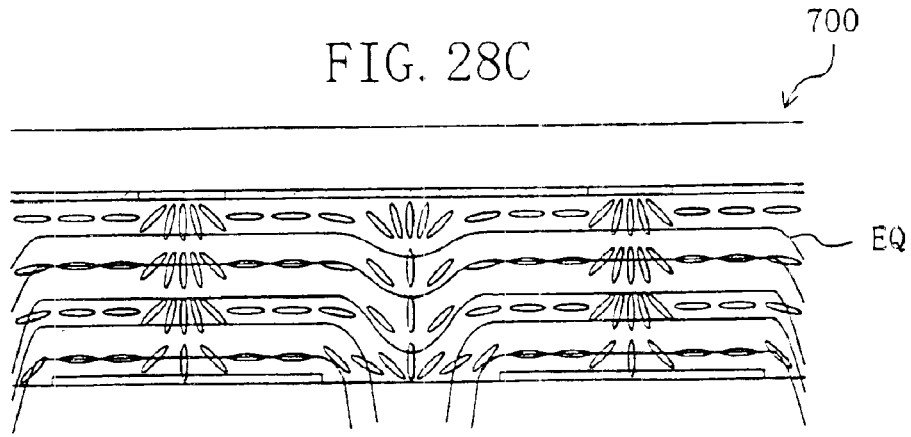

FIG. 28A to FIG. 28C are cross-sectional views schematically illustrating one picture element region of the liquid crystal display device 700, wherein FIG. 28A illustrates a state in the absence of an applied voltage, FIG. 28B illustrates a state where an orientation has just started to change (initial ON state), and FIG. 28C illustrates a steady state.

Figure 29A:
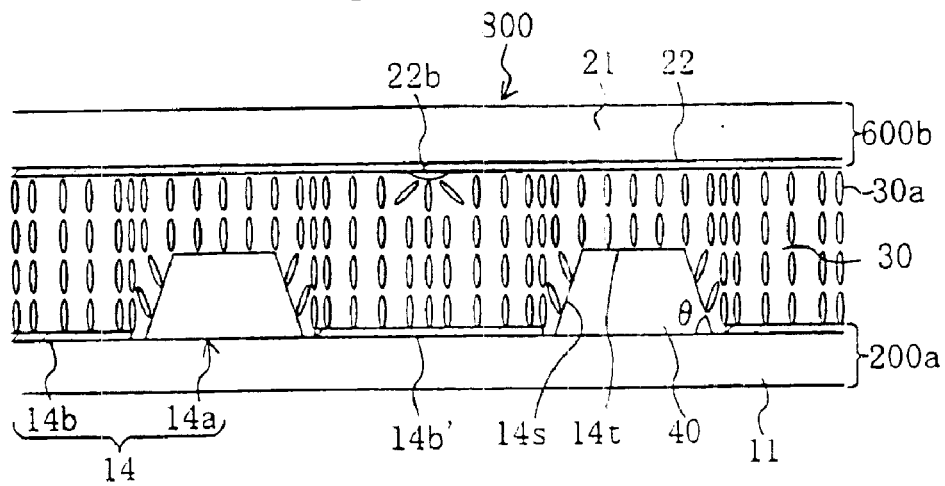
Figure 29B:
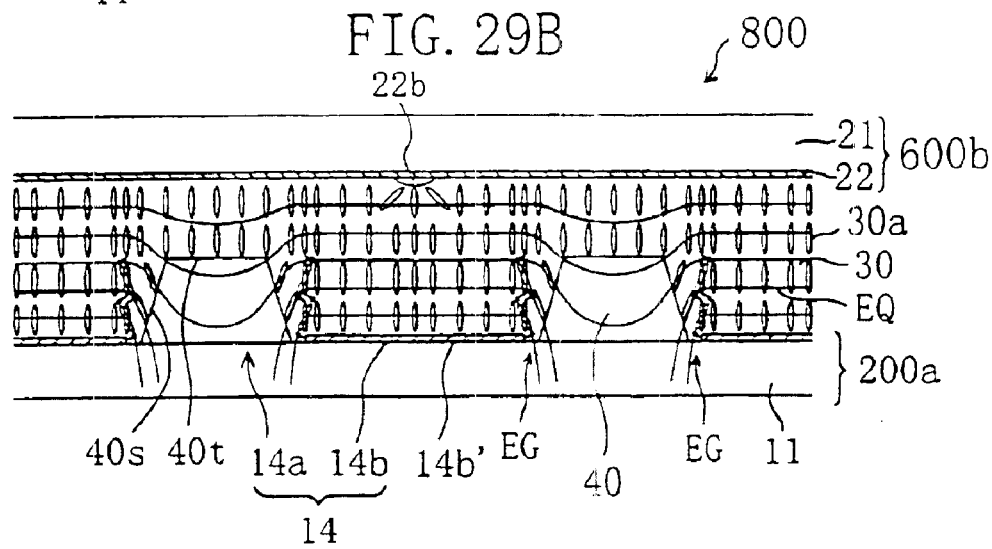
Figure 29C:
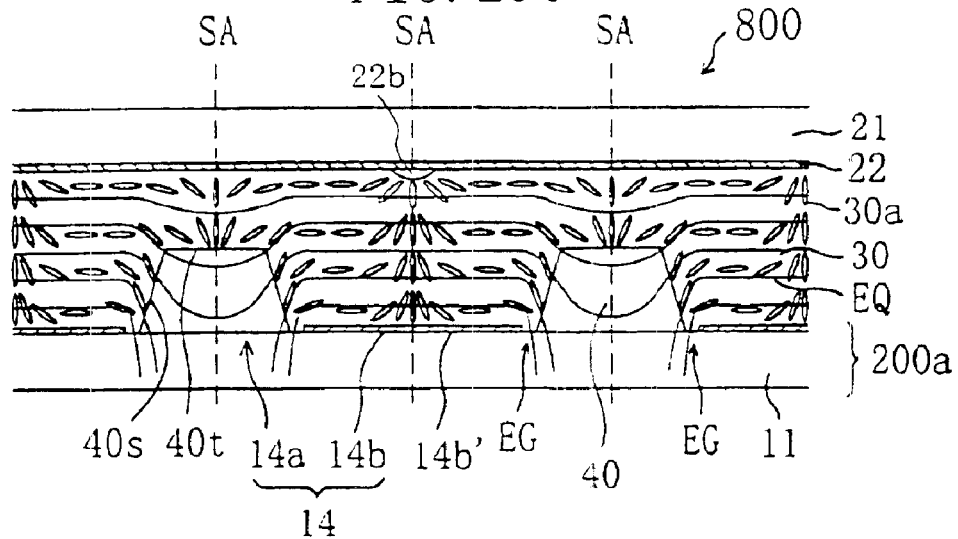

FIG. 29A to FIG. 29C are cross-sectional views schematically illustrating one picture element region of still another liquid crystal display device 800 including a first orientation-regulating structure and a second orientation-regulating structure, wherein FIG. 29A illustrates a state in the absence of an applied voltage, FIG. 29B illustrates a state where an orientation has just started to change (initial ON state), and FIG. 29C illustrates a steady state.

Figure 30A:
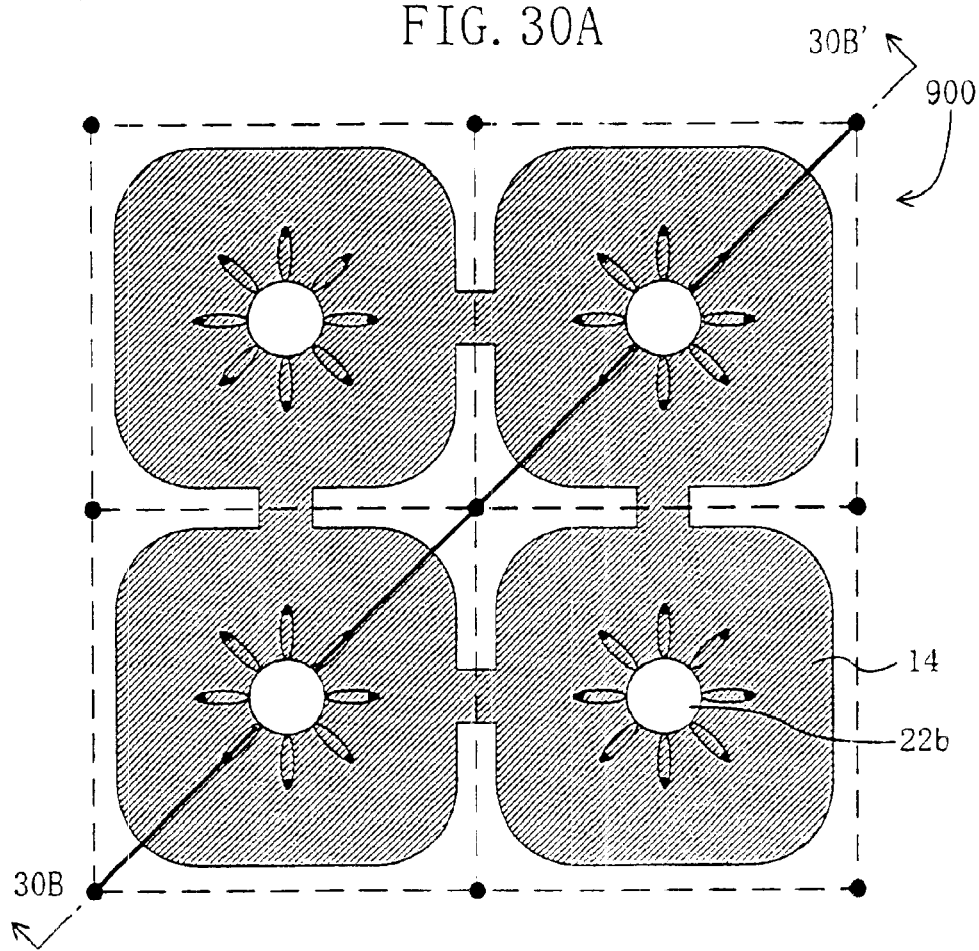
Figure 30B:
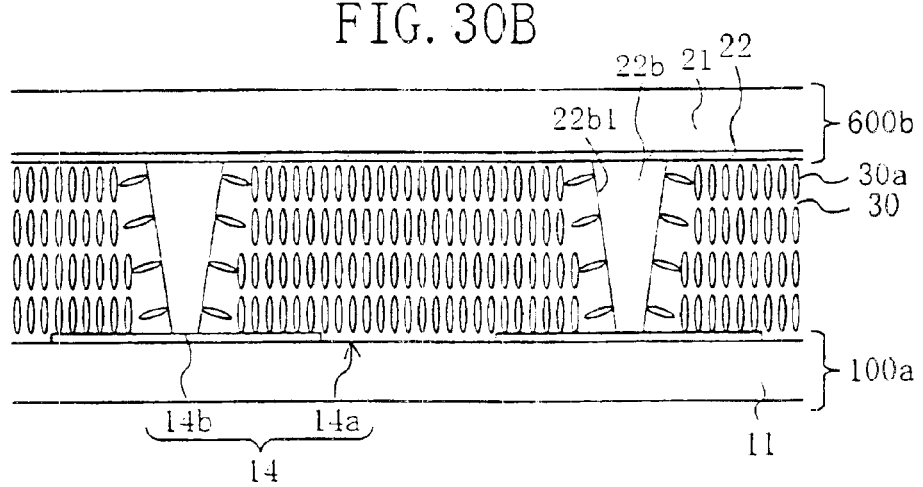

FIG. 30A and FIG. 30B schematically illustrate a liquid crystal display device 900 including a protrusion that functions as a spacer, wherein FIG. 30A is a plan view, and FIG. 30B is a cross-sectional view taken along line 30B–30B' of FIG. 30A.

Figure 31A:
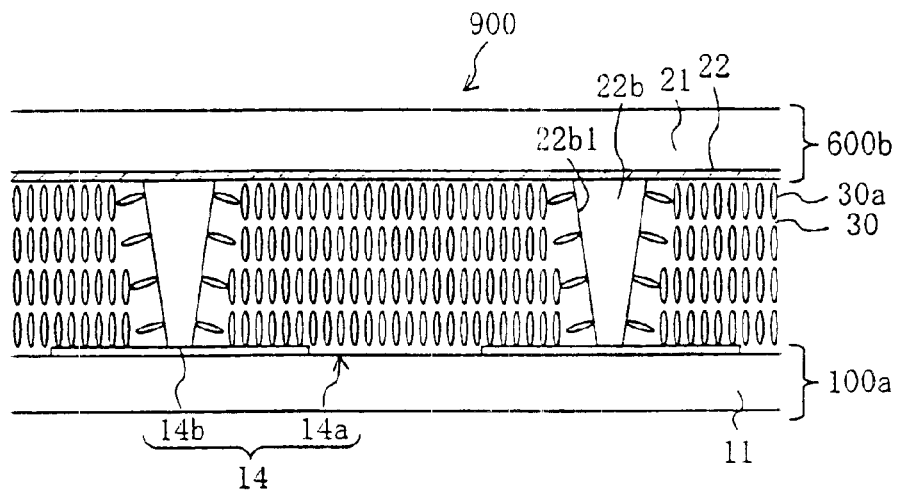
Figure 31B:
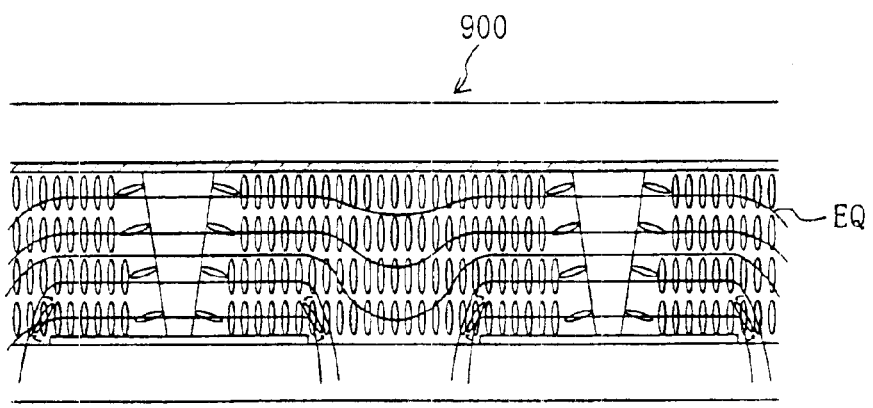
Figure 31C:
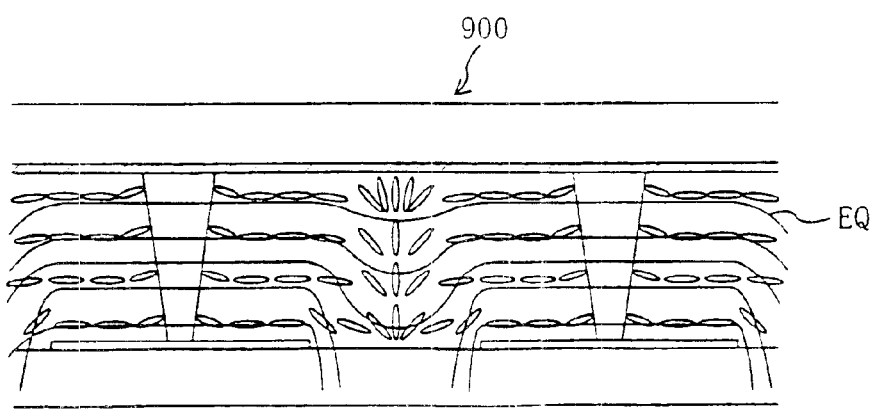

FIG. 31A to FIG. 31C are cross-sectional views schematically illustrating one picture element region of the liquid crystal display device 900, wherein FIG. 31A illustrates a state in the absence of an applied voltage, FIG. 31B illustrates a state where an orientation has just started to change (initial ON state), and FIG. 31C illustrates a steady state.

Figure 32:
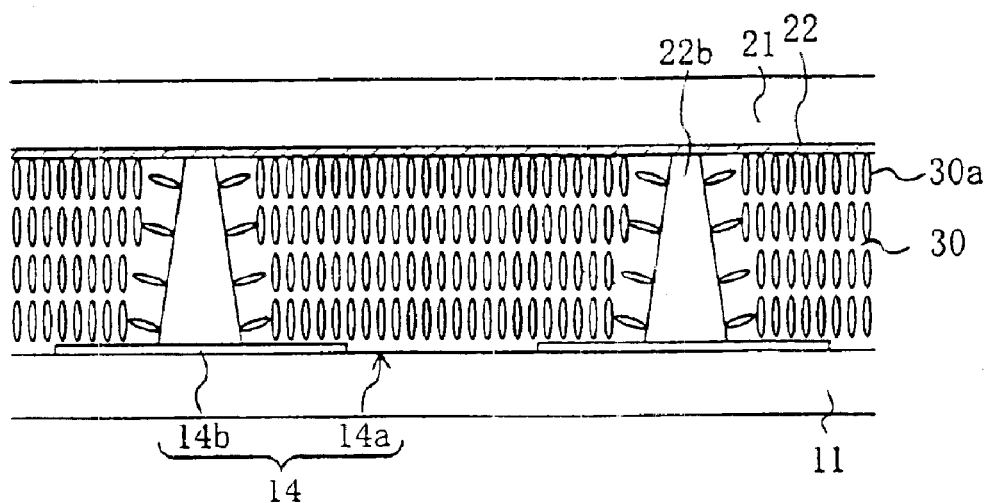

FIG. 32 is a cross-sectional view schematically illustrating a protrusion having a side surface whose inclination angle with respect to the substrate plane is 90° or more.

Figure 33:
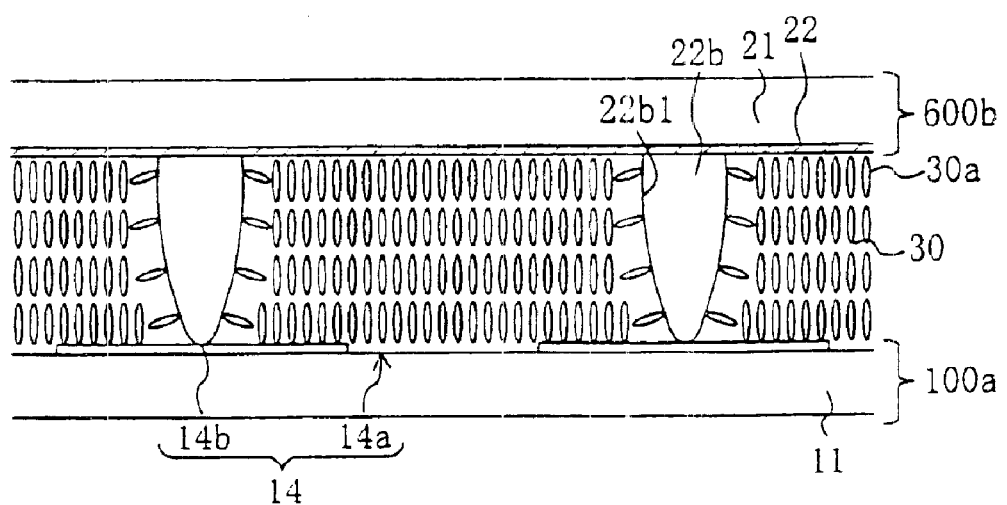

FIG. 33 is a cross-sectional view schematically illustrating a variation of a protrusion that functions as a spacer.

DETAILED DESCRIPTION OF THE PREFERRED EMBODIMENTS

First, the basic function of each element of a liquid crystal display device of the present invention will be described.

The liquid crystal display device of the present invention includes a pair of substrates that are arranged with a vertical alignment type liquid crystal layer being interposed therebetween. One of the pair of substrates has a first orientation-regulating structure capable of exerting an orientation-regulating force such that a plurality of liquid crystal domains are formed in each picture element region, each liquid crystal domain taking a radially-inclined orientation (referred to also as an "axially symmetrical orientation") in the presence of an applied voltage. The other substrate has a second orientation-regulating structure capable of exerting an orientation-regulating force such that the liquid crystal molecules are arranged in a radially-inclined orientation at least in the presence of an applied voltage, in a region corresponding to at least one of the liquid crystal domains. Therefore, the orientation-regulating force from the first orientation-regulating structure and that from the second orientation-regulating structure act upon the liquid crystal molecules at least in the presence of an applied voltage, whereby the radially-inclined orientation of each liquid crystal domain formed in the liquid crystal layer is more stable than that in a case where only the first orientation-regulating structure is provided.

A preferred first orientation-regulating structure of the liquid crystal display device of the present invention includes one of a pair of electrodes for applying a voltage across the liquid crystal layer in each picture element region. The electrode includes a plurality of unit solid portions so that an inclined electric field is produced along the periphery of each of the unit solid portions upon application of a voltage between the pair of electrodes, thereby forming a plurality of liquid crystal domains in regions corresponding to the unit solid portions, respectively. The outer shape of the electrode is defined so that upon application of a voltage between the pair of electrodes, an inclined electric field is produced around the electrode so as to form a plurality of liquid crystal domains each taking a radially-inclined orientation.

Herein, a portion of an electrode where a conductive film exits is referred to as a "solid portion", and a portion of the solid portion that produces an electric field for forming a single liquid crystal domain is referred to as a "unit solid portion". Each solid portion is typically made of a continuous conductive film.

It is preferred that the shape of each of the unit solid portions has rotational symmetry. When the shape of the unit solid portion has rotational symmetry, the resulting liquid crystal domain will also be in a radially-inclined orientation having rotational symmetry, i.e., an axially symmetrical orientation, thereby improving the viewing angle characteristic.

Another preferred first orientation-regulating structure of the liquid crystal display device of the present invention is an electrode structure in which one of the pair of electrodes for applying a voltage across the liquid crystal layer in each picture element region has at least one opening (a portion of the electrode where the conductive film does not exist) and a solid portion (a portion of the electrode other than the opening, i.e., a portion where a conductive film exists). The solid portion typically includes at least one unit solid portion as described above. By providing openings in one of the electrodes, it is possible to form a number of (e.g., four) unit solid portions that are two-dimensionally arranged in one picture element region. In this way, it is possible to form a larger number of liquid crystal domains than in a case where a number of (e.g., two) unit solid portions are formed by defining the outer shape of the electrode to be a predetermined shape without forming openings in the electrode.

Note that while openings can be formed so that a liquid crystal domain taking a radially-inclined orientation is also formed in a region corresponding to an electrode opening, as will be described later, this may not be necessary. As long as a liquid crystal domain taking a radially-inclined orientation is formed so as to correspond to the solid portion (unit solid portion), a continuity of the orientation of the liquid crystal molecules in each picture element region is ensured, thereby stabilizing the radially-inclined orientation of the liquid crystal domain formed so as to correspond to the solid portion, even when a liquid crystal domain formed so as to correspond to an opening does not take a radially-inclined orientation. Particularly, when the area of an opening is small, the opening has only a little contribution to the display, and thus the display quality will not deteriorate significantly even if a liquid crystal domain taking a radially-inclined orientation is not formed in a region corresponding to the opening.

A plurality of liquid crystal domains are formed in the liquid crystal layer. Each liquid crystal domain takes a vertical alignment in the absence of an applied voltage, and takes a radially-inclined orientation in the presence of an applied voltage due to an inclined electric field that is produced at an edge portion of the electrode opening. A vertical alignment type liquid crystal layer is a liquid crystal layer in which the liquid crystal molecules are aligned in a direction substantially perpendicular to the substrate plane in the absence of an applied voltage. Typically, a vertical alignment type liquid crystal layer is made of a liquid crystal material having a negative dielectric anisotropy, and the orientation is regulated by vertical alignment films provided on the opposing sides.

When a voltage is applied between the pair of electrodes, an inclined electric field is produced in the vertical alignment type liquid crystal layer, thereby forming liquid crystal domains in regions corresponding to openings and solid portions of the electrode. Images are displayed by changing the orientation of the liquid crystal domains according to the applied voltage. Since each liquid crystal domain takes a radially-inclined orientation (axially symmetrical orientation), there is little viewing angle dependence of the display quality and thus a wide viewing angle characteristic.

Moreover, a liquid crystal domain corresponding to an opening and a liquid crystal domain corresponding to a solid portion are both formed by an inclined electric field produced at the edge portion of the opening, whereby these liquid crystal domains are formed adjacent to each other in an alternating pattern, and the orientation of the liquid crystal molecules in one liquid crystal domain and that in another adjacent liquid crystal domain are essentially continuous with each other. Therefore, no disclination line is formed between a liquid crystal domain formed in an opening and another adjacent liquid crystal domain formed in a solid portion, whereby the display quality is not deteriorated and the orientation of the liquid crystal molecules is highly stable.

When a liquid crystal display device employs an electrode structure as described above, the liquid crystal molecules take a radially-inclined orientation not only in a region corresponding to an electrode solid portion but also in a region corresponding to an opening. With such a liquid crystal display device, as compared to the conventional liquid crystal display device described above, the continuity in the orientation of the liquid crystal molecules is higher while a stable orientation is realized and a uniform display without display non-uniformity can be obtained. Particularly, in order to realize a desirable response characteristic (high response speed), an inclined electric field for controlling the orientation of the liquid crystal molecules needs to act upon a large number of liquid crystal molecules. For this purpose, it is necessary to form a large number of openings (edge portions). In the liquid crystal display device of the present invention, a liquid crystal domain having a stable radially-inclined orientation is formed corresponding to an opening. Therefore, even if a large number of openings are formed in order to improve the response characteristic, a decrease in the display quality (occurrence of display non-uniformity) can be suppressed.

When at least some of the openings are provided to form at least one unit lattice arranged so as to have rotational symmetry with substantially the same shape and substantially the same size, a plurality of liquid crystal domains can be arranged with a high degree of symmetry for each unit lattice, whereby it is possible to improve the viewing angle dependence of the display quality. Moreover, by dividing the entire picture element region into unit lattices, it is possible to stabilize the orientation of the liquid crystal layer across the entire picture element region. For example, openings may be arranged so that the centers of the openings form a square lattice. Note that where each picture element region is divided by an opaque element such as a storage capacitance line, a unit lattice can be arranged for each region contributing to the display.

When at least some of the openings (typically those forming a unit lattice) each have a shape having rotational symmetry, it is possible to increase the stability of the radially-inclined orientation of the liquid crystal domain formed in the opening. For example, the shape of each opening (as viewed in the substrate normal direction) may be a circular shape or a polygonal shape (e.g., a square shape). Note that a shape that does not have rotational symmetry (e.g., an elliptical shape) may be employed depending upon the shape (aspect ratio) of the picture element, etc. Moreover, when the shape of a region of the solid portion that is substantially surrounded by the openings ("unit solid portion") has rotational symmetry, it is possible to increase the stability of the radially-inclined orientation of the liquid crystal domain formed in the solid portion. For example, when the openings are arranged in a square lattice pattern, the shape of the opening may be a generally star shape or a cross shape, and the shape of the solid portion may be a generally circular shape, a generally square shape, or the like. Of course, the openings and the solid portion substantially surrounded by the openings may both have a generally square shape.

In order to stabilize the radially-inclined orientation of the liquid crystal domain formed in the electrode opening, it is preferred that the liquid crystal domain formed in the opening has a generally circular shape. In other words, the shape of the opening may be designed so that the liquid crystal domain formed in the opening has a generally circular shape.

Of course, in order to stabilize the radially-inclined orientation of the liquid crystal domain formed in the electrode solid portion, it is preferred that the region of the solid portion substantially surrounded by the openings has a generally circular shape. A liquid crystal domain formed in the solid portion, which is made of a continuous conductive film, is formed corresponding to a region of a solid portion (unit solid portion) that is substantially surrounded by a plurality of openings. Therefore, the shape and arrangement of the openings may be determined so that the region of the solid portion (unit solid portion) has a generally circular shape.

With any of the alternatives described above, it is preferred that the total area of the openings formed in the electrode is smaller than the area of the solid portion in each picture element region. As the area of the solid portion increases, the area of the liquid crystal layer (defined in the plane of the liquid crystal layer as viewed in the substrate normal direction) that is directly influenced by the electric field produced by the electrodes increases, thereby improving the optical characteristics (e.g., the transmittance) with respect to the voltage applied across the liquid crystal layer.

It is preferred that whether to employ an arrangement where each opening has a generally circular shape or an arrangement where each unit solid portion has a generally circular shape is determined by determining with which arrangement, the area of the solid portion can be made larger. Which arrangement is more preferred is appropriately selected depending upon the pitch of the picture elements. Typically, when the pitch is greater than about 25 $\mu$m, it is preferred that the openings are formed so that each solid portion has a generally circular shape. When the pitch is less than or equal to about 25 $\mu$m, it is preferred that each opening has a generally circular shape.

With the electrode arrangement where openings are provided in one of a pair of electrodes, a sufficient voltage may not be applied across the liquid crystal layer in a region corresponding to the opening and a sufficient retardation change may not be obtained, thereby decreasing the light efficiency. In view of this, a dielectric layer may be provided on one side of the electrode with openings that is away from the liquid crystal layer, with an additional electrode being provided via the dielectric layer so as to at least partially oppose the electrode openings (i.e., a two-layer electrode may be employed). In this way, it is possible to apply a sufficient voltage across the liquid crystal layer corresponding to the opening, thereby improving the light efficiency and/or the response characteristic.

Where the electrode structure described above (i.e., the first orientation-regulating structure) is only provided in one of the substrates, if the radially-inclined orientation is disturbed by a stress acting upon the liquid crystal layer, the disturbed orientation may be maintained by the electric field effect and thus is observed as an after image phenomenon. However, the liquid crystal display device of the present invention includes a second orientation-regulating structure in the other substrate, in addition to the first orientation-regulating structure, whereby the orientation-regulating force from the first orientation-regulating structure and that from the second orientation-regulating structure act upon the liquid crystal molecules in each liquid crystal domain at least in the presence of an applied voltage. Therefore, the radially-inclined orientation of the liquid crystal domain is stabilized and the decrease in the display quality due to a stress is suppressed, as compared with an arrangement having only the first orientation-regulating structure.

When the second orientation-regulating structure is provided in a region in the vicinity of the center of a liquid crystal domain taking a radially-inclined orientation that is formed by the first orientation-regulating structure, it is possible to fix the position of the central axis of the radially-inclined orientation, thereby effectively improving the resistance of the radially-inclined orientation to a stress.

When the orientation-regulating direction of the second orientation-regulating structure may be set in conformity with the direction of the radially-inclined orientation by the first orientation-regulating structure. In this way, the continuity and stability of the orientation increase, thereby improving the display quality and the response characteristic.

While the second orientation-regulating structure provides effect of stabilizing the orientation as long as it exerts an orientation-regulating force at least in the presence of an applied voltage, the orientation can be stabilized irrespective of the level of the applied voltage if an arrangement that exerts an orientation-regulating force also in the absence of an applied voltage is employed. However, since a vertical alignment type liquid crystal layer in which the liquid crystal molecules are aligned substantially vertical to the substrate plane in the absence of an applied voltage is employed, the display quality may decrease if a second orientation-regulating structure that exerts an orientation-regulating force also in the absence of an applied voltage is employed. However, since the orientation-regulating force of the second orientation-regulating structure is effective even if it is relatively weak, as will be described later, the orientation can be sufficiently stabilized even with a structure that is small with respect to the size of each picture element, and the decrease in the display quality in the absence of an applied voltage may be insignificant in some cases. Depending upon the application of the liquid crystal display device (e.g., the magnitude of the externally applied stress) and/or the electrode arrangement (the strength of the orientation-regulating force provided by the first orientation-regulating structure), a second orientation-regulating structure that exerts a relatively strong orientation-regulating force may be provided. In such a case, a light-blocking layer may be provided in order to suppress the decrease in the display quality due to the second orientation-regulating structure.

Moreover, the radially-inclined orientation of each liquid crystal domain can be stabilized as long as the orientation-regulating force by the second orientation-regulating structure acts upon those liquid crystal molecules in each liquid crystal domain taking a radially-inclined orientation that is formed by the first orientation-regulating structure. Particularly, when the second orientation-regulating structure is provided in a region in the vicinity of the center of a liquid crystal domain, an effect of fixing the position of the central axis of the radially-inclined orientation is also obtained. The second orientation-regulating structure may be realized by using any of various structures because it is only required to exert an orientation-regulating force weaker than that exerted by the first orientation-regulating structure.

When an electrode structure with openings as described above is employed as the first orientation-regulating structure, liquid crystal domains are formed both in the openings and in the solid portion. By providing the second orientation-regulating structure for each of the liquid crystal domains to be formed, it is possible to stabilize the radially-inclined orientation of each liquid crystal domain. However, a practically sufficient stability (stress resistance) can be obtained by providing the second orientation-regulating structures only for those liquid crystal domains that are formed corresponding to the solid portion.

Particularly, a second orientation-regulating structure that exerts an orientation-regulating force in conformity with the radially-inclined orientation formed in the electrode solid portion is more preferable in terms of the production efficiency because it can be provided by a simpler process as compared to a second orientation-regulating structure that exerts an orientation-regulating force in conformity with the radially-inclined orientation formed in the electrode opening. Moreover, while it is preferred that the second orientation-regulating structure is provided for each of the unit solid portions, a practical orientation stability may be obtained by providing the second orientation-regulating structure only for some of the unit solid portions depending upon the electrode structure (the number and arrangement of openings). This is because in the liquid crystal display device of the present invention, the radially-inclined orientations formed in the liquid crystal layer are essentially continuous with one another.

Moreover, in order to improve the resistance to a stress, a protrusion including a side surface that gives the liquid crystal molecules of the liquid crystal layer an orientation-regulating force of the same direction as the orientation-regulating direction of the inclined electric field described above may be provided inside the electrode opening. It is preferred that the cross-sectional shape of the protrusion in the substrate plane direction is the same as the shape of the opening and has rotational symmetry as the shape of the opening described above. However, since the liquid crystal molecules whose orientation is regulated by the orientation-regulating force of the side surface of the protrusion have a poor response to an applied voltage (a small retardation change in response to the applied voltage), the protrusion may decrease the contrast ratio of the display. Therefore, it is preferred that the size, the height and the number of protrusions are set so as not to decrease the display quality.

Of the electrode structures that function as the first orientation-regulating structure of the liquid crystal display device of the present invention, the electrode having the openings as described above is, for example, a picture element electrode connected to a switching element in an active matrix type liquid crystal display device including a switching element such as a TFT in each picture element region, while the other electrode is at least one counter electrode opposing a plurality of picture element electrodes. Thus, by providing openings only in one of a pair of electrodes provided so as to oppose each other via the liquid crystal layer, it is possible to realize a stable radially-inclined orientation. Specifically, with a production method known in the art, it is possible to produce a liquid crystal display device having the first orientation-regulating structure only by modifying a photomask used in the process of patterning a conductive film into the shape of the picture element electrode so that openings having an intended shape are formed in an intended arrangement. Of course, a plurality of openings may be provided in the counter electrode. Moreover, a two-layer electrode as described above may be produced by using a method known in the art.

Moreover, the second orientation-regulating structure of the liquid crystal display device of the present invention is, for example, a protrusion protruding from the counter substrate into the liquid crystal layer. Alternatively, the second orientation-regulating structure may be a structure having a horizontal alignment type surface provided on one side of the counter substrate that is closer to the liquid crystal layer. Alternatively, the second orientation-regulating structure may be an opening provided in the counter electrode. These structures may be produced by a method known in the art.

Moreover, the liquid crystal display device of the present invention may have an arrangement such that one of a pair of substrates arranged so as to interpose a vertical alignment type liquid crystal layer therebetween ("first substrate") includes an electrode having a plurality of unit solid portions and a plurality of openings in each picture element region, with the other substrate ("second substrate") including an orientation-regulating structure in at least one region corresponding to a unit solid portion among a plurality of unit solid portions and a plurality of openings.

The electrode of the first substrate is such that an inclined electric field is produced along the periphery of each of the unit solid portions upon application of a voltage between the electrode and the electrode of the second substrate, thereby forming a plurality of liquid crystal domains each taking a radially-inclined orientation in regions corresponding to the unit solid portions, respectively of course, the electrode may be configured so that a liquid crystal domain taking a radially-inclined orientation is formed also in each region corresponding to the electrode opening. This electrode structure functions similarly to the first orientation-regulating structure described above. A preferred arrangement of this electrode structure is substantially the same as that of the first orientation-regulating structure described above. For example, the shape of each of the unit solid portions preferably has rotational symmetry, and the unit solid portions are preferably arranged so that they have rotational symmetry in each picture element region.

In a liquid crystal display device in which one of the substrates includes an electrode having such a structure as described above while the other substrate includes an orientation-regulating structure, the orientation-regulating force from the above-described electrode structure and that from the orientation-regulating structure act upon the liquid crystal molecules in each liquid crystal domain at least in the presence of an applied voltage. Therefore, the radially-inclined orientation of the liquid crystal domain is stabilized and the decrease in the display quality due to a stress is suppressed.

The orientation-regulating structure functions substantially similarly to the second orientation-regulating structure as described above. A preferred arrangement of this orientation-regulating structure is substantially the same as that of the second orientation-regulating structure described above. For example, by providing the orientation-regulating structure in a region in the vicinity of the center of each liquid crystal domain taking a radially-inclined orientation that is formed in the unit solid portion or the opening of the electrode, it is possible to fix the position of the central axis of the radially-inclined orientation, thereby effectively improving the resistance of the radially-inclined orientation to a stress. The orientation-regulating structure may be a protrusion protruding from the second substrate into the liquid crystal layer. Alternatively, the orientation-regulating structure may be a structure having a horizontal alignment layer provided on one side of the second substrate that is closer to the liquid crystal layer. Alternatively, the orientation-regulating structure may be an opening provided in the electrode of the second substrate.

A liquid crystal display device according to an embodiment of the present invention will now be described with reference to the drawings.

First Orientation-regulating Structure

First, a first orientation-regulating structure, which is a preferred electrode structure for the liquid crystal display device of the present invention, and a function thereof will be described.

The liquid crystal display device of the present invention has desirable display characteristics and thus can be suitably used as an active matrix type liquid crystal display device. An embodiment of the present invention will now be described with respect to an active matrix type liquid crystal display device using thin film transistors (TFTs). Note, however, that the present invention is not limited thereto, but may alternatively be used with an MIM active matrix type liquid crystal display device or a passive matrix type liquid crystal display device. Moreover, while the embodiment of the present invention will be described with respect to a transmission type liquid crystal display device, the present invention is not limited thereto, but may alternatively be used with a reflection type liquid crystal display device or even a transmission-reflection liquid crystal display device to be described later.

In the present specification, a region of a liquid crystal display device corresponding to a "picture element", which is the minimum unit of display, will be referred to as a "picture element region". In a color liquid crystal display device, R, G and B "picture elements" correspond to one "pixel". In an active matrix type liquid crystal display device, a picture element region is defined by a picture element electrode and a counter electrode which opposes the picture element electrode. In a passive matrix type liquid crystal display device, a picture element region is defined as a region where one of column electrodes which are arranged in a stripe pattern crosses one of row electrodes which are also arranged in a stripe pattern perpendicular to the column electrodes. In an arrangement with a black matrix, strictly speaking, a picture element region is a portion of each region across which a voltage is applied according to the intended display state which corresponds to an opening of the black matrix.

Figure 1B:
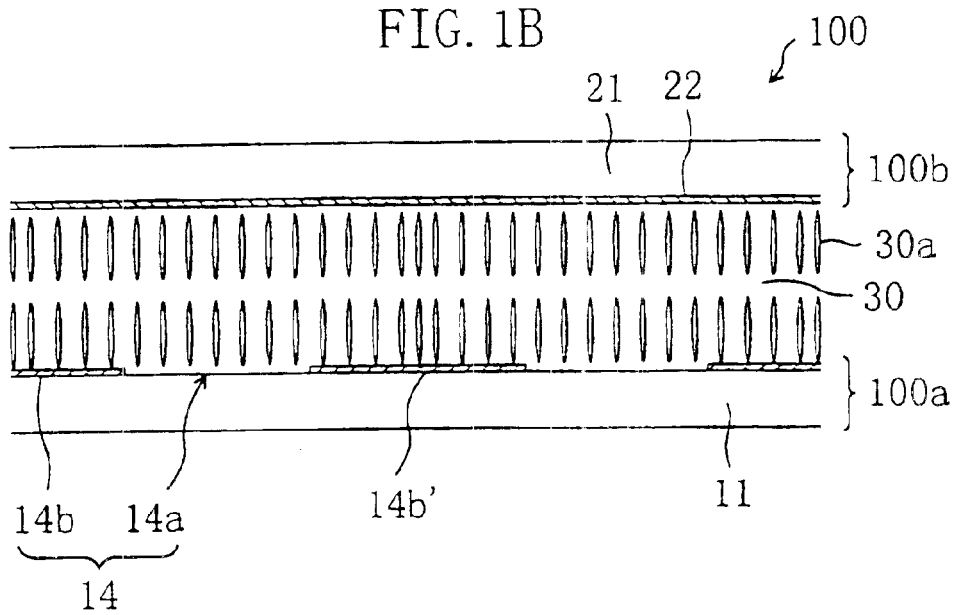

A structure of one picture element region of a liquid crystal display device 100 having a first orientation-regulating structure of the present invention will be described with reference to FIG. 1A and FIG. 1B. In the following description, a color filter and a black matrix are omitted for the sake of simplicity. Moreover, in subsequent figures, each element having substantially the same function as the corresponding element in the liquid crystal display device 100 will be denoted by the same reference numeral and will not be further described below. FIG. 1A is a plan view as viewed in the substrate normal direction, and FIG. 1B is a cross-sectional view taken along line 1B–1B' of FIG. 1A. FIG. 1B illustrates a state where no voltage is applied across a liquid crystal layer.

The liquid crystal display device 100 includes an active matrix substrate (hereinafter referred to as a "TFT substrate") 10a, a counter substrate (referred to also as a "color filter substrate") 10b, and a liquid crystal layer 30 provided between the TFT substrate 100a and the counter substrate 10b. Liquid crystal molecules 30a of the liquid crystal layer 30 have a negative dielectric anisotropy, and are aligned vertical to the surface of the vertical alignment film, as illustrated in FIG. 1B, in the absence of an applied voltage across the liquid crystal layer 30 by virtue of a vertical alignment layer (not shown) which is provided on one surface of each of the TFT substrate 10a and the counter substrate 100b that is closer to the liquid crystal layer 30. This state is described as the liquid crystal layer 30 being in a vertical alignment. Note, however, that the liquid crystal molecules 30a of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 850 or more with respect to the surface of the vertical alignment film.

The TFT substrate 100a of the liquid crystal display device 100 includes a transparent substrate (e.g., a glass substrate) 11 and a picture element electrode 14 provided on the surface of the transparent substrate 11. The counter substrate 100b includes a transparent substrate (e.g., a glass substrate) 21 and a counter electrode 22 provided on the surface of the transparent substrate 21. The orientation of the liquid crystal layer 30 changes for each picture element region according to the voltage applied between the picture element electrode 14 and the counter electrode 22 which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

The picture element electrode 14 of the liquid crystal display device 100 includes a plurality of openings 14a and a solid portion 14b. The opening 14a refers to a portion of the picture element electrode 14 made of a conductive film (e.g., an ITO film) from which the conductive film has been removed, and the solid portion 14b refers to a portion thereof where the conductive film is present (the portion other than the openings 14a). While a plurality of openings 14a are formed for each picture element electrode, the solid portion 14b is basically made of a single continuous conductive film.

The openings 14a are arranged so that the respective centers thereof form a square lattice, and a unit solid portion 14b' (defined as a portion of the solid portion 14b that is substantially surrounded by four openings 14a whose respective centers are located at the four lattice points that form one unit lattice) has a generally circular shape. Each opening 14a has a generally star shape having four quarter-arc-shaped sides (edges) with a four-fold rotation axis at the center among the four sides. In order to stabilize the orientation across the entire picture element region, the unit lattices preferably exist up to the periphery of the picture element electrode 14. Therefore, a peripheral portion of the picture element electrode 14 is preferably patterned, as illustrated in the figure, into a shape that corresponds to a generally half piece of the opening 14a (in a peripheral portion of the picture element electrode 14 along a side thereof) or into a shape that corresponds to a generally quarter piece of the opening 14a (in a peripheral portion of the picture element electrode 14 at a corner thereof). The square shown in a solid line in FIG. 1A (a collection of the square lattices) represents a region (outer shape) corresponding to a conventional picture element electrode which is made of a single conductive layer.

The openings 14a located in the central portion of the picture element region have generally the same shape and size. The unit solid portions 14b, located respectively in unit lattices formed by the openings 14a are generally circular in shape, and have generally the same shape and size. Each unit solid portion 14b' is connected to adjacent unit solid portions 14b', thereby forming the solid portion 14b which substantially functions as a single conductive film.

When a voltage is applied between the picture element electrode 14 having such a structure as described above and the counter electrode 22, an inclined electric field is produced at the edge portion of each opening 14a, thereby producing a plurality of liquid crystal domains each having a radially-inclined orientation. The liquid crystal domain is produced in each region corresponding to the opening 14a and in each region corresponding to the unit solid portion 14b' in a unit lattice.

Although an arrangement having a plurality of openings 14a in each picture element region is illustrated herein, it is possible to form a plurality of liquid crystal domains in each picture element region only by providing one opening therein. For example, assuming a square region divided by broken lines into four unit lattices in FIG. 1A as one picture element electrode, the picture element electrode is made up of a single opening 14a and four unit solid portions 14b' around the opening 14a, but it forms five liquid crystal domains each taking a radially-inclined orientation in the presence of an applied voltage.

Furthermore, a plurality of liquid crystal domains can be formed in each picture element region without providing the opening 14a. For example, assuming two adjacent unit lattices as one picture element electrode, the picture element electrode is made up of two unit solid portions 14b' and does not include the opening 14a. However, such a picture element electrode forms two liquid crystal domains each taking a radially-inclined orientation in the presence of an applied voltage. Thus, as long as the picture element electrode has unit solid portions such that a plurality of liquid crystal domains each taking a radially-inclined orientation at least in the presence of an applied voltage (in other words, as long as the picture element electrode has such an outer shape), the continuity in the orientation of the liquid crystal molecules in each picture element region can be obtained, and the radially-inclined orientation of each liquid crystal domain formed corresponding to the unit solid portion 14b' is stabilized.

Moreover, while the picture element electrode 14 having a square shape is illustrated herein, the shape of the picture element electrode 14 is not limited to this. A typical shape of the picture element electrode 14 can be approximated to a rectangular shape (including a square and an oblong rectangle), whereby the openings 14a can be regularly arranged therein in a square lattice pattern. Even when the picture element electrode 14 has a shape other than a rectangular shape, the effects of the present invention can be obtained as long as the openings 14a are arranged in a regular manner (e.g., in a square lattice pattern as illustrated herein) so that liquid crystal domains are formed in all regions in the picture element region.

Figure 2A:
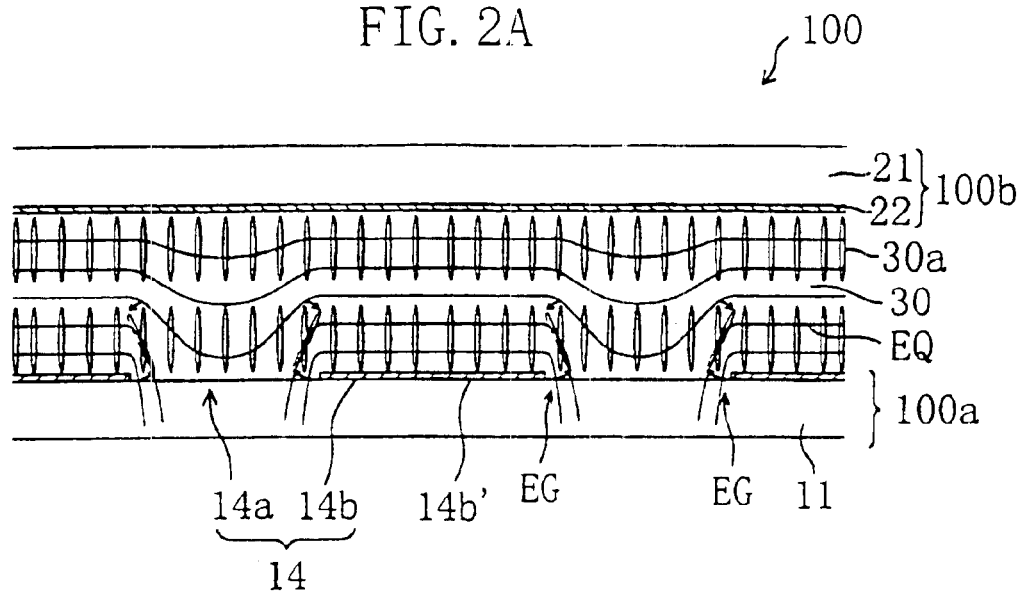
FIG. 2A and FIG. 2B illustrate a liquid crystal layer 30 of the liquid crystal display device 100 in the presence of an applied voltage thereacross, wherein FIG. 2A schematically illustrates a state where an orientation has just started to change (initial ON state), and FIG. 2B schematically illustrates a steady state.
Figure 2B:
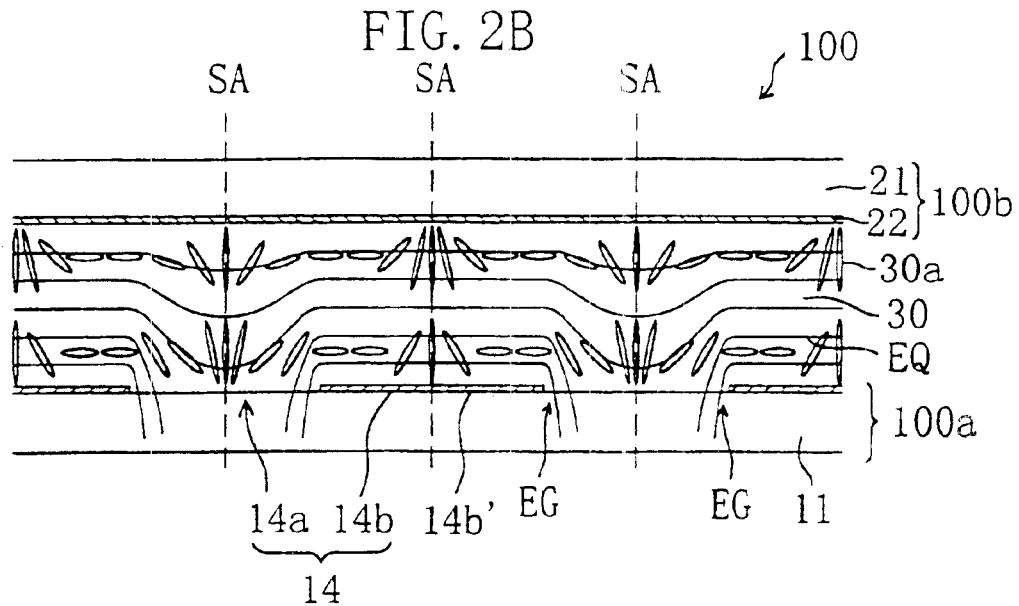

The mechanism by which liquid crystal domains are formed by an inclined electric field as described above will be described with reference to FIG. 2A and FIG. 2B. Each of FIG. 2A and FIG. 2B illustrates the liquid crystal layer 30 illustrated in FIG. 1B with a voltage being applied thereacross. FIG. 2A schematically illustrates a state where the orientation of the liquid crystal molecules 30a has just started to change (initial ON state) according to the voltage applied across the liquid crystal layer 30. FIG. 2B schematically illustrates a state where the orientation of the liquid crystal molecules 30a has changed and become steady according to the applied voltage. Curves EQ in FIG. 2A and FIG. 2B denote equipotential lines.

As illustrated in FIG. 1A, when the picture element electrode 14 and the counter electrode 22 are at the same potential (a state where no voltage is applied across the liquid crystal layer 30), the liquid crystal molecules 30a in each picture element region are aligned vertical to the surfaces of the substrates 11 and 21.

When a voltage is applied across the liquid crystal layer 30, a potential gradient represented by the equipotential lines EQ shown in FIG. 2A (perpendicular to the electric force line) is produced. The equipotential lines EQ are parallel to the surface of the solid portion 14b and the counter electrode 22 in the liquid crystal layer 30 located between the solid portion 14b of the picture element electrode 14 and the counter electrode 22, and drop in a region corresponding to the opening 14a of the picture element electrode 14. An inclined electric field represented by an inclined portion of the equipotential lines EQ is produced in the liquid crystal layer 30 above an edge portion EG of the opening 14a (the peripheral portion of and within the opening 14a including the boundary thereof).

A torque acts upon the liquid crystal molecules 30a having a negative dielectric anisotropy so as to direct the axial orientation of the liquid crystal molecules 30a to be parallel to the equipotential lines EQ (perpendicular to the electric force line). Therefore, the liquid crystal molecules 30a above the right edge portion EG in FIG. 2A incline (rotate) clockwise and the liquid crystal molecules 30a above the left edge portion EG incline (rotate) counterclockwise as indicated by arrows in FIG. 2A. As a result, the liquid crystal molecules 30a above the edge portions EG are oriented parallel to the corresponding portions of the equipotential lines EQ.

Referring to FIG. 3A to FIG. 3D, the change in the orientation of the liquid crystal molecules 30a will now be described in greater detail.

Figure 3A:
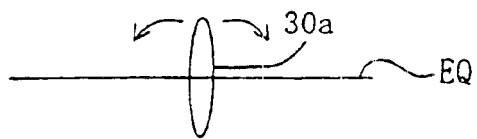

When an electric field is produced in the liquid crystal layer 30, a torque acts upon the liquid crystal molecules 30a having a negative dielectric anisotropy so as to direct the axial orientation thereof to be parallel to an equipotential line EQ. As illustrated in FIG. 3A, when an electric field represented by an equipotential line EQ perpendicular to the axial orientation of the liquid crystal molecule 30a is produced, either a torque urging the liquid crystal molecule 30a to incline clockwise or a torque urging the liquid crystal molecule 30a to incline counterclockwise occurs with the same probability. Therefore, the liquid crystal layer 30 between the pair of parallel plate-shape electrodes opposing each other has some liquid crystal molecules 30a that are subject to a clockwise torque and some other liquid crystal molecules 30a that are subject to a counterclockwise torque. As a result, the transition to the intended orientation according to the voltage applied across the liquid crystal layer 30 may not proceed smoothly.

Figure 3B:
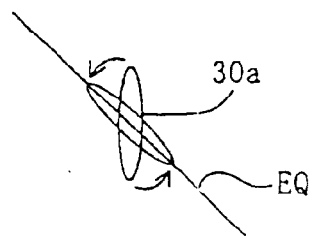
Figure 3C:
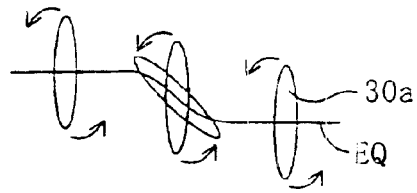
Figure 3D:
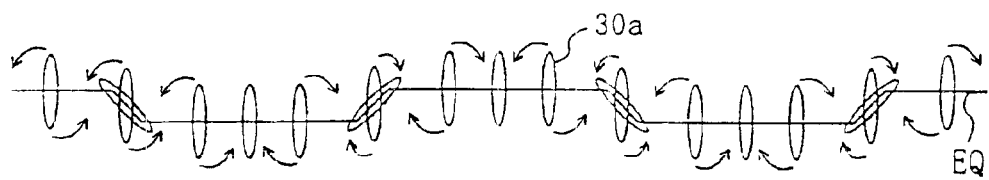

When an electric field represented by a portion of the equipotential lines EQ inclined with respect to the axial orientation of the liquid crystal molecules 30a (an inclined electric field) is produced at the edge portion EG of the opening 14a of the liquid crystal display device 100 of the present invention, as illustrated in FIG. 2A, the liquid crystal molecules 30a incline in whichever direction (the counterclockwise direction in the illustrated example) that requires less rotation for the liquid crystal molecules 30a to be parallel to the equipotential line EQ, as illustrated in FIG. 3B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 3C. As illustrated in FIG. 3D, when an electric field such that the equipotential line EQ forms a continuous concave/convex pattern, the liquid crystal molecules 30a located on a flat portion of the equipotential line EQ are oriented so as to conform with the orientation direction defined by the liquid crystal molecules 30a located on adjacent inclined portions of the equipotential line EQ. The phrase "being located on an equipotential line EQ" as used herein means "being located within an electric field that is represented by the equipotential line EQ".

The change in the orientation of the liquid crystal molecules 30a, starting from those that are located on the inclined portion of the equipotential lines EQ, proceeds as described above and reaches a steady state, which is schematically illustrated in FIG. 2B. The liquid crystal molecules 30a located around the central portion of the opening 14a are influenced substantially equally by the respective orientations of the liquid crystal molecules 30a at the opposing edge portions EG of the opening 14a, and therefore retain their orientation perpendicular to the equipotential lines EQ. The liquid crystal molecules 30a away from the center of the opening 14a incline by the influence of the orientation of other liquid crystal molecules 30a at the closer edge portion EG, thereby forming an inclined orientation that is symmetric about the center SA of the opening 14a. The orientation as viewed in a direction perpendicular to the display plane of the liquid crystal display device 100 (a direction perpendicular to the surfaces of the substrates 11 and 21) is a state where the liquid crystal molecules 30a have a radial axial orientation (not shown) about the center of the opening 14a. In the present specification, such an orientation will be referred to as a "radially-inclined orientation". Moreover, a region of the liquid crystal layer that takes a radially-inclined orientation about a single axis will be referred to as a "liquid crystal domain".

A liquid crystal domain in which the liquid crystal molecules 30a take a radially-inclined orientation is formed also in a region corresponding to the unit solid portion 14b' substantially surrounded by the openings 14a. The liquid crystal molecules 30a in a region corresponding to the unit solid portion 14b' are influenced by the orientation of the liquid crystal molecules 30a at each edge portion EG of the opening 14a so as to take a radially-inclined orientation that is symmetric about the center SA of the unit solid portion 14b' (corresponding to the center of a unit lattice formed by the openings 14a).

The radially-inclined orientation in a liquid crystal domain formed in the unit solid portion 14b' and the radially-inclined orientation formed in the opening 14a are continuous with each other, and are both in conformity with the orientation of the liquid crystal molecules 30a at the edge portion EG of the opening 14a. The liquid crystal molecules 30a in the liquid crystal domain formed in the opening 14a are oriented in the shape of a cone that spreads upwardly (toward the substrate 10b), and the liquid crystal molecules 30a in the liquid crystal domain formed in the unit solid portion 14b' are oriented in the shape of a cone that spreads downwardly (toward the substrate 10a). As described above, the radially-inclined orientation in a liquid crystal domain formed in the opening 14a and that in a liquid crystal domain formed in the unit solid portion 14b' are continuous with each other. Therefore, no disclination line (orientation defect) is formed along the boundary therebetween, thereby preventing a decrease in the display quality due to occurrence of a disclination line.

In order to improve the viewing angle dependence, which is a display quality of a liquid crystal display device, in all azimuth angles, the existence probabilities of the liquid crystal molecules 30a oriented in various azimuth angle directions preferably have rotational symmetry, and more preferably have axial symmetry, in each picture element region. In other words, the liquid crystal domain formed across the entire picture element region preferably has rotational symmetry, and more preferably has axial symmetry. Note, however, that rotational symmetry may not be necessary across the entire picture element region, but it may be sufficient that each picture element region in the liquid crystal layer is formed as a collection of a plurality of groups of liquid crystal domains that are arranged so that each group has rotational symmetry (or axial symmetry) (e.g., a plurality of groups of liquid crystal domains, wherein each group of liquid crystal domains are arranged in a square lattice pattern). Therefore, the arrangement of the openings 14a formed in a picture element region may not need to have rotational symmetry across the entire picture element region, but it may be sufficient that the arrangement can be represented as a collection of a plurality of groups of openings that are arranged so that each group has rotational symmetry (or axial symmetry) (e.g., a plurality of groups of openings, wherein each group of openings are arranged in a square lattice pattern). Of course, this similarly applies to the arrangement of the unit solid portions 14b' substantially surrounded by the openings 14a. Moreover, since the shape of each liquid crystal domain preferably has rotational symmetry, and more preferably axial symmetry, the shape of each opening 14a and each unit solid portion 14b' preferably has rotational symmetry, and more preferably axial symmetry.

Note that a sufficient voltage may not be applied across the liquid crystal layer 30 around the central portion of the opening 14a, whereby the liquid crystal layer 30 around the central portion of the opening 14a does not contribute to the display. In other words, even if the radially-inclined orientation of the liquid crystal layer 30 around the central portion of the opening 14a is disturbed to some extent (e.g., even if the central axis is shifted from the center of the opening 14a), the display quality may not be decreased. Therefore, it may be sufficient that at least the liquid crystal domain formed corresponding to a unit solid portion 14b' is arranged to have rotational symmetry, and more preferably axial symmetry.

As described above with reference to FIG. 2A and FIG. 2B, the picture element electrode 14 of the liquid crystal display device 100 of the present invention includes a plurality of openings 14a and produces, in the liquid crystal layer 30 in the picture element region, an electric field represented by equipotential lines EQ having inclined portions. The liquid crystal molecules 30a having a negative dielectric anisotropy in the liquid crystal layer 30, which are in a vertical alignment in the absence of an applied voltage, change the orientation direction thereof, with the change in the orientation of those liquid crystal molecules 30a located on the inclined portion of the equipotential lines EQ serving as a trigger. Thus, a liquid crystal domain having a stable radially-inclined orientation is formed in the opening 14a and in the solid portion 14b. A display is produced by the change in the orientation of the liquid crystal molecules in the liquid crystal domain according to the voltage applied across the liquid crystal layer.

The shape (as viewed in the substrate normal direction) and arrangement of the openings 14a of the picture element electrode 14 of the liquid crystal display device 100 will be described.

The display characteristics of a liquid crystal display device exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability. Therefore, the opening 14a preferably has a shape such that liquid crystal domains are formed in each picture element region so that the liquid crystal molecules 30a in the picture element region are oriented in all azimuth angles with substantially the same probability. More specifically, the shape of the opening 14a preferably has rotational symmetry (more preferably symmetry with at least a two-fold rotation axis) about a symmetry axis extending through the center of each opening (in the normal direction). It is also preferred that the plurality of openings 14a are arranged so as to have rotational symmetry. Moreover, it is preferred that the shape of the unit solid portion 14b' which is substantially surrounded by these openings also has rotational symmetry. It is also preferred that the unit solid portions 14b' are arranged so as to have rotational symmetry.

However, it may not be necessary to arrange the openings 14a or the unit solid portions 14b' so as to have rotational symmetry across the entire picture element region. The liquid crystal molecules can be oriented in all azimuth angles with substantially the same probability across the entire picture element region when, for example, a square lattice (having symmetry with a four-fold rotation axis) is used as the minimum unit, and the picture element region is formed by such square lattices, as illustrated in FIG. 1A.

The orientation of the liquid crystal molecules 30a when the generally star-shaped openings 14a having rotational symmetry and the generally circular unit solid portions 14b' are arranged in a square lattice pattern, as illustrated in FIG. 1A, will be described with reference to FIG. 4A to FIG. 4C.

Each of FIG. 4A to FIG. 4C schematically illustrates an orientation of the liquid crystal molecules 30a as viewed in the substrate normal direction. In figures, such as FIG. 4B and FIG. 4C, illustrating the orientation of the liquid crystal molecules 30a as viewed in the substrate normal direction, a black-spotted end of the liquid crystal molecule 30a drawn as an ellipse indicates that the liquid crystal molecule 30a is inclined so that the end is closer than the other end to the substrate on which the picture element electrode 14 having the opening 14a is provided. This similarly applies to all of the subsequent figures. A single unit lattice (which is formed by four openings 14a) in the picture element region illustrated in FIG. 1A will be described below. Cross-sectional views taken along the respective diagonals of FIG. 4A to FIG. 4C correspond to FIG. 1B, FIG. 2A and FIG. 2B, respectively, and FIG. 1B, FIG. 2A and FIG. 2B will also be referred to in the following description.

When the picture element electrode 14 and the counter electrode 22 are at the same potential, i.e., in a state where no voltage is applied across the liquid crystal layer 30, the liquid crystal molecules 30a whose orientation direction is regulated by the vertical alignment layer (not shown) which is provided on one side of each of the TFT substrate 100a and the counter substrate 100b that is closer to the liquid crystal layer 30 take a vertical alignment as illustrated in FIG. 4A.

When an electric field is applied across the liquid crystal layer 30 so as to produce an electric field represented by equipotential lines EQ shown in FIG. 2A, a torque acts upon the liquid crystal molecules 30a having a negative dielectric anisotropy so as to direct the axial orientation thereof to be parallel to the equipotential lines EQ. As described above with reference to FIG. 3A and FIG. 3B, for the liquid crystal molecules 30a under an electric field represented by equipotential lines EQ perpendicular to the molecular axis thereof, the direction in which the liquid crystal molecules 30a are to incline (rotate) is not uniquely defined (FIG. 3A), whereby the orientation change (inclination or rotation) does not easily occur. In contrast, for the liquid crystal molecules 30a placed under equipotential lines EQ inclined with respect to the molecular axis of the liquid crystal molecules 30a, the direction of inclination (rotation) is uniquely defined, whereby the orientation change easily occurs. Therefore, as illustrated in FIG. 4B, the liquid crystal molecules 30a start inclining from the edge portion of the opening 14a where the molecular axis of the liquid crystal molecules 30a is inclined with respect to the equipotential lines EQ. Then, the surrounding liquid crystal molecules 30a incline so as to conform with the orientation of the already-inclined liquid crystal molecules 30a at the edge portion of the opening 14a, as described above with reference to FIG. 3C. Then, the axial orientation of the liquid crystal molecules 30a becomes stable as illustrated in FIG. 4C (radially-inclined orientation).

As described above, when the shape of the opening 14a has rotational symmetry, the liquid crystal molecules 30a in the picture element region successively incline, starting from the edge portion of the opening 14a toward the center of the opening 14a upon application of a voltage. As a result, there is obtained an orientation in which those liquid crystal molecules 30a around the center of the opening 14a, where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the opening 14a, with the degree of inclination gradually increasing away from the center of the opening 14a.

The liquid crystal molecules 30a in a region corresponding to the generally circular unit solid portion 14b' which is surrounded by the four generally star-shaped openings 14a arranged in a square lattice pattern also incline so as to conform with the orientation of the liquid crystal molecules 30a which have been inclined by an inclined electric field produced at the edge portion of each opening 14a. As a result, there is obtained an orientation in which those liquid crystal molecules 30a around the center of the unit solid portion 14b', where the respective orientation-regulating forces from the liquid crystal molecules 30a at the edge portions are in equilibrium, remain in a vertical alignment with respect to the substrate plane, while the surrounding liquid crystal molecules 30a are inclined in a radial pattern about those liquid crystal molecules 30a around the center of the unit solid portion 14b', with the degree of inclination gradually increasing away from the center of the unit solid portion 14b'.

As described above, when liquid crystal domains in each of which the liquid crystal molecules 30a take a radially-inclined orientation are arranged in a square lattice pattern across the entire picture element region, the existence probabilities of the liquid crystal molecules 30a of the respective axial orientations have rotational symmetry, whereby it is possible to realize a high-quality display without non-uniformity for any viewing angle. In order to reduce the viewing angle dependence of a liquid crystal domain having a radially-inclined orientation, the liquid crystal domain preferably has a high degree of rotational symmetry (preferably with at least a two-fold rotation axis, and more preferably with at least a four-fold rotation axis). Moreover, in order to reduce the viewing angle dependence across the entire picture element region, the plurality of liquid crystal domains provided in the picture element region are preferably arranged in a pattern (e.g., a square lattice pattern) that is a combination of a plurality of unit patterns (e.g., unit lattice patterns) each having a high degree of rotational symmetry (preferably with at least a two-fold rotation axis, and more preferably with at least a four-fold rotation axis).

For the radially-inclined orientation of the liquid crystal molecules 30a, a radially-inclined orientation having a counterclockwise or clockwise spiral pattern as illustrated in FIG. 5B or FIG. 5C, respectively, is more stable than the simple radially-inclined orientation as illustrated in FIG. 5A. The spiral orientation is different from a normal twist orientation (in which the orientation direction of the liquid crystal molecules 30a spirally changes along the thickness of the liquid crystal layer 30). In the spiral orientation, the orientation direction of the liquid crystal molecules 30a does not substantially change along the thickness of the liquid crystal layer 30 for a minute region. In other words, the orientation in a cross section (in a plane parallel to the layer plane) at any thickness of the liquid crystal layer 30 is as illustrated in FIG. 5B or FIG. 5C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30a take a radially-inclined orientation of a counterclockwise or clockwise spiral pattern about the opening 14a and the unit solid portion 14b', as illustrated in FIG. 5B or FIG. 5C, respectively, in the presence of an applied voltage. Whether the spiral pattern is counterclockwise or clockwise is determined by the type of chiral agent used. Thus, by controlling the liquid crystal layer 30 in the opening 14a into a radially-inclined orientation of a spiral pattern in the presence of an applied voltage, the direction of the spiral pattern of the radially-inclined liquid crystal molecules 30a about other liquid crystal molecules 30a standing vertical to the substrate plane can be constant in all liquid crystal domains, whereby it is possible to realize a uniform display without display non-uniformity. Since the direction of the spiral pattern around the liquid crystal molecules 30a standing vertical to the substrate plane is definite, the response speed upon application of a voltage across the liquid crystal layer 30 is also improved.

Moreover, when a chiral agent is added, the orientation of the liquid crystal molecules 30a changes in a spiral pattern along the thickness of the liquid crystal layer 30 as in a normal twist orientation. In an orientation where the orientation of the liquid crystal molecules 30a does not change in a spiral pattern along the thickness of the liquid crystal layer 30, the liquid crystal molecules 30a which are oriented perpendicular or parallel to the polarization axis of the polarization plate do not give a phase difference to the incident light, whereby incident light passing through a region of such an orientation does not contribute to the transmittance. In contrast, in an orientation where the orientation of the liquid crystal molecules 30a changes in a spiral pattern along the thickness of the liquid crystal layer 30, the liquid crystal molecules 30a that are oriented perpendicular or parallel to the polarization axis of the polarization plate also give a phase difference to the incident light, and the optical rotatory power can also be utilized, whereby incident light passing through a region of such an orientation also contributes to the transmittance. Thus, it is possible to obtain a liquid crystal display device capable of producing a bright display.

FIG. 1A illustrates an example in which each opening 14a has a generally star shape and each unit solid portion 14b' has a generally circular shape, wherein such openings 14a and such unit solid portions 14b' are arranged in a square lattice pattern. However, the shape of the opening 14a, the shape of the unit solid portion 14b', and the arrangement thereof are not limited to those of the example above.

FIG. 6A and FIG. 6B are plan views respectively illustrating picture element electrodes 14A and 14B having respective openings 14a and unit solid portions 14b' of different shapes.

The openings 14a and the unit solid portions 14b' of the picture element electrodes 14A and 14B illustrated in FIG. 6A and FIG. 6B, respectively, are slightly distorted from those of the picture element electrode illustrated in FIG. 1A. The openings 14a and the unit solid portions 14b' of the picture element electrodes 14A and 14B have a two-fold rotation axis (not a four-fold rotation axis) and are regularly arranged so as to form oblong rectangular unit lattices. In both of the picture element electrodes 14A and 14B, the opening 14a has a distorted star shape, and the unit solid portion 14b' has a generally elliptical shape (a distorted circular shape). Also with the picture element electrodes 14A and 14B, it is possible to obtain a liquid crystal display device having a high display quality and a desirable viewing angle characteristic.

Moreover, picture element electrodes 14C and 14D as illustrated in FIG. 7A and FIG. 7B, respectively, may alternatively be used.

In the picture element electrodes 14C and 14D, generally cross-shaped openings 14a are arranged in a square lattice pattern so that each unit solid portion 14b' has a generally square shape. Of course, the patterns of the picture element electrodes 14C and 14D may be distorted so that there are oblong rectangular unit lattices. As described above, it is possible to obtain a liquid crystal display device having a high display quality and a desirable viewing angle characteristic alternatively by regularly arranging the generally rectangular (including a square and oblong rectangle) unit solid portions 14b'.

However, the shape of the opening 14a and/or the unit solid portion 14b' is preferably a circle or an ellipse, rather than a rectangle, so that a radially-inclined orientation is more stable. It is believed that a radially-inclined orientation is more stable with a circular or elliptical opening and/or unit solid portion because the edge of the opening 14a is more continuous (smooth), whereby the orientation direction of the liquid crystal molecules 30a changes more continuously (smoothly).

In view of the continuity of the orientation direction of the liquid crystal molecules 30a described above, picture element electrodes 14E and 14F as illustrated in FIG. 8A and FIG. 8B, respectively, are also desirable. The picture element electrode 14E illustrated in FIG. 8A is a variation of the picture element electrode 14 illustrated in FIG. 1A in which each opening 14a is simply comprised of four arcs. The picture element electrode 14F illustrated in FIG. 8B is a variation of the picture element electrode 14D illustrated in FIG. 7B in which each side of the opening 14a on the unit solid portion 14b' is an arc. In both of the picture element electrodes 14E and 14F, the openings 14a and the unit solid portions 14b' have a four-fold rotation axis and are arranged in a square lattice pattern (having a four-fold rotation axis). Alternatively, the shape of the unit solid portion 14b' of the opening 14a may be distorted into a shape having a two-fold rotation axis, and such unit solid portions 14b' may be arranged so as to form oblong rectangular lattices (having a two-fold rotation axis), as illustrated in FIG. 6A and FIG. 6B.

In view of the response speed, picture element electrodes 14G and 14H as illustrated in FIG. 9A and FIG. 9B, respectively, may be used. The picture element electrode 14G illustrated in FIG. 9A is a variation of the picture element electrode 14C having the generally square unit solid portion 14b' illustrated in FIG. 7A in which the shape of the unit solid portion 14b' of the picture element electrode 14G is a distorted square shape having acute angle corners. Moreover, the shape of the unit solid portion 14b' of the picture element electrode 14H illustrated in FIG. 9B is a generally star shape having eight edges and having a four-fold rotation axis at its center with each corner having an acute angle. Note that a corner with an acute angle as used herein refers to a corner or a rounded corner having an angle less than 90°.

When a voltage is applied across the liquid crystal layer 30 in a liquid crystal display device in which the orientation of the liquid crystal molecules 30a is controlled by an inclined electric field produced at an edge portion of the opening 14a, the liquid crystal molecules 30a above an edge portion incline first, followed by the surrounding liquid crystal molecules 30a, eventually resulting in a radially-inclined orientation. Therefore, the response speed may be lower than that of a liquid crystal display device of a display mode in which liquid crystal molecules on a picture element electrode incline at once upon application of a voltage across the liquid crystal layer.

When the unit solid portion 14b' has a shape with acute angle corners as illustrated in FIG. 9A and FIG. 9B, the total amount or length of the edge portion that produces an inclined electric field is increased, whereby the inclined electric field can act upon more liquid crystal molecules 30a.

Therefore, the number of liquid crystal molecules 30a that initially start inclining in response to an applied electric field increases, thereby reducing the amount of time required to achieve the radially-inclined orientation across the entire picture element region, and thus improving the response speed to the application of a voltage across the liquid crystal layer 30.

For example, for a liquid crystal display device in which each side of the unit solid portion 14b' has a length of about 40 μm, the response speed to the application of a voltage across the liquid crystal layer 30 can be reduced by about 60% in a case where the shape of the unit solid portion 14b' is a distorted square shape as illustrated in FIG. 9A and the angle θ a between two edges forming a corner is less than 90° as illustrated in FIG. 10A, than in a case where the shape of the unit solid portion 14b' is a generally square shape as illustrated in FIG. 8B and the angle θ a between two edges forming a corner is 90° as illustrated in FIG. 10B. Of course, the response speed can similarly be reduced when a generally star shape as illustrated in FIG. 9B is employed for the shape of the unit solid portion 14b'.

Moreover, when the unit solid portion 14b' has a shape with acute angle corners, the existence probability of the liquid crystal molecules 30a that are oriented in a particular azimuth angle direction can be increased (or decreased) as compared to a case where the shape of the unit solid portion 14b' is a generally circular shape or a generally rectangular shape. In other words, a high directionality can be introduced in the existence probabilities of the liquid crystal molecules 30a oriented in various azimuth angle directions. Therefore, when an acute angle corner is employed in the unit solid portion 14b' in a liquid crystal display device having a polarization plate in which linearly-polarized light is incident upon the liquid crystal layer 30, it is possible to decrease the existence probability of the liquid crystal molecules 30a oriented vertical or horizontal to the polarization axis of the polarization plate, i.e., the liquid crystal molecules 30a that do not give a phase difference to the incident light. Thus, it is possible to improve the light transmittance and to realize a brighter display.

FIG. 11A illustrates a change in the transmittance as the angle of the polarization axis of the polarization plate is changed in a liquid crystal display device with the picture element electrode 14F illustrated in FIG. 8B having the unit solid portion 14b' of a generally square shape and in a liquid crystal display device with the picture element electrode 14H illustrated in FIG. 9B having the unit solid portion 14b' of a generally star shape. In FIG. 11A, a solid line 51 represents the transmittance of the liquid crystal display device with the picture element electrode 14F illustrated in FIG. 8B in the presence of an applied voltage, and a broken line 52 represents the transmittance of the liquid crystal display device with the picture element electrode 14H illustrated in FIG. 9B in the presence of an applied voltage. Note that in FIG. 11A, the angle being 0° corresponds to a state where the polarization axis of the polarization plate on the viewer side (represented by a solid line arrow 61) extends in the top-bottom direction of the display plane (corresponding to the top-bottom direction of the figure) while the polarization axis of the polarization plate on the reverse side (represented by a broken line arrow 62) extends in the left-right direction of the display plane (corresponding to the left-right direction of the figure), as illustrated in FIG. 11B, with an angle of a positive value and a negative value indicating an angle obtained by rotating the polarization axis counterclockwise and clockwise, respectively.

As illustrated in FIG. 11A, the maximum value of the transmittance of the liquid crystal display device having the picture element electrode 14H in which the unit solid portion 14b' has acute angle corners (the broken line 52) is greater than the maximum value of the transmittance of the liquid crystal display device having the picture element electrode 14F in which the unit solid portion 14b' has a generally square shape (the solid line 51). Thus, by employing acute angle corners in the unit solid portion 14b', it is possible to improve the transmittance and to produce a brighter display.

Note that when the unit solid portion 14b' has acute angle corners as described above, the response speed and the transmittance can be improved, but the stability of the radially-inclined orientation may deteriorate. Where acute angle corners are employed, as compared to a case where the shape of the unit solid portion 14b' is a generally circular shape, for example, the edge of the opening 14a is not as smooth as that in the case where the shape of the unit solid portion 14b' is a generally circular shape, thereby resulting in a poor continuity in the change of the orientation direction of the liquid crystal molecules 30a. Thus, the stability of the radially-inclined orientation may deteriorate. However, a practically sufficient orientation stability can be obtained if a second orientation-regulating structure to be described later is employed in combination.

While examples where a plurality of openings 14a are provided in one picture element region have been illustrated in FIG. 6A to FIG. 9B, a plurality of liquid crystal domains can be formed in one picture element region by providing only one opening as described above with reference to FIG. 1A and FIG. 1B. Furthermore, a plurality of liquid crystal domains can be formed in each picture element region even when no opening 14a is formed. Moreover, it may not be necessary to form a liquid crystal domain that takes a radially-inclined orientation in a region corresponding to the opening 14a of the picture element electrode. As long as a liquid crystal domain taking a radially-inclined orientation is formed so as to correspond to the solid portion 14b (the unit solid portion 14b'), a continuity of the orientation of the liquid crystal molecules in each picture element region is ensured, thereby stabilizing the radially-inclined orientation of the liquid crystal domain formed so as to correspond to the solid portion 14b, even when a liquid crystal domain formed so as to correspond to the opening 14a does not take a radially-inclined orientation. Particularly, when the area of the opening 14a is small, as illustrated in FIG. 7A and FIG. 7B, the opening has only a little contribution to the display, and thus the display quality will not deteriorate significantly even if a liquid crystal domain taking a radially-inclined orientation is not formed in a region corresponding to the opening.

In the examples described above, the openings 14a are generally star-shaped or generally cross-shaped, and the unit solid portions 14b' are generally circular, generally elliptical, generally square (rectangular), and generally rectangular with rounded corners. Alternatively, the negative-positive relationship between the openings 14a and the unit solid portions 14b' may be inverted (hereinafter, the inversion of the negative-positive relationship between the openings 14a and the unit solid portions 14b' will be referred to simply as "inversion"). For example, FIG. 12 illustrates a picture element electrode 14I having a pattern obtained by inverting the negative-positive relationship between the openings 14a and the unit solid portions 14b' of the picture element electrode 14 illustrated in FIG. 1A. The picture element electrode 14I having an inverted pattern has substantially the same function as that of the picture element electrode 14 illustrated in FIG. 1A. When the opening 14a and the unit solid portion 14b' both have a generally square shape, as in picture element electrodes 14J and 14K illustrated in FIG. 13A and FIG. 13B, respectively, the inverted pattern may be substantially the same as the original pattern.

Also when the pattern illustrated in FIG. 1A is inverted as in the pattern illustrated in FIG. 12, it is preferred to form partial pieces (generally half or quarter pieces) of the opening 14a so as to form the unit solid portions 14b' having rotational symmetry at the edge portion of the picture element electrode 14. By employing such a pattern, the effect of an inclined electric field can be obtained at the edge portion of a picture element region as in the central portion of the picture element region, whereby it is possible to realize a stable radially-inclined orientation across the entire picture element region.

Next, which one of two inverted patterns should be employed will be discussed with respect to the picture element electrode 14 of FIG. 1A and the picture element electrode 14I illustrated in FIG. 12 having a pattern obtained by inverting the pattern of the openings 14a and the unit solid portions 14b' of the picture element electrode 14.

With either pattern, the length of the perimeter of each opening 14a is the same. Therefore, for the function of producing an inclined electric field, there is no difference between the two patterns. However, the area ratio of the unit solid portion 14b' (with respect to the total area of the picture element electrode 14) may differ between the two patterns. In other words, the area of the solid portion 14b (the portion where the conductive film exists) for producing an electric field acting upon the liquid crystal molecules of the liquid crystal layer may differ therebetween.

The voltage applied through a liquid crystal domain formed in the opening 14a is lower than the voltage applied through another liquid crystal domain formed in the solid portion 14b. As a result, in a normally black mode display, for example, the liquid crystal domain formed in the opening 14a appears darker. Thus, as the area ratio of the openings 14a increases, the display brightness decreases. Therefore, it is preferred that the area ratio of the solid portion 14b is high.

Whether the area ratio of the solid portion 14b is higher in the pattern of FIG. 1A or in the pattern of FIG. 12 depends upon the pitch (size) of the unit lattice.

FIG. 14A illustrates a unit lattice of the pattern illustrated in FIG. 1A, and FIG. 14B illustrates a unit lattice of the pattern illustrated in FIG. 12 (the opening 14a being taken as the center of each lattice). The portions illustrated in FIG. 12 that serve to connect adjacent unit solid portions 14b' together (the branch portions extending in four directions from the circular portion) are omitted in FIG. 14B. The length of one side of the square unit lattice (the pitch) is denoted by "p", and the distance between the opening 14a or the unit solid portion 14b' and a side of the unit lattice (the width of the side space) is denoted by "s".

Various samples of picture element electrodes 14 having different pitches p and side spaces s were produced so as to examine the stability of the radially-inclined orientation, etc. As a result, it was found that with the picture element electrode 14 having a pattern illustrated in FIG. 14A (hereinafter, referred to as the "positive pattern") the side space s needs to be about 2.75 $\mu$m or more so as to produce an inclined electric field required to obtain a radially-inclined orientation. It was found that with the picture element electrode 14 having a pattern illustrated in FIG. 14B (hereinafter, referred to as the "negative pattern"), the side space s needs to be about 2.25 $\mu$m or more so as to produce an inclined electric field required to obtain a radially-inclined orientation. For each pattern, the area ratio of the solid portion 14b was examined while changing the value of the pitch p with the side space s fixed to its lower limit value above. The results are shown in Table 1 below and in FIG. 14C.

TABLE 1

| Pitch p ($\mu$m) | Solid portion area ratio (%) | |
|---|---|---|
| | Positive (FIG. 14A) | Negative (FIG. 14B) |
| 20 | 41.3 | 52.9 |
| 25 | 47.8 | 47.2 |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

As can be seen from Table 1 and FIG. 14C, the positive pattern (FIG. 14A) has a higher area ratio of the solid portion 14b when the pitch p is about 25 $\mu$m or more, and the negative pattern (FIG. 14B) has a higher area ratio of the solid portion 14b when the pitch p is less than about 25 $\mu$m. Therefore, in view of the display brightness and the stability of orientation, the pattern which should be employed changes at the critical pitch p of about 25 $\mu$m. For example, when three or fewer unit lattices are provided in the width direction of the picture element electrode 14 having a width of 75 $\mu$m, the positive pattern illustrated in FIG. 14A is preferred, and when four or more unit lattices are provided, the negative pattern illustrated in FIG. 14B is preferred. For patterns other than that illustrated herein, the selection between a positive pattern and a negative pattern can similarly be made so as to obtain the larger area ratio of the solid portion 14b.

The number of unit lattices can be determined as follows. The size of each unit lattice is calculated so that one or more (an integer number of) unit lattices are arranged along the width (horizontal or vertical) of the picture element electrode 14, and the area ratio of the solid portion is calculated for each calculated unit lattice size. Then, the unit lattice size such that the area ratio of the solid portion is maximized is selected. Note that the orientation-regulating force from an inclined electric field decreases, whereby a stable radially-inclined orientation is not easily obtained, when the diameter of the unit solid portion 14b' (for the positive pattern) or the opening 14a (for the negative pattern) is less than 15 $\mu$m. The lower limit diameter value is for a case where the thickness of the liquid crystal layer 30 is about 3 $\mu$m. When the thickness of the liquid crystal layer 30 is less than about 3 $\mu$m, a stable radially-inclined orientation can be obtained even when the diameter of the unit solid portion 14b' and the opening 14a is less than the lower limit value. When the thickness of the liquid crystal layer 30 is greater than about 3 $\mu$m, the lower limit diameter value of the unit solid portion 14b' and the opening 14a for obtaining a stable radially-inclined orientation is greater than the lower limit value shown above.

Note that the stability of the radially-inclined orientation can be increased by forming a protrusion in the opening 14a as will be described later. The conditions shown above are all given for cases where the protrusion is not formed.

Except that the picture element electrode 14 is an electrode having the openings 14a, the liquid crystal display device 100 described above may employ the same structure as that of a known vertical alignment type liquid crystal display device and can be produced by a known production method.

Typically, a vertical alignment layer (not shown) is provided on one side of each of the picture element electrode 14 and the counter electrode 22 that is closer to the liquid crystal layer 30 so as to vertically align the liquid crystal molecules having a negative dielectric anisotropy.

The liquid crystal material may be a nematic liquid crystal material having a negative dielectric anisotropy. A guest-host mode liquid crystal display device can be obtained by adding a dichroic dye to a nematic liquid crystal material having a negative dielectric anisotropy. A guest-host mode liquid crystal display device does not require a polarization plate.

A structure of one picture element region of another liquid crystal display device 200 having the first orientation-regulating structure of the present invention will be described with reference to FIG. 15A and FIG. 15B. In the subsequent figures, each element having substantially the same function as that of the liquid crystal display device 100 will be denoted by the same reference numeral and will not be further described. FIG. 15A is a plan view as viewed in the substrate normal direction, and FIG. 15B is a cross-sectional view taken along line 15B–15B' of FIG. 15A. FIG. 15B illustrates a state where no voltage is applied across the liquid crystal layer.

As illustrated in FIG. 15A and FIG. 15B, the liquid crystal display device 200 is different from the liquid crystal display device 100 illustrated in FIG. 1A and FIG. 1B in that a TFT substrate 200a includes a protrusion 40 in the opening 14a of the picture element electrode 14. A vertical alignment film (not shown) is provided on the surface of the protrusion 40.

The cross section of the protrusion 40 along the plane of the substrate 11 is a generally star-shaped cross section, i.e., the same shape as that of the opening 14a, as illustrated in FIG. 15A. Note that adjacent protrusions 40 are connected to each other so as to completely surround each unit solid portion 14b' in a generally circular pattern. The cross section of the protrusion 40 along a plane vertical to the substrate 11 is a trapezoidal shape as illustrated in FIG. 15B. Specifically, the cross section has a top surface 40t parallel to the substrate plane and a side surface 40s inclined by a taper angle $\theta$ (<90°) with respect to the substrate plane. Since the vertical alignment film (not shown) is provided so as to cover the protrusion 40, the side surface 40s of the protrusion 40 has an orientation-regulating force of the same direction as that of an inclined electric field for the liquid crystal molecules 30a of the liquid crystal layer 30, thereby functioning to stabilize the radially-inclined orientation.

The function of the protrusion 40 will now be described with reference to FIG. 16A to FIG. 16D, FIG. 17A and FIG. 17B.

First, the relationship between the orientation of the liquid crystal molecules 30a and the configuration of the surface having a vertical alignment power will be described with reference to FIG. 16A to FIG. 16D.

Figure 16A:
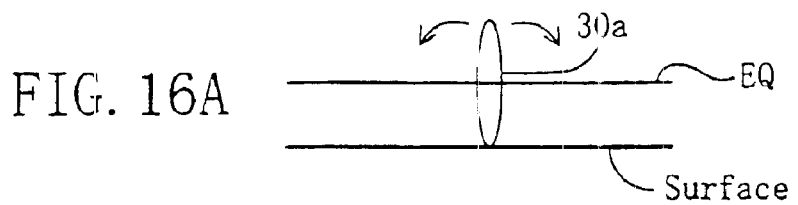

As illustrated in FIG. 16A, a liquid crystal molecule 30a on a horizontal surface is aligned vertical to the surface due to the orientation-regulating force of the surface having a vertical alignment power (typically, the surface of a vertical alignment film). When an electric field represented by an equipotential line EQ perpendicular to the axial orientation of the liquid crystal molecule 30a is applied through the liquid crystal molecule 30a in a vertical alignment, a torque urging the liquid crystal molecule 30a to incline clockwise and a torque urging the liquid crystal molecule 30a to incline counterclockwise act upon the liquid crystal molecule 30a with the same probability. Therefore, in the liquid crystal layer 30 between a pair of opposing electrodes in a parallel plate arrangement include some liquid crystal molecules 30*a* that are subject to the clockwise torque and other liquid crystal molecules 30*a* that are subject to the counterclockwise torque. As a result, the transition to the orientation according to the voltage applied across the liquid crystal layer 30 may not proceed smoothly.

Figure 16B:
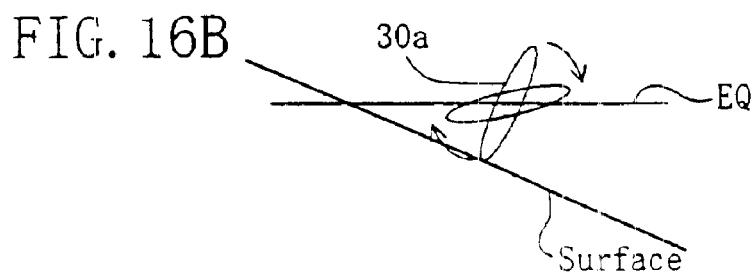
Figure 16C:
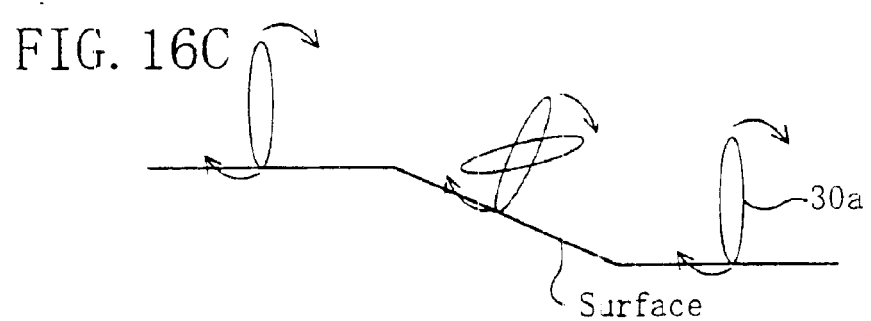

When an electric field represented by a horizontal equipotential line EQ is applied through a liquid crystal molecule 30*a* vertically aligned to an inclined surface, as illustrated in FIG. 16B, the liquid crystal molecule 30*a* inclines in whichever direction (the clockwise direction in the illustrated example) that requires less inclination for the liquid crystal molecule 30*a* to be parallel to the equipotential line EQ. Then, as illustrated in FIG. 16C, other adjacent liquid crystal molecules 30*a* aligned vertical to a horizontal surface incline in the same direction (the clockwise direction) as the liquid crystal molecule 30*a* located on the inclined surface so that the orientation thereof is continuous (in conformity) with the orientation of the liquid crystal molecule 30*a* aligned vertical to the inclined surface.

Figure 16D:
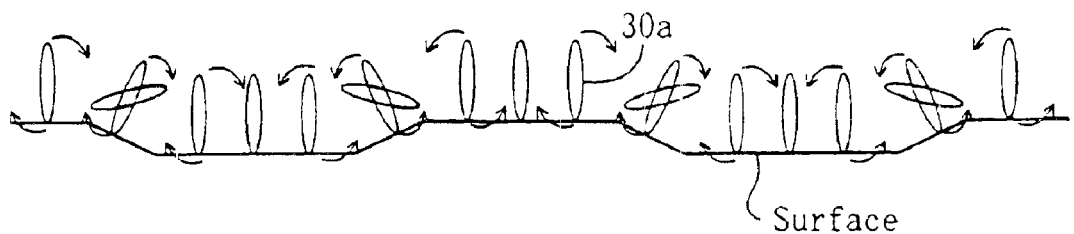

As illustrated in FIG. 16D, for a surface with concave/convex portions whose cross section includes a series of trapezoids, the liquid crystal molecules 30*a* on the top surface and those on the bottom surface are oriented so as to conform with the orientation direction regulated by other liquid crystal molecules 30*a* on the inclined portions of the surface.

In the liquid crystal display device 200, the direction of the orientation-regulating force exerted by the configuration (protrusions) of the surface is aligned with the direction of the orientation-regulating force exerted by an inclined electric field, thereby stabilizing the radially-inclined orientation.

FIG. 17A and FIG. 17B each illustrate a state in the presence of an applied voltage across the liquid crystal layer 30 shown in FIG. 15B. FIG. 17A schematically illustrates a state where the orientation of the liquid crystal molecules 30*a* has just started to change (initial ON state) according to the voltage applied across the liquid crystal layer 30. FIG. 17B schematically illustrates a state where the orientation of the liquid crystal molecules 30*a* has changed and become steady according to the applied voltage. In FIG. 17A and FIG. 17B, curves EQ denote equipotential lines.

When the picture element electrode 14 and the counter electrode 22 are at the same potential (i.e., in a state where no voltage is applied across the liquid crystal layer 30), the liquid crystal molecules 30*a* in each picture element region are aligned vertical to the surfaces of the substrates 11 and 21 as illustrated in FIG. 15B. The liquid crystal molecules 30*a* in contact with the vertical alignment film (not shown) on the side surface 40*s* of the protrusion 40 are aligned vertical to the side surface 40*s*, and the liquid crystal molecules 30*a* in the vicinity of the side surface 40*s* take an inclined orientation as illustrated due to the interaction (the nature as an elastic continuum) with the surrounding liquid crystal molecules 30*a*.

When a voltage is applied across the liquid crystal layer 30, a potential gradient represented by equipotential lines EQ shown in FIG. 17A is produced. The equipotential lines EQ are parallel to the surfaces of the solid portion 14*b* and the counter electrode 22 in a region of the liquid crystal layer 30 located between the solid portion 14*b* of the picture element electrode 14 and the counter electrode 22, and drop in a region corresponding to the opening 14*a* of the picture element electrode 14, thereby producing an inclined electric field represented by the inclined portion of the equipotential lines EQ in each region of the liquid crystal layer 30 above an edge portion (the peripheral portion of and within the opening 14*a* including the boundary thereof) EG of the opening 14*a*.

Due to the inclined electric field, the liquid crystal molecules 30*a* above the right edge portion EG in FIG. 17A incline (rotate) clockwise and the liquid crystal molecules 30*a* above the left edge portion EG incline (rotate) counterclockwise as indicated by arrows in FIG. 17A, as described above, so as to be parallel to the equipotential lines EQ. The direction of the orientation-regulating force exerted by the inclined electric field is the same as that of the orientation-regulating force exerted by the side surface 40*s* located at each edge portion EG.

As described above, the change in the orientation starts from the liquid crystal molecules 30*a* located on the inclined portion of the equipotential lines EQ, and reaches a steady state of the orientation schematically illustrated in FIG. 17B. The liquid crystal molecules 30*a* around the central portion of the opening 14*a*, i.e., around the central portion of the top surface 40*t* of the protrusion 40, are substantially equally influenced by the respective orientations of the liquid crystal molecules 30*a* at the opposing edge portions EG of the opening 14*a*, and therefore retain their orientation perpendicular to the equipotential lines EQ. The liquid crystal molecules 30*a* away from the center of the opening 14*a* (the top surface 40*t* of the protrusion 40) incline by the influence of the orientation of other liquid crystal molecules 30*a* at the closer edge portion EG, thereby forming an inclined orientation that is symmetric about the center SA of the opening 14*a* (the top surface 40*t* of the protrusion 40). An inclined orientation symmetric about the center SA of the unit solid portion 14*b*' is formed also in the region corresponding to the unit solid portion 14*b*' which is substantially surrounded by the openings 14*a* and the protrusions 40.

As described above, in the liquid crystal display device 200, as in the liquid crystal display device 100, liquid crystal domains each having a radially-inclined orientation are formed corresponding to the openings 14*a* and the unit solid portions 14*b*'. Since the protrusions 40 are provided so as to completely surround each unit solid portion 14*b*' in a generally circular pattern, each liquid crystal domain is formed corresponding to the generally circular region surrounded by the protrusions 40. Moreover, the side surface of the protrusion 40 provided in the opening 14*a* functions to incline the liquid crystal molecules 30*a* in the vicinity of the edge portion EG of the opening 14*a* in the same direction as the direction of the orientation-regulating force exerted by the inclined electric field, thereby stabilizing the radially-inclined orientation.

Of course, the orientation-regulating force exerted by the inclined electric field only acts in the presence of an applied voltage, and the strength thereof depends upon the strength of the electric field (the level of the applied voltage). Therefore, when the electric field strength is small (i.e., when the applied voltage is low), the orientation-regulating force exerted by the inclined electric field is weak, in which case the radially-inclined orientation may collapse due to floating of the liquid crystal material when a stress is applied to the liquid crystal panel. Once the radially-inclined orientation collapses, it is not restored until application of a voltage sufficient to produce an inclined electric field that exerts a sufficiently strong orientation-regulating force. On the other hand, the orientation-regulating force from the side surface 40*s* of the protrusion 40 is exerted regardless of the applied voltage, and is very strong as it is known in the art as the "anchoring effect" of the alignment film. Therefore, even when floating of the liquid crystal material occurs and the radially-inclined orientation once collapses, the liquid crystal molecules 30a in the vicinity of the side surface 40s of the protrusion 40 retain the same orientation direction as that of the radially-inclined orientation. Therefore, the radially-inclined orientation is easily restored once the floating of the liquid crystal material stops.

Thus, the liquid crystal display device 200 has an additional advantage of being strong against a stress in addition to the advantages of the liquid crystal display device 100. Therefore, the liquid crystal display device 200 can be suitably used in apparatuses that are often subject to a stress, such as PCs that are often carried around and PDAs.

When the protrusion 40 is made of a dielectric material having a high transparency, there is obtained an advantage of improving the contribution to the display of a liquid crystal domain that is formed in a region corresponding to the opening 14a. When the protrusion 40 is made of an opaque dielectric material, there is obtained an advantage that it is possible to prevent light leakage caused by the retardation of the liquid crystal molecules 30a that are in an inclined orientation due to the side surface 40s of the protrusion 40. Whether to employ a transparent dielectric material or an opaque dielectric material can be determined in view of the application of the liquid crystal display device, for example. In either case, the use of a photosensitive resin provides an advantage that the step of patterning the protrusions 40 corresponding to the openings 14a can be simplified.

As described above, the liquid crystal display device 200 includes the protrusion 40 in the opening 14a of the picture element electrode 14, and the side surface 40s of the protrusion 40 exerts an orientation-regulating force in the same direction as that of the orientation-regulating force exerted by an inclined electric field for the liquid crystal molecules 30a of the liquid crystal layer 30. Preferred conditions for the side surface 40s to exert an orientation-regulating force of the same direction as that of the orientation-regulating force exerted by the inclined electric field will now be described with reference to FIG. 18A to FIG. 18C.

FIG. 18A to FIG. 18C schematically illustrate cross-sectional views of liquid crystal display devices 200A, 200B and 200C, respectively. FIG. 18A to FIG. 18C correspond to FIG. 17A. The liquid crystal display devices 200A, 200B and 200C all have a protrusion in the opening 14a, but differ from the liquid crystal display device 200 in terms of the positional relationship between the entire protrusion 40 as a single structure and the corresponding opening 14a.

In the liquid crystal display device 200 described above, the entire protrusion 40 as a structure is formed in the opening 14a, and the bottom surface of the protrusion 40 is smaller than the opening 14a, as illustrated in FIG. 17A. In the liquid crystal display device 200A illustrated in FIG. 18A, the bottom surface of a protrusion 40A is aligned with the opening 14a. In the liquid crystal display device 200B illustrated in FIG. 18B, the bottom surface of a protrusion 40B is greater than the opening 14a so as to cover a portion of the solid portion (conductive film) 14b surrounding the opening 14a. The solid portion 14b is not formed on the side surface 40s of any of the protrusions 40, 40A and 40B. As a result, the equipotential lines EQ are substantially flat over the solid portion 14b and drop into the opening 14a, as illustrated in the respective figures. Therefore, as the protrusion 40 of the liquid crystal display device 200, the side surface 40s of the protrusion 40A of the liquid crystal display device 200A and that of the protrusion 40B of the liquid crystal display device 200B both exert an orientation-regulating force of the same direction as that of the orientation-regulating force exerted by the inclined electric field, thereby stabilizing the radially-inclined orientation.

In contrast, in the liquid crystal display device 200C illustrated in FIG. 18C, the bottom surface of a protrusion 40C is greater than the opening 14a, and a portion of the solid portion 14b extending into a region above the opening 14a is formed on the side surface 40s of the protrusion 40C. Due to the influence of the portion of the solid portion 14b formed on the side surface 40s, a ridge portion is created in the equipotential lines EQ. The ridge portion of the equipotential lines EQ has a gradient opposite to that of the other portion of the equipotential lines EQ dropping into the opening 14a. This indicates that an inclined electric field has been produced whose direction is opposite to that of an inclined electric field for orienting the liquid crystal molecules 30a into a radially-inclined orientation. Therefore, in order for the side surface 40s to have an orientation-regulating force of the same direction as that of the orientation-regulating force exerted by the inclined electric field, it is preferred that the solid portion (conductive film) 14b is not formed on the side surface 40s.

Next, a cross-sectional structure of the protrusion 40 taken along line 19A-19A' of FIG. 15A will be described with reference to FIG. 19.

Since the protrusions 40 illustrated in FIG. 15A are formed so as to completely surround each unit solid portion 14b' in a generally circular pattern, as described above, the portions serving to connect adjacent unit solid portions 14b' together (the branch portions extending in four directions from the circular portion) are formed on the protrusion 40 as illustrated in FIG. 19. Therefore, in the step of depositing the conductive film to be the solid portions 14b of the picture element electrode 14, there is a considerable possibility that disconnection may occur on the protrusion 40 or delamination may occur in an after-treatment of the production process.

In view of this, in a liquid crystal display device 200D illustrated in FIG. 20A and FIG. 20B, protrusions 40D independent of one another are formed so that each of the protrusions 40D is completely included within the opening 14a so that the conductive film to be the solid portion 14b is formed on the flat surface of the substrate 11, thereby eliminating the possibility of disconnection or delamination. Although the protrusions 40D do not completely surround each unit solid portion 14b' in a generally circular pattern, a generally circular liquid crystal domain corresponding to each unit solid portion 14b' is formed, and the radially-inclined orientation of the unit solid portion 14b' is stabilized as in the above-described examples.

The effect of stabilizing the radially-inclined orientation which is obtained by forming the protrusion 40 in the opening 14a is not limited to the pattern of the opening 14a described above, but may similarly be applied to any of the patterns of the opening 14a described above to obtain effects as those described above. In order for the protrusion 40 to sufficiently exert the effect of stabilizing the orientation against a stress, it is preferred that the pattern of the protrusion 40 (the pattern as viewed in the substrate normal direction) covers as much area as possible of the liquid crystal layer 30. Therefore, for example, a greater orientation stabilizing effect of the protrusion 40 can be obtained with the positive pattern with circular unit solid portions 14b' than with the negative pattern with circular openings 14a.

In order to obtain a sufficient orientation-regulating force such that an after image due to a stress is not observed even when a stress is applied to the liquid crystal panel, by providing the protrusion 40 without providing the second orientation-regulating structure to be described later, the height of the protrusion 40 is preferably in the range of about 0.5 μm to about 2 μm, when the thickness of the liquid crystal layer 30 is about 3 μm. Typically, the height of the protrusion 40 is preferably in the range of about ⅙ to about ⅔ of the thickness of the liquid crystal layer 30. However, since the liquid crystal molecules whose orientation is regulated by the orientation-regulating force of the side surface of the protrusion 40 have a poor response to an applied voltage (a small retardation change in response to the applied voltage), the protrusion may decrease the contrast ratio of the display. Therefore, it is preferred that the size, the height and the number of protrusions are set so as not to decrease the display quality.

With the electrode arrangement described above where openings are provided in one of a pair of electrodes, a sufficient voltage may not be applied across the liquid crystal layer in a region corresponding to the opening and a sufficient retardation change may not be obtained, thereby decreasing the light efficiency. In view of this, a dielectric layer may be provided on one side of the electrode with openings (an upper electrode) that is away from the liquid crystal layer, with an additional electrode (a lower electrode) being provided via the dielectric layer so as to at least partially oppose the electrode openings (i.e., a two-layer electrode may be employed). In this way, it is possible to apply a sufficient voltage across the liquid crystal layer corresponding to the opening, thereby improving the light efficiency and/or the response characteristic.

Each of FIG. 21A to FIG. 21C schematically illustrates a cross-sectional structure of one picture element region of a liquid crystal display device 300 having a picture element electrode 15 (a two-layer electrode) including a lower electrode 12, an upper electrode 14, and a dielectric layer 13 provided therebetween. The upper electrode 14 of the picture element electrode 15 is substantially equivalent to the picture element electrode 14 described above, and includes openings having any of the various shapes described above and arranged in any of the various patterns described above. The function of the picture element electrode 15 having a two-layer structure will now be described.

The picture element electrode 15 of the liquid crystal display device 300 includes a plurality of openings 14a (including 14a1 and 14a2). FIG. 21A schematically illustrates an orientation of the liquid crystal molecules 30a in the liquid crystal layer 30 in the absence of an applied voltage (OFF state). FIG. 21B schematically illustrates a state where the orientation of the liquid crystal molecules 30a has just started to change (initial ON state) according to the voltage applied across the liquid crystal layer 30. FIG. 21C schematically illustrates a state where the orientation of the liquid crystal molecules 30a has changed and become steady according to the applied voltage. In FIG. 21A to FIG. 21C, the lower electrode 12, which is provided so as to oppose the openings 14a1 and 14a2 via the dielectric layer 13, overlaps both of the openings 14a1 and 14a2 and also extends in a region between the openings 14a1 and 14a2 (a region where the upper electrode 14 exists). However, the arrangement of the lower electrode 12 is not limited to this, but the arrangement may alternatively be such that the area of the lower electrode 12=the area of the opening 14a, or the area of the lower electrode 12<the area of the opening 14a, for each of the openings 14a1 and 14a2. Thus, the structure of the lower electrode 12 is not limited to any particular structure as long as the lower electrode 12 opposes at least a portion of the opening 14a via the dielectric layer 13. However, when the lower electrode 12 is provided within the opening 14a, there is a region (gap region) in which neither the lower electrode 12 nor the upper electrode 14 is present in a plane as viewed in the direction normal to the substrate 11. A sufficient voltage may not be applied across the liquid crystal layer 30 in the region opposing the gap region. Therefore, in order to stabilize the orientation of the liquid crystal layer 30, it is preferred that the width of the gap region is sufficiently reduced. Typically, it is preferred that the width of the gap region does not exceed about 4 μm. Moreover, the lower electrode 12 that is provided at a position such that it opposes the region where the conductive layer of the upper electrode 14 exists via the dielectric layer 13 has substantially no influence on the electric field applied across the liquid crystal layer 30. Therefore, such a lower electrode 12 may or may not be patterned.

As illustrated in FIG. 21A, when the picture element electrode 15 and the counter electrode 22 are at the same potential (a state where no voltage is applied across the liquid crystal layer 30), the liquid crystal molecules 30a in the picture element region are aligned vertical to the surfaces of the substrates 11 and 21. Herein, it is assumed that the upper electrode 14 and the lower electrode 12 of the picture element electrode 15 are at the same potential for the sake of simplicity.

When a voltage is applied across the liquid crystal layer 30, a potential gradient represented by equipotential lines EQ shown in FIG. 21B is produced. A uniform potential gradient represented by equipotential lines EQ parallel to the surfaces of the upper electrode 14 and the counter electrode 22 is produced in the liquid crystal layer 30 in a region between the upper electrode 14 of the picture element electrode 15 and the counter electrode 22. A potential gradient according to the potential difference between the lower electrode 12 and the counter electrode 22 is produced in regions of the liquid crystal layer 30 located above the openings 14a1 and 14a2 of the upper electrode 14. The potential gradient produced in the liquid crystal layer 30 is influenced by a voltage drop due to the dielectric layer 13, whereby the equipotential lines EQ in the liquid crystal layer 30 drop in regions corresponding to the openings 14a1 and 14a2 (creating a plurality of "troughs" in the equipotential lines EQ). Since the lower electrode 12 is provided in a region opposing the openings 14a1 and 14a2 via the dielectric layer 13, the liquid crystal layer 30 around the respective central portions of the openings 14a1 and 14a2 also has a potential gradient that is represented by a portion of the equipotential lines EQ parallel to the plane of the upper electrode 14 and the counter electrode 22 ("the bottom of the trough" of the equipotential lines EQ). An inclined electric field represented by an inclined portion of the equipotential lines EQ is produced in the liquid crystal layer 30 above an edge portion EG of each of the openings 14a1 and 14a2 (the peripheral portion of and within the opening including the boundary thereof).

As is clear from a comparison between FIG. 21B and FIG. 2A, since the liquid crystal display device 300 has the lower electrode 12, a sufficient electric field can act also upon the liquid crystal molecules in the liquid crystal domain formed in a region corresponding to the opening 14a.

A torque acts upon the liquid crystal molecules 30a having a negative dielectric anisotropy so as to direct the axial orientation of the liquid crystal molecules 30a to be parallel to the equipotential lines EQ. Therefore, the liquid crystal molecules 30a above the right edge portion EG in FIG. 21B incline (rotate) clockwise and the liquid crystal molecules 30a above the left edge portion EG incline (rotate) counterclockwise as indicated by arrows in FIG. 21B. As a result, the liquid crystal molecules 30a above the edge portions EG are oriented parallel to the corresponding portions of the equipotential lines EQ.

When an electric field represented by a portion of the equipotential lines EQ inclined with respect to the axial orientation of the liquid crystal molecules 30a (an inclined electric field) is produced at the edge portions EG of the openings 14a1 and 14a2 of the liquid crystal display device 300, as illustrated in FIG. 21B, the liquid crystal molecules 30a incline in whichever direction (the counterclockwise direction in the illustrated example) that requires less rotation for the liquid crystal molecules 30a to be parallel to the equipotential line EQ, as illustrated in FIG. 3B. The liquid crystal molecules 30a in a region where an electric field represented by an equipotential line EQ perpendicular to the axial orientation of the liquid crystal molecules 30a is produced incline in the same direction as the liquid crystal molecules 30a located on the inclined portion of the equipotential lines EQ so that the orientation thereof is continuous (in conformity) with the orientation of the liquid crystal molecules 30a located on the inclined portion of the equipotential lines EQ as illustrated in FIG. 3C.

The change in the orientation of the liquid crystal molecules 30a, starting from those that are located on the inclined portion of the equipotential lines EQ, proceeds as described above and reaches a steady state, i.e., an inclined orientation (radially-inclined orientation) that is symmetric about the center SA of each of the openings 14a1 and 14a2, as schematically illustrated in FIG. 21C. The liquid crystal molecules 30a in a region of the upper electrode 14 located between the two adjacent openings 14a1 and 14a2 also take an inclined orientation so that the orientation thereof is continuous (in conformity) with the orientation of the liquid crystal molecules 30a at the edge portions of the openings 14a1 and 14a2. The liquid crystal molecules 30a in the middle between the edge of the opening 14a1 and the edge of the opening 14a2 are subject to substantially the same influence from the liquid crystal molecules 30a at the respective edge portions, and thus remain in a vertical alignment as the liquid crystal molecules 30a located around the central portion of each of the openings 14a1 and 14a2. As a result, the liquid crystal layer above the upper electrode 14 between the adjacent two openings 14a1 and 14a2 also takes a radially-inclined orientation. Note that the inclination direction of the liquid crystal molecules differs between the radially-inclined orientation of the liquid crystal layer in each of the openings 14a1 and 14a2 and that of the liquid crystal layer between the openings 14a1 and 14a2. Observation of the orientation around the liquid crystal molecule 30a at the center of each region having the radially-inclined orientation illustrated in FIG. 21C shows that the liquid crystal molecules 30a in the regions of the openings 14a1 and 14a2 are inclined so as to form a cone that spreads toward the counter electrode, whereas the liquid crystal molecules 30a in the region between the openings are inclined so as to form a cone that spreads toward the upper electrode 14. Since both of these radially-inclined orientations are formed so as to conform with the inclined orientation of the liquid crystal molecules 30a at an edge portion, the two radially-inclined orientations are continuous with each other.

As described above, when a voltage is applied across the liquid crystal layer 30, the liquid crystal molecules 30a incline, starting from those above the respective edge portions EG of the openings 14a1 and 14a2 provided in the upper electrode 14. Then, the liquid crystal molecules 30a in the surrounding regions incline so as to conform with the inclined orientation of the liquid crystal molecules 30a above the edge portion EG. Thus, a radially-inclined orientation is formed. Therefore, as the number of openings 14a to be provided in each picture element region increases, the number of liquid crystal molecules 30a that initially start inclining in response to an applied electric field also increases, thereby reducing the amount of time that is required to achieve the radially-inclined orientation across the entire picture element region. Thus, by increasing the number of openings 14a to be provided in the picture element electrode 15 for each picture element region, it is possible to improve the response speed of a liquid crystal display device. Moreover, By employing a two-layer electrode including the upper electrode 14 and the lower electrode 12 as the picture element electrode 15, a sufficient electric field can act also upon the liquid crystal molecules in a region corresponding to the opening 14a, thereby improving the response characteristic of the liquid crystal display device.

The dielectric layer 13 provided between the upper electrode 14 and the lower electrode 12 of the picture element electrode 15 may include an opening (aperture) or a depressed portion in the opening 14a of the upper electrode 14. In other words, in the two-layer picture element electrode 15, the whole of a region of the dielectric layer 13 located in the opening 14a of the upper electrode 14 may be removed (thereby forming an opening therein) or a portion of such a region may be removed (thereby forming a depressed portion).

First, the structure and operation of a liquid crystal display device 400 having such a picture element electrode 14 which includes an opening in the dielectric layer 13 will be described with reference to FIG. 22A to FIG. 22C. A single opening 14a provided in the upper electrode 14 will be described below for the sake of simplicity.

In the liquid crystal display device 400, the upper electrode 14 of the picture element electrode 15 includes the opening 14a, and the dielectric layer 13 provided between the lower electrode 12 and the upper electrode 14 includes an opening 13a formed so as to correspond to the opening 14a of the upper electrode 14, with the lower electrode 12 being exposed through the opening 13a. The side wall of the opening 13a of the dielectric layer 13 is typically tapered. The liquid crystal display device 400 has substantially the same structure as that of the liquid crystal display device 300 except that the dielectric layer 13 includes the opening 13a, and the two-layer picture element electrode 15 functions in substantially the same manner as the picture element electrode 15 of the liquid crystal display device 300, to form a liquid crystal domain in the liquid crystal layer 30 that takes a radially-inclined orientation in the presence of an applied voltage.

The operation of the liquid crystal display device 400 will be described with reference to FIG. 22A to FIG. 22C. FIG. 22A to FIG. 22C respectively correspond to FIG. 1A to FIG. 1C illustrating the liquid crystal display device 100.

As illustrated in FIG. 22A, the liquid crystal molecules 30a in each picture element region are aligned vertical to the surfaces of the substrates 11 and 21 in the absence of an applied voltage (OFF state). In the following description, the orientation-regulating force from the side wall of the opening 13a will be ignored for the sake of simplicity.

When a voltage is applied across the liquid crystal layer 30, a potential gradient represented by equipotential lines EQ shown in FIG. 22B is produced. As can be seen from the drop of the equipotential lines EQ (creating a "trough" therein) in a region corresponding to the opening 14a of the upper electrode 14, an inclined electric field is produced in the liquid crystal layer 30 of the liquid crystal display device 400 as in the potential gradient illustrated in FIG. 21B. However, since the dielectric layer 13 of the picture element electrode 15 includes the opening 13a in a region corresponding to the opening 14a of the upper electrode 14, the voltage applied across the region of the liquid crystal layer 30 corresponding to the opening 14a (the opening 13a) is exactly the potential difference between the lower electrode 12 and the counter electrode 22, and the voltage drop (capacitance division) due to the dielectric layer 13 does not occur. In other words, all of the seven equipotential lines EQ drawn in FIG. 22B between the upper electrode 14 and the counter electrode 22 stay between the upper electrode 14 and the counter electrode 22 across the entire liquid crystal layer 30 (as opposed to FIG. 21B where one of the five equipotential lines EQ is drawn into the dielectric layer 13), thereby applying a constant voltage across the entire picture element region.

Thus, by providing the opening 13a in the dielectric layer 13, it is possible to apply the same voltage across the region of the liquid crystal layer 30 corresponding to the opening 13a as that applied across the other regions of the liquid crystal layer 30. However, the thickness of the liquid crystal layer 30, across which a voltage is applied, varies depending upon the location in each picture element region, whereby the change in retardation in the presence of an applied voltage also varies depending upon the location. If the degree of variation is significant, the display quality may deteriorate.

In the structure illustrated in FIG. 22A to FIG. 22C, the thickness d1 of the liquid crystal layer 30 on the upper electrode (the solid portion excluding the opening 14a) 14 and the thickness d2 of the liquid crystal layer 30 on the lower electrode 12 exposed through the opening 14a (and the opening 13a) differ from each other by the thickness of the dielectric layer 13. When the portion of the liquid crystal layer 30 having the thickness d1 and the other portion of the liquid crystal layer 30 having the thickness d2 are driven with the same voltage range, the amount of retardation change caused by the orientation change in the liquid crystal layer 30 varies therebetween by the influence of the difference in thickness between the respective portions of the liquid crystal layer 30. When the relationship between the applied voltage and the amount of retardation of the liquid crystal layer 30 considerably varies depending upon the location, the following problem arises. That is, in a design where the display quality is given a higher priority, the transmittance is sacrificed, and when the transmittance is given a higher priority, the color temperature of the white display shifts, thereby sacrificing the display quality. Therefore, when the liquid crystal display device 400 is used as a transmission type liquid crystal display device, the thickness of the dielectric layer 13 is preferably small.

Next, a cross-sectional structure of one picture element region of a liquid crystal display device 500 in which the dielectric layer of the picture element electrode includes a depressed portion will be described with reference to FIG. 23.

The dielectric layer 13 of the picture element electrode 15 of the liquid crystal display device 500 includes a depressed portion 13b corresponding to the opening 14a of the upper electrode 14. Other than this, the structure of the liquid crystal display device 500 is substantially the same as that of the liquid crystal display device 400 illustrated in FIG. 22A to FIG. 22C.

In the liquid crystal display device 500, a portion of the dielectric layer 13 located in the opening 14a of the upper electrode 14 of the picture element electrode 15 is not completely removed, whereby the thickness d3 of a portion of the liquid crystal layer 30 located in the opening 14a is smaller than the thickness d2 of the corresponding portion of the liquid crystal layer 30 located in the opening 14a of the liquid crystal display device 400 by the thickness of the dielectric layer 13 in the depressed portion 13b. Moreover, the voltage applied across the region of the liquid crystal layer 30 in the opening 14a is subject to the voltage drop (capacitance division) due to the dielectric layer 13 in the depressed portion 13b, and thus is lower than the voltage applied across the region of the liquid crystal layer 30 on the upper electrode (the region thereof excluding the opening 14a) 14. Therefore, by adjusting the thickness of the dielectric layer 13 in the depressed portion 13b, it is possible to control the relationship between the variations in retardation amount due to the difference in thickness of the liquid crystal layer 30 and the variations in the applied voltage across the liquid crystal layer 30 depending upon the location (the amount of decrease in the voltage applied across the liquid crystal layer in the opening 14a), so as to ensure that the relationship between the applied voltage and the retardation does not depend upon the location in the picture element region. More strictly, the relationship between the applied voltage and the retardation can be controlled to be uniform across the picture element region, thereby realizing a high-quality display, by adjusting the birefringence of the liquid crystal layer, the thickness of the liquid crystal layer, the dielectric constant and the thickness of the dielectric layer, and the thickness (or depth) of the depressed portion of the dielectric layer. Particularly, as compared to a transmission type liquid crystal display device having a flat-surface dielectric layer, there is an advantage that the decrease in transmittance due to a decrease in the voltage applied across the region of the liquid crystal layer 30 corresponding to the opening 14a of the upper electrode 14 (the decrease in the light efficiency) is suppressed.

In the above description, the same voltage is applied to the upper electrode 14 and the lower electrode 12 of the picture element electrode 15. When different voltages are applied to the lower electrode 12 and the upper electrode 14, it is possible to increase the variety of structures of liquid crystal display devices capable of displaying an image without display non-uniformity. For example, in the structure where the dielectric layer 13 is provided in the opening 14a of the upper electrode 14, a voltage higher than the voltage applied to the upper electrode 14 by the voltage drop due to the dielectric layer 13 is applied to the lower electrode 12, whereby it is possible to prevent the voltage applied across the liquid crystal layer 30 from varying depending upon the location in the picture element region.

The liquid crystal display device having the picture element electrode 15 of the two-layer structure may be a transmission-reflection type liquid crystal display device (see, for example, Japanese Laid-Open Patent Publication No. 11-101992) as well as a transmission or reflection type liquid crystal display device.

A transmission-reflection type liquid crystal display device (hereinafter, referred to simply as a "two-way liquid crystal display device") refers to a liquid crystal display device that includes, in each picture element region, a transmission region T displaying an image in a transmission mode and a reflection region R displaying an image in a reflection mode (see FIG. 21A). Typically, the transmission region T and the reflection region R are defined respectively by a transparent electrode and a reflection electrode. The reflection region can be defined by a structure using a combination of a reflection layer and a transparent electrode instead of the reflection electrode.

In the two-way liquid crystal display device, an image can be displayed in either the reflection mode or the transmission mode which can be switched from one to another, or an image can be displayed in both display modes at the same time. Therefore, for example, the reflection mode display can be used under an environment with bright ambient light, and the transmission mode display can be used under a dark environment. When both of these display modes are used at the same time, it is possible to suppress the decrease in the contrast ratio which is observed when a transmission mode liquid crystal display device is used under an environment with bright ambient light (a state where light from a fluorescent lamp or sun light is directly incident upon the display plane at a certain angle). Thus, the two-way liquid crystal display device can compensate for the drawback of a transmission type liquid crystal display device. The ratio between the area of the transmission region T and that of the reflection region R can be suitably determined according to the application of the liquid crystal display device. For a liquid crystal display device that is used exclusively as a transmission type display device, the area ratio of the reflection region can be reduced to such a degree that an image cannot be displayed in a reflection mode, and it is still possible to compensate for the drawback of a transmission type liquid crystal display device described above.

A two-way liquid crystal display device can be obtained by, for example, employing a reflection electrode and a transparent electrode as the upper electrode 14 and the lower electrode 12, respectively, of the liquid crystal display device 300 as illustrated in FIG. 21A. The two-way liquid crystal display device is not limited to this example, but may alternatively be obtained by employing a transparent conductive layer as either one of the upper electrode 14 and the lower electrode 12 of the liquid crystal display device while employing a reflection conductive layer as the other. Note that in order for the voltage-transmittance characteristics of a display in the reflection mode and those of a display in the transmission mode to conform with each other, it is preferred that the thickness of the liquid crystal layer 30 in the reflection region R (e.g., d1 in FIG. 22A) is about one half of the thickness of the liquid crystal layer 30 in the transmission region T (e.g., d2 in FIG. 22B). Of course, the voltage to be applied to the upper electrode 14 and the voltage to be applied to the lower electrode 12 may be adjusted, instead of adjusting the thickness of the liquid crystal layer.

Second Orientation-regulating Structure

Next, the specific structure and function of the second orientation-regulating structure will be described. A case where the first orientation-regulating structure is provided on the TFT substrate and the second orientation-regulating structure is provided on the counter substrate will be described below in conformity with the examples illustrated above. In addition to the structure for aligning the liquid crystal molecules vertical to the substrate plane (e.g., the vertical alignment film provided on one side of each of the pair of substrates that is closer to the liquid crystal layer), the liquid crystal display device of the present invention includes the first orientation-regulating structure as described above for orienting the liquid crystal molecules into a radially-inclined orientation, and the second orientation-regulating structure for orienting the liquid crystal molecules into a radially-inclined orientation in cooperation with the first orientation-regulating structure (stabilizing the radially-inclined orientation) as will be described later.

FIG. 24A to FIG. 24E schematically illustrate a counter substrate 600b having a second orientation-regulating structure 28. Each element having substantially the same function as that of the liquid crystal display devices described above will be denoted by the same reference numeral and will not be further described.

Figure 24A:
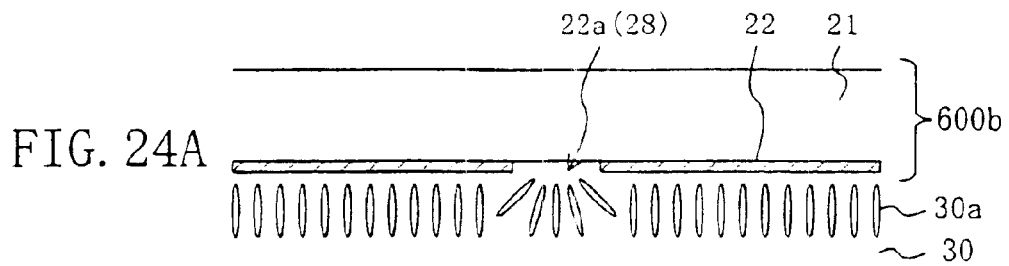
Figure 24B:
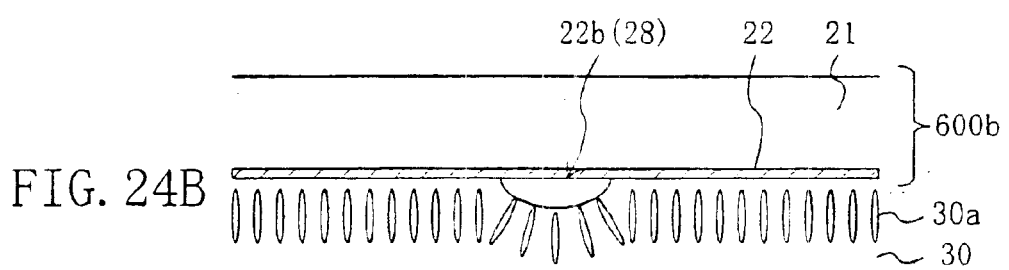
Figure 24C:
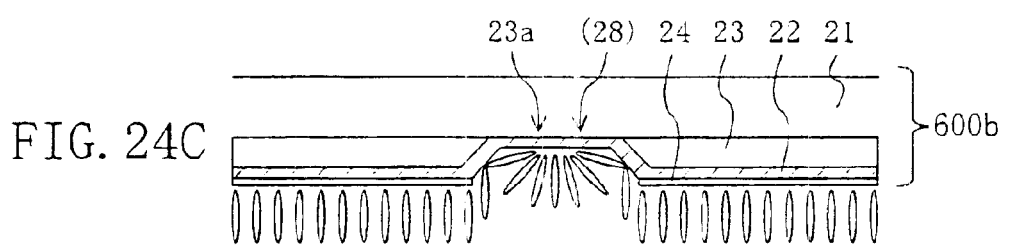
Figure 24D:
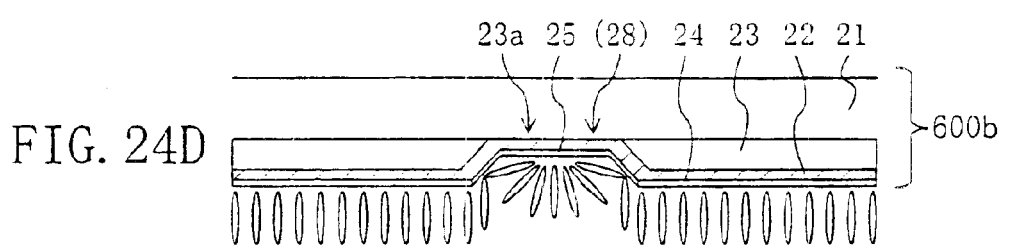
Figure 24E:
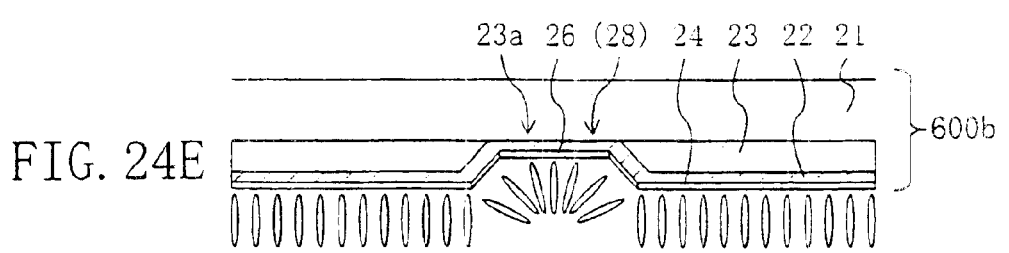

The second orientation-regulating structure 28 illustrated in FIG. 24A to FIG. 24E functions to orient the liquid crystal molecules 30a of the liquid crystal layer 30 into a radially-inclined orientation. Note that the second orientation-regulating structure 28 illustrated in FIG. 24A to FIG. 24D and that illustrated in FIG. 24E are different in terms of the direction in which the liquid crystal molecules 30a are to be inclined.

The direction in which the liquid crystal molecules are inclined by the second orientation-regulating structure 28 illustrated in FIG. 24A to FIG. 24D is aligned with the orientation direction of the radially-inclined orientation of each liquid crystal domain that is formed by the first orientation-regulating structure in a region corresponding to the unit solid portion 14b' (see, for example, FIG. 1A and FIG. 1B) of the picture element electrode 14. In contrast, the direction in which the liquid crystal molecules are inclined by the second orientation-regulating structure 28 illustrated in FIG. 24E is aligned with the orientation direction of the radially-inclined orientation of each liquid crystal domain that is formed by the first orientation-regulating structure in a region corresponding to the opening 14a (see, for example, FIG. 1A and FIG. 1B) of the picture element electrode 14.

The second orientation-regulating structure. 28 illustrated in FIG. 24A is formed by an opening 22a of the counter electrode 22 and the solid portion 14b of the picture element electrode (or an upper electrode; not shown in FIG. 24A; see, for example, FIG. 1A) 14 which is provided so as to oppose the opening 22a. A vertical alignment film (not shown) is provided on one surface of the counter substrate 600b that is closer to the liquid crystal layer 30.

The second orientation-regulating structure 28, as the first orientation-regulating structure described above, exerts an orientation-regulating force only in the presence of an applied voltage. Since the second orientation-regulating structure 28 is only required to exert an orientation-regulating force upon the liquid crystal molecules in each liquid crystal domain in a radially-inclined orientation formed by the first orientation-regulating structure, the size of the opening 22a is smaller than the opening 14a provided in the picture element electrode 14, and smaller than the unit solid portion 14b' (see, for example, FIG. 1A) which is surrounded by the openings 14a. For example, a sufficient effect can be obtained only with an area less than or equal to one half of that of the opening 14a or the unit solid portion 14b'. When the opening 22a of the counter electrode 22 is provided so as to oppose the central portion of the unit solid portion 14b' of the picture element electrode 14, the continuity of the orientation of the liquid crystal molecules increases, and it is possible to fix the position of the central axis of the radially-inclined orientation.

As described above, when a structure exerting an orientation-regulating force only in the presence of an applied voltage is employed as the second orientation-regulating structure, substantially all of the liquid crystal molecules 30a of the liquid crystal layer 30 take a vertical alignment in the absence of an applied voltage. Therefore, when employing a normally black mode, substantially no light leakage occurs in a black display, thereby realizing a display with a desirable contrast ratio.

However, in the absence of an applied voltage, the orientation-regulating force is not exerted and thus the radially-inclined orientation is not formed. Moreover, when the applied voltage is low, there is only a weak orientation-regulating force, whereby an after image may be observed when a considerable stress is applied upon the liquid crystal panel.

Each of the second orientation-regulating structures 28 illustrated in FIG. 24B to FIG. 24D exerts an orientation-regulating force regardless of the presence/absence of an applied voltage, whereby it is possible to obtain a stable radially-inclined orientation at any display gray level, and there is provided a high resistance to a stress.

First, the second orientation-regulating structure 28 illustrated in FIG. 24B includes a protrusion 22b that is provided on the counter electrode 22 so as to protrude into the liquid crystal layer 30. While there is no particular limitation on the material of the protrusion 22b, the protrusion 22b can be easily provided by using a dielectric material such as a resin. A vertical alignment film (not shown) is provided on one surface of the counter substrate 600b that is closer to the liquid crystal layer 30. The protrusion 22b orients the liquid crystal molecules 30a into a radially-inclined orientation by virtue of the configuration of the surface thereof (with a vertical alignment power). It is preferred to use a resin material that deforms by heat, in which case it is possible to easily form the protrusion 22b having a slightly-humped cross section as illustrated in FIG. 24B through a heat treatment after patterning. The protrusion 22b having a slightly-humped cross section with a vertex (e.g., a portion of a sphere) as illustrated in the figure or a conical protrusion provides a desirable effect of fixing the central position of the radially-inclined orientation.

The second orientation-regulating structure 28 illustrated in FIG. 24C is provided as a surface having a horizontal alignment power facing the liquid crystal layer 30 that is provided in an opening (or a depressed portion) 23a in a dielectric layer 23 formed under the counter electrode 22 (i.e., on one side of the counter electrode 22 that is closer to the substrate 21). A vertical alignment film 24 is provided so as to cover one side of the counter substrate 600b that is closer to the liquid crystal layer 30 while leaving a region corresponding to the opening 23a uncovered, whereby the surface in the opening 23a functions as a horizontal alignment surface. Alternatively, a horizontal alignment film 25 may be provided only in the opening 23a as illustrated in FIG. 24D.

The horizontal alignment film illustrated in FIG. 24D can be provided by, for example, once providing the vertical alignment film 24 across the entire surface of the counter substrate 600b, and then selectively irradiating a portion of the vertical alignment film 24 in the opening 23a with UV light so as to reduce the vertical alignment power thereof. The horizontal orientation power required for the second orientation-regulating structure 28 does not have to be so high that the resulting pretilt angle is as small as that resulting from an alignment film used in a TN type liquid crystal display device. For example, a pretilt angle of 45° or less is sufficient.

As illustrated in FIG. 24C and FIG. 24D, on the horizontal orientation surface in the opening 23a, the liquid crystal molecules 30a are urged to be horizontal with respect to the substrate plane. As a result, the liquid crystal molecules 30a form an orientation that is continuous with the orientation of the surrounding, vertically aligned liquid crystal molecules 30a on the vertical alignment film 24, thereby obtaining a radially-inclined orientation as illustrated in the figure.

A radially-inclined orientation can be obtained only by selectively providing a horizontal orientation surface (e.g., the surface of the electrode, or a horizontal alignment film) on the flat surface of the counter electrode 22 without providing a depressed portion (that is formed by the opening in the dielectric layer 23) on the surface of the counter electrode 22. However, the radially-inclined orientation can be further stabilized by virtue of the surface configuration of the depressed portion.

It is preferred to use a color filter layer or an overcoat layer of a color filter layer as the dielectric layer 23, for example, to form the depressed portion in the surface of the counter substrate 600b that is closer to the liquid crystal layer 30, because it adds nothing to the process. In the structures illustrated in FIG. 24C and FIG. 24D, there is little decrease in light efficiency because there is no region where a voltage is applied across the liquid crystal layer 30 via the protrusion 22b as in the structure illustrated in FIG. 24A.

In the second orientation-regulating structure 28 illustrated in FIG. 24E, a depressed portion is formed on one side of the counter substrate 600b that is closer to the liquid crystal layer 30 by using the opening 23a of the dielectric layer 23, as in the second orientation-regulating structure 28 illustrated in FIG. 24D, and a horizontal alignment film 26 is formed only in the bottom portion of the depressed portion. Instead of forming the horizontal alignment film 26, the surface of the counter electrode 22 may be exposed as illustrated in FIG. 24C.

A liquid crystal display device 600 having the first orientation-regulating structure and the second orientation-regulating structure as described above is shown in FIG. 25A and FIG. 25B. FIG. 25A is a plan view, and FIG. 25B is a cross-sectional view taken along line 25B–25B' of FIG. 25A.

The liquid crystal display device 600 includes the TFT substrate 10a having the picture element electrode 0.14 with the openings 14a being the first orientation-regulating structure, and the counter substrate 600b which includes the second orientation-regulating structure 28. The first orientation-regulating structure is not limited to the structure illustrated herein, but may be any other structure described above. Moreover, while a structure that exerts an orientation-regulating force even in the absence of an applied voltage (FIG. 24B to FIG. 24D and FIG. 24E) will be used as the second orientation-regulating structure 28, the second orientation-regulating structure illustrated in FIG. 24B to FIG. 24D can be replaced with that illustrated in FIG. 24A.

Among the second orientation-regulating structures 28 provided in the counter substrate 600b of the liquid crystal display device 600, the second orientation-regulating structure 28 provided around the center of a region opposing the solid portion 14b of the picture element electrode 14 is one of those illustrated in FIG. 24B to FIG. 24D, and the second orientation-regulating structure 28 provided around the center of a region opposing the opening 14a of the picture element electrode 14 is one illustrated in FIG. 24E.

With such an arrangement, in the presence of an applied voltage across the liquid crystal layer 30, i.e., in the presence of an applied voltage between the picture element electrode 14 and the counter electrode 22, the direction of the radially-inclined orientation formed by the first orientation-regulating structure is aligned with the direction of the radially-inclined orientation formed by the second orientation-regulating structure 28, thereby stabilizing the radially-inclined orientation. This is schematically shown in FIG. 26A to FIG. 26C. FIG. 26A illustrates a state in the absence of an applied voltage, FIG. 26B illustrates a state where the orientation has just started to change (initial ON state) after application of a voltage, and FIG. 26C schematically illustrates a steady state during the voltage application.

As illustrated in FIG. 26A, the orientation-regulating force exerted by the second orientation-regulating structure (FIG. 24B to FIG. 24D) acts upon the liquid crystal molecules 30a in the vicinity thereof even in the absence of an applied voltage, thereby forming a radially-inclined orientation.

When voltage application begins, an electric field represented by equipotential lines EQ shown in FIG. 26B is produced (by the first orientation-regulating structure), and a liquid crystal domain in which the liquid crystal molecules 30a are in a radially-inclined orientation is formed in each region corresponding to the opening 14a and each region corresponding to the solid portion 14b, and the liquid crystal layer 30 reaches a steady state as illustrated in FIG. 26C. The inclination direction of the liquid crystal molecules 30a in each liquid crystal domain coincides with the direction in which the liquid crystal molecules 30a are inclined by the orientation-regulating force exerted by the second orientation-regulating structure 28 that is provided in a corresponding region.

When a stress is applied upon the liquid crystal display device 600 in a steady state, the radially-inclined orientation of the liquid crystal layer 30 once collapses, but upon removal of the stress, the radially-inclined orientation is restored because of the orientation-regulating forces from the first orientation-regulating structure and the second orientation-regulating structure acting upon the liquid crystal molecules 30a. Therefore, the occurrence of an after image due to a stress is suppressed. When the orientation-regulating force from the second orientation-regulating structure 28 is excessively strong, retardation occurs even in the absence of an applied voltage due to the radially-inclined orientation, whereby the display contrast ratio may decrease. However, the orientation-regulating force from the second orientation-regulating structure 28 does not have to be strong because it is only required to have an effect of stabilizing a radially-inclined orientation formed by the first orientation-regulating structure and fixing the central axis position thereof. Therefore, an orientation-regulating force that would not cause such a degree of retardation as to deteriorate the display quality is sufficient.

For example, when the protrusion 22b illustrated in FIG. 24B is employed, each protrusion 22b may have a diameter of about 15 $\mu$m and a height (thickness) of about 1 $\mu$m for the unit solid portion 14b' having a diameter of about 30 $\mu$m to about 35 $\mu$m, thereby obtaining a sufficient orientation-regulating force and suppressing the reduction in the contrast ratio due to retardation to a practical level.

FIG. 27A and FIG. 27B illustrate another liquid crystal display device 700 including the first orientation-regulating structure and the second orientation-regulating structure.

The liquid crystal display device 700 does not have the second orientation-regulating structure in a region opposing the opening 14a of the picture element electrode 14 of the TFT substrate 100a. Formation of the second orientation-regulating structure 28 illustrated in FIG. 24E which should be formed in a region opposing the opening 14a introduces difficulties into the process. Therefore, in view of the productivity, it is preferred to use only one of the second orientation-regulating structures 28 illustrated in FIG. 24A to FIG. 24D. Particularly, the second orientation-regulating structure 28 illustrated in FIG. 24B is preferred because it can be produced by a simple process.

Even if no second orientation-regulating structure is provided in a region corresponding to the opening 14a as in the liquid crystal display device 700, a radially-inclined orientation as that of the liquid crystal display device 600 is obtained, as schematically illustrated in FIG. 28A to FIG. 28C, and also the stress resistance thereof is at a practical level.

An example of a liquid crystal display device having the first orientation-regulating structure and the second orientation-regulating structure is illustrated in FIG. 29A, FIG. 29B and FIG. 29C. FIG. 29A, FIG. 29B and FIG. 29C are cross-sectional views each schematically illustrating a liquid crystal display device 800 having the first orientation-regulating structure and the second orientation-regulating structure. FIG. 29A illustrates a state in the absence of an applied voltage, FIG. 29B illustrates a state where the orientation has just started to change (initial ON state) after application of a voltage, and FIG. 29C schematically illustrates a steady state during the voltage application.

The liquid crystal display device 800 includes the protrusion 40 illustrated in FIG. 17A and FIG. 17B in the opening 14a of the picture element electrode 14. The liquid crystal display device 800 further includes the protrusion 22b illustrated in FIG. 24B as the second orientation-regulating structure 28 provided around the center of a region opposing the solid portion 14b of the picture element electrode 14.

In the liquid crystal display device 800, the radially-inclined orientation is stabilized by the orientation-regulating force exerted by the side surface 40s of the protrusion 40 and the orientation-regulating force exerted by the surface of the protrusion 22b. Since the orientation-regulating force exerted by virtue of the surface configuration of the protrusion 40 and the protrusion 22b described above stabilizes the radially-inclined orientation regardless of the applied voltage, the liquid crystal display device 800 has a desirable stress resistance.

In a case where the protrusion 22b protruding from the counter electrode 22 into the liquid crystal layer 30 as illustrated in FIG. 24B is employed as the second orientation-regulating structure 28, the thickness of the liquid crystal layer 30 may be defined by the protrusion 22b. In other words, the protrusion 22b may function also as a spacer that controls the cell gap (the thickness of the liquid crystal layer 30).

FIG. 30A and FIG. 30B illustrate a liquid crystal display device 900 having the protrusion 22b that also functions as a spacer. FIG. 30A is a plan view as viewed in the substrate normal direction, and FIG. 30B is a cross-sectional view taken along line 30B–30B' of FIG. 30A.

As illustrated in FIG. 30A and FIG. 30B, in the liquid crystal display device 900, the thickness of the liquid crystal layer 30 is defined by the protrusion 22b provided around the center of a region opposing the solid portion 14b of the picture element electrode 14 as the second orientation-regulating structure 28. Such an arrangement is advantageous in that it is not necessary to separately provide a spacer for defining the thickness of the liquid crystal layer 30, thereby simplifying the production process.

In the illustrated example, the protrusion 22b has a truncated cone shape as illustrated in FIG. 30B with a side surface 22b1 that is inclined by a taper angle $\theta$ less than 90° with respect to the substrate plane of the substrate 21. When the side surface 22b1 is inclined by an angle less than 90° with respect to the substrate plane, the side surface 22b1 of the protrusion 22b has an orientation-regulating force of the same direction as that of the orientation-regulating force exerted by the inclined electric field for the liquid crystal molecules 30a of the liquid crystal layer 30, thereby functioning to stabilize the radially-inclined orientation.

As schematically illustrated in FIG. 31A to FIG. 31C, a radially-inclined orientation can be obtained also with the liquid crystal display device 900 having the protrusion 22b that functions also as a spacer, as with the liquid crystal display devices 600 and 700.

While the protrusion 22b has the side surface 22b1 that is inclined by an angle less than 90° with respect to the substrate plane in the example illustrated in FIG. 30B, the protrusion 22b may alternatively have the side surface 22b1 that is inclined by an angle of 90° or more with respect to the substrate plane. In view of the stability of the radially-inclined orientation, it is preferred that the inclination angle of the side surface 22b1 does not substantially exceed 90°, and it is more preferred that the inclination angle is less than 90°. Even if the inclination angle exceeds 90°, as long as it is close to 90° (as long as it does not substantially exceed 90°), the liquid crystal molecules 30a in the vicinity of the side surface 22b1 of the protrusion 22b are inclined in a direction substantially parallel to the substrate plane and thus take a radially-inclined orientation conforming with the inclination direction of the liquid crystal molecules 30a at the edge portion, with only a slight twist. However, if the inclination angle of the side surface 22b1 of the protrusion 22b substantially exceeds 90° as illustrated in FIG. 32, the side surface 22b1 of the protrusion 22b will have an orientation-regulating force of the opposite direction to the orientation-regulating force exerted by the inclined electric field for the liquid crystal molecules 30a of the liquid crystal layer 30, whereby the radially-inclined orientation may not be stable.

The protrusion 22b that functions also as a spacer is not limited to a protrusion having a truncated cone shape as illustrated in FIG. 30A and FIG. 30B. For example, the protrusion 22b may have a shape as illustrated in FIG. 33 such that the cross section thereof in a plane vertical to the substrate plane is a part of an ellipse (i.e., a shape such as a part of an elliptical sphere). In the protrusion 22b illustrated in FIG. 33, while the inclination angle (taper angle) of the side surface 22b1 with respect to the substrate plane varies along the thickness of the liquid crystal layer 30, the inclination angle of the side surface 22b1 is less than 90° regardless of the position along the thickness of the liquid crystal layer 30. Thus, the protrusion 22b having such a shape may suitably be used as a protrusion for stabilizing a radially-inclined orientation.

The protrusion 22b as described above that is in contact with both the upper and lower substrates (the TFT substrate and the counter substrate) and functions also as a spacer defining the thickness of the liquid crystal layer 30 may be formed either on the upper substrate or on the lower substrate in the process of producing a liquid crystal display device. Regardless of whether it is formed on the upper or lower substrate, the protrusion 22b will be in contact with both substrates, functioning as a spacer and as the second orientation-regulating structure, once the upper and lower substrates are attached to each other.

Arrangement of Polarization Plate and Phase Plate

A so-called "vertical alignment type liquid crystal display device", including a liquid crystal layer in which liquid crystal molecules having a negative dielectric anisotropy are vertically aligned in the absence of an applied voltage, is capable of displaying an image in various display modes. For example, a vertical alignment type liquid crystal display device may be used in an optical rotation mode or in a display mode that is a combination of an optical rotation mode and a birefringence mode, in addition to a birefringence mode in which an image is displayed by controlling the birefringence of the liquid crystal layer with an electric field. It is possible to obtain a birefringence-mode liquid crystal display device by providing a pair of polarization plates on the outer side (the side away from the liquid crystal layer 30) of the pair of substrates (e.g., the TFT substrate and the counter substrate) of any of the liquid crystal display devices described above. Moreover, a phase difference compensator (typically a phase plate) may be provided as necessary. Furthermore, a liquid crystal display device with a high brightness can be obtained also by using generally circularly-polarized light.

According to the present invention, a liquid crystal domain having a radially-inclined orientation is stably formed with a high degree of continuity. Therefore, it is possible to further improve the display quality of a conventional liquid crystal display device having a wide viewing angle characteristic. Moreover, with the use of the first orientation-regulating structure and the second orientation-regulating structure, it is possible to stabilize the radially-inclined orientation and also to fix the position of the central axis of the radially-inclined orientation. Thus, the occurrence of an after image due to a stress applied to the liquid crystal panel is suppressed.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device, comprising:
    a first substrate, a second substrate, and a vertical alignment type liquid crystal layer provided between the first substrate and the second substrate; and
    a plurality of picture element regions each defined by at least a first electrode supported by the first substrate and a second electrode supported by the second substrate so as to oppose the first electrode via the liquid crystal layer, wherein:
        the first electrode includes a plurality of unit solid portions; and
        the second substrate includes an orientation-regulating structure in a region corresponding to at least one unit solid portion among the plurality of unit solid portions, the orientation-regulating structure exerting an orientation-regulating force for orienting liquid crystal molecules in the liquid crystal layer on the at least one unit solid portion into a radially-inclined orientation at least in the presence of an applied voltage.

2. The liquid crystal display device of claim 1, wherein a shape of each of the plurality of unit solid portions has rotational symmetry.

3. The liquid crystal display device of claim 2, wherein each of the plurality of unit solid portions is in a substantially circular shape.

4. The liquid crystal display device of claim 2, wherein each of the plurality of unit solid portions is in a substantially rectangular shape.

5. The liquid crystal display device of claim 2, wherein each of the plurality of unit solid portions has a shape with an acute angle corner.

6. The liquid crystal display device of claim 1, wherein the plurality of unit solid portions are arranged so as to have rotational symmetry.

7. The liquid crystal display device of claim 1, wherein the first electrode includes at least one opening.

8. The liquid crystal display device of claim 7, wherein the at least one opening includes a plurality of openings having substantially the same shape and substantially the same size, and at least some of the plurality of openings form at least one unit lattice arranged so as to have rotational symmetry.

9. The liquid crystal display device of claim 8, wherein a shape of each of the at least some of the plurality of openings has rotational symmetry.

10. The liquid crystal display device of claim 1, wherein the orientation-regulating structure is provided in a region corresponding to a vicinity of a center of the at least one unit solid portion.

11. The liquid crystal display device of claim 1, wherein the orientation-regulating structure is provided in a region corresponding to each of the plurality of unit solid portions.

12. The liquid crystal display device of claim 1, wherein the orientation-regulating structure exerts an orientation-regulating force for orienting the liquid crystal molecules into a radially-inclined orientation even in the absence of an applied voltage.

13. The liquid crystal display device of claim 1, wherein the orientation-regulating structure is a protrusion protruding from the second substrate into the liquid crystal layer.

14. The liquid crystal display device of claim 13, wherein a thickness of the liquid crystal layer is defined by the protrusion protruding from the second substrate into the liquid crystal layer.

15. The liquid crystal display device of claim 14, wherein the protrusion includes a side surface at an angle less than 90° with respect to a substrate plane of the second substrate.

16. The liquid crystal display device of claim 1, wherein the orientation-regulating structure includes a surface having a horizontal alignment power provided on one side of the second substrate that is closer to the liquid crystal layer.

17. The liquid crystal display device of claim 1, wherein the orientation-regulating structure exerts an orientation-regulating force for orienting the liquid crystal molecules into a radially-inclined orientation only in the presence of an applied voltage.

18. The liquid crystal display device of claim 1, wherein the orientation-regulating structure includes an opening provided in the second electrode.

19. The liquid crystal display device of claim 1, wherein when a voltage is applied between the first electrode and the second electrode, an inclined electric field is produced along a periphery of each of the plurality of unit solid portions, the inclined electric field and the orientation-regulating structure cooperatively orient the liquid crystal molecules in the liquid crystal layer on the at least one unit solid portion into a radially-inclined orientation.

20. The liquid crystal display device of claim 19, wherein in the liquid crystal layer on the at least one unit solid portion, a direction of orientation regulation by the inclined electric field coincides with a direction of orientation regulation by the orientation-regulating structure.

21. The liquid crystal display device of claim 1, wherein each of the plurality of picture element regions includes a transmission region producing a display in a transmission mode and a reflection region producing a display in a reflection mode.

22. The liquid crystal display device of claim 21, wherein the first electrode or the second electrode includes a transparent electrode defining the transmission region and a reflection electrode defining the reflection region.

* * * * *

UNITED STATES PATENT AND TRADEMARK OFFICE
CERTIFICATE OF CORRECTION

PATENT NO. : 6,862,062 B2
DATED : March 1, 2005
INVENTOR(S) : Kubo et al.

It is certified that error appears in the above-identified patent and that said Letters Patent is hereby corrected as shown below:

<u>Title page,</u>
Item [30], Foreign Application Priority Data, "Oct. 31, 2000   (JP)   2000-333802" should be -- Sept. 19, 2001   (JP)   2001-284706 --

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,862,062 B2
DATED : March 1, 2005
INVENTOR(S) : Kubo et al.

It is certified that error appears in the above-identified patent and that said Letters Patent is hereby corrected as shown below:

<u>Title page,</u>
Item [30], Foreign Application Priority Data, should read
-- Oct. 31, 2000      (JP)           2000-333802
   Sept. 19, 2001     (JP)           2001-284706 --

This certificate supersedes Certificate of Correction issued May 31, 2005.

Signed and Sealed this

Sixteenth Day of August, 2005

JON W. DUDAS
*Director of the United States Patent and Trademark Office*